(12) United States Patent
Svedman et al.

(10) Patent No.: US 12,500,644 B2
(45) Date of Patent: Dec. 16, 2025

(54) BEAM MANAGEMENT FOR PHYSICAL UPLINK SHARED CHANNELS IN DENSE DEPLOYMENTS

(71) Applicant: IPLA HOLDINGS INC., New York, NY (US)

(72) Inventors: Patrick Svedman, Wilmington, DE (US); Kyle Pan, Wilmington, DE (US); Mohamed M. Awadin, Wilmington, DE (US); Yifan Li, Wilmington, DE (US); Allan Tsai, Wilmington, DE (US); Pascal Adjakple, Wilmington, DE (US); Guodong Zhang, Wilmington, DE (US)

(73) Assignee: IPLA HOLDINGS INC.

( * ) Notice: Subject to any disclaimer, the term of this patent is extended or adjusted under 35 U.S.C. 154(b) by 395 days.

(21) Appl. No.: 18/008,196

(22) PCT Filed: Jun. 11, 2021

(86) PCT No.: PCT/US2021/036964
§ 371 (c)(1),
(2) Date: Dec. 5, 2022

(87) PCT Pub. No.: WO2021/252865
PCT Pub. Date: Dec. 16, 2021

(65) Prior Publication Data
US 2023/0179281 A1 Jun. 8, 2023

Related U.S. Application Data

(60) Provisional application No. 63/038,174, filed on Jun. 12, 2020.

(51) Int. Cl.
*H04B 7/06* (2006.01)
*H04B 7/0404* (2017.01)

(52) U.S. Cl.
CPC ......... *H04B 7/0689* (2013.01); *H04B 7/0404* (2013.01); *H04B 7/06952* (2023.05)

(58) Field of Classification Search
CPC .. H04B 7/0689; H04B 7/0404; H04B 7/0695; H04L 5/0048; H04L 5/0094
See application file for complete search history.

(56) References Cited

U.S. PATENT DOCUMENTS

| 11,588,602 B2 * | 2/2023 | MolavianJazi ....... H04L 5/0048 |
| 2019/0149365 A1 | 5/2019 | Chatterjee |

(Continued)

FOREIGN PATENT DOCUMENTS

| CN | 109565370 A | 4/2019 |
| CN | 110945822 A | 3/2020 |

(Continued)

OTHER PUBLICATIONS

International Search Report and Written Opinion mailed on Oct. 1, 2021, received for PCT Application PCT/US2021/036964, filed on Jun. 11, 2021, 10 pages.

(Continued)

*Primary Examiner* — Dominic E Rego
(74) *Attorney, Agent, or Firm* — XSENSUS LLP

(57) ABSTRACT

A user equipment (UE) in a wireless network may receive Downlink Control Information (DCI) that schedules Physical Uplink Shared Channel (PUSCH) for non-codebook-based and/or codebook-based PUSCH operation. The UE may be configured with a Sounding Reference Signal (SRS) resource set for each codebook-based operation and non-code-book-based operation. The UE may transmit using a codebook base operation in a first set of PUSCH occasions and transmit using a non-code-book-based operation in a second set of PUSCH occasions. The DCI may include multiple SRS Resource Indicator (SRI) fields pertaining to (Continued)

different sets of PUSCH occasions. Similarly, DCI may include information pertaining to a number of layers for precoding for a set of PUSCH occasions.

20 Claims, 22 Drawing Sheets

(56) References Cited

U.S. PATENT DOCUMENTS

| | | | | |
|---|---|---|---|---|
| 2019/0174466 | A1* | 6/2019 | Zhang | H04L 5/0057 |
| 2019/0306850 | A1* | 10/2019 | Zhang | H04B 7/0465 |
| 2019/0357194 | A1* | 11/2019 | Hwang | H04L 5/0094 |
| 2020/0044797 | A1* | 2/2020 | Guo | H04L 5/0094 |
| 2020/0053724 | A1* | 2/2020 | MolavianJazi | H04L 5/0048 |
| 2020/0083939 | A1* | 3/2020 | Park | H04L 5/0007 |
| 2020/0106645 | A1* | 4/2020 | Tsai | H04B 7/0874 |
| 2020/0107353 | A1 | 4/2020 | Jung et al. | |
| 2020/0137780 | A1* | 4/2020 | Kim | H04W 72/0453 |
| 2020/0177266 | A1* | 6/2020 | Kang | H04W 74/0833 |
| 2020/0204240 | A1* | 6/2020 | Ryu | H04B 7/0404 |
| 2020/0220592 | A1* | 7/2020 | Ryu | H04B 7/0691 |
| 2020/0266867 | A1* | 8/2020 | Park | H04L 1/0681 |
| 2020/0280940 | A1* | 9/2020 | Kim | H04J 11/0086 |
| 2020/0313815 | A1* | 10/2020 | Sridharan | H04L 5/0048 |
| 2020/0382252 | A1* | 12/2020 | Sun | H04B 7/0626 |
| 2021/0007090 | A1* | 1/2021 | Pan | H04L 5/0094 |
| 2021/0143874 | A1* | 5/2021 | Park | H04W 72/23 |
| 2021/0243659 | A1* | 8/2021 | Cirik | H04L 5/0048 |
| 2021/0289525 | A1* | 9/2021 | Khoshnevisan | H04L 1/189 |
| 2021/0329423 | A1* | 10/2021 | Heo | H04B 7/0695 |
| 2021/0337534 | A1* | 10/2021 | Xiong | H04L 1/08 |
| 2021/0377876 | A1* | 12/2021 | Jeon | H04W 24/08 |
| 2022/0200757 | A1* | 6/2022 | Guo | H04L 5/0044 |
| 2024/0380420 | A1* | 11/2024 | Ye | H03M 13/6393 |

FOREIGN PATENT DOCUMENTS

| | | |
|---|---|---|
| JP | 2023522649 A | 5/2023 |
| KR | 20180135874 A | 12/2018 |
| WO | WO-2019108048 A1 | 6/2019 |
| WO | PCT/KR2021/005431 | 4/2021 |
| WO | WO-2021221476 A1 | 11/2021 |

OTHER PUBLICATIONS

Nokia et al., "Enhancements on Multi-beam Operation", 3GPP TSG RAN WG1 Meeting #AH-1901, R1-1900692, Jan. 21-25, 2019, 17 pages.

Samsung, "Issues on SRS", 3GPP TSG RAN WG1 #92, Aug. 31, 2018, 6 pgs.

Qualcomm Incorporated: "Enhancements on Multi-TRP for PDCCH, PUCCH and PUSCH", 3GPP Draft; R1-2103151, Apr. 7, 2021, 33 pgs.

NTT Docomo et al: "Discussion on MTRP for reliability", 3GPP Draft; R1-2101598, 3rd Generation Partnership Project (3GPP), Jan. 25, 2021-Feb. 5, 2021, 15 pgs.

OPPO: "Enhancements on multi-TRP based enhancement for PDCCH PUCCH and PUSCH", 3GPP Draft; R1-2102379, Apr. 12, 2021-Apr. 20, 2021, 16 pgs.

* cited by examiner

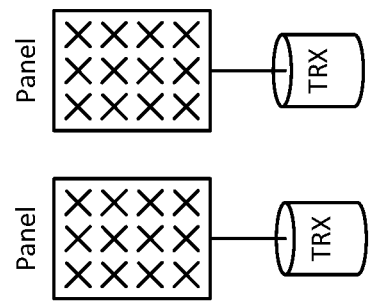
FIG. 1C
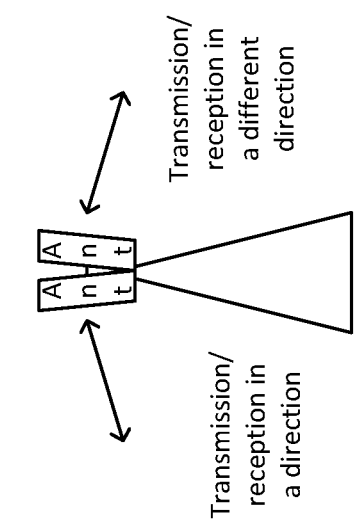
FIG. 1B
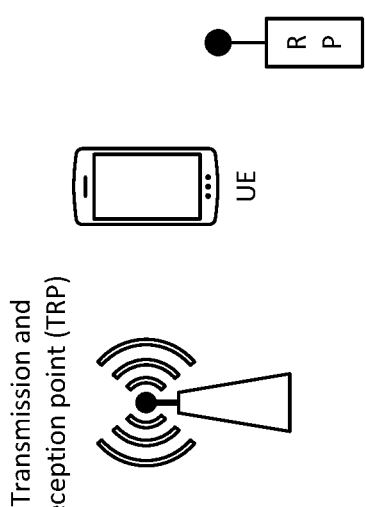
FIG. 1A
FIG. 1

BEAM MANAGEMENT FOR PHYSICAL UPLINK SHARED CHANNELS IN DENSE DEPLOYMENTS

CROSS-REFERENCE TO RELATED APPLICATIONS

This application is based on PCT filing PCT/US2021/036964, filed Jun. 11, 2021, which claims the benefit of U.S. Provisional Patent Application No. 63/038,174 filed on Jun. 12, 2020, entitled "Beam management for physical uplink shared channels in dense deployments," the content of each are hereby incorporated by reference herein.

BACKGROUND

This disclosure pertains to mobile device communications such as, but not limited to, those described in the March 2020 Release 16 versions of 3GPP TS 38.211, TS 38.212, TS 38.213, TS 38.214, TS 38.321, TS 38.331, and TS 38.306.

SUMMARY

It may be beneficial in various scenarios to dynamically switch between codebook-based and non-codebook-based UL transmission, e.g., for SRS and PUSCH. An example scenario is a cell with the UL served by a TRP and an RP. UL transmissions to the TRP may be most efficiently operated using non-codebook-based operation, while UL transmissions to the RP may be most efficiently operated using codebook-based operation.

Various solutions are proposed to efficiently operate dynamic switching between codebook-based and non-codebook-based UL in an UL bandwidth part of a serving cell.

In one case, the UE may be configured with one SRS resource set for codebook-based operation and one SRS resource set for non-codebook-based operation. In one case, the UE may be configured with an SRS resource set for mixed operation, e.g., an enhanced SRS resource set for codebook-based operation.

Solutions for DCI-based dynamic switching between codebook-based and non-codebook-based operation are proposed, include solutions that do not require any additional or changed DCI fields compared to a legacy codebook-based mode of operation. The DCI may include an SRS resource indicator field. In some solutions, the indicated SRS resource may also indicate the mode of operation.

For example, if a multi-port SRS resource is indicated, legacy codebook-based operation is assumed and the field for precoder information and number of layers is interpreted as that. On the other hand, if a single-port SRS resource is indicated, non-codebook-based operation is assumed and the field for precoder information and number of layers is re-interpreted as an SRS resource indicator that supports non-codebook-based operation.

PUSCH repetition is an important tool for reliability enhancement. Various solutions for codebook-based and non-codebook-based transmission across PUSCH occasions are discussed.

In scenarios in which the UE operates both DL-based UL, e.g., non-codebook-based operation, and UL based on SRS for beam management, e.g., codebook-based operation, it may be possible to reduce the required amount of SRS for beam management. This could improve UL resource efficiency and reduce UL interference and UE power consumption. Various solutions propose to focus the transmission of SRS for beam management on directions/panels/beams not covered by the DL-based UL operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIGS. 1A-1C illustrate example points in the context of TRPs and RPs.

DETAILED DISCLOSURE

Figure 2:
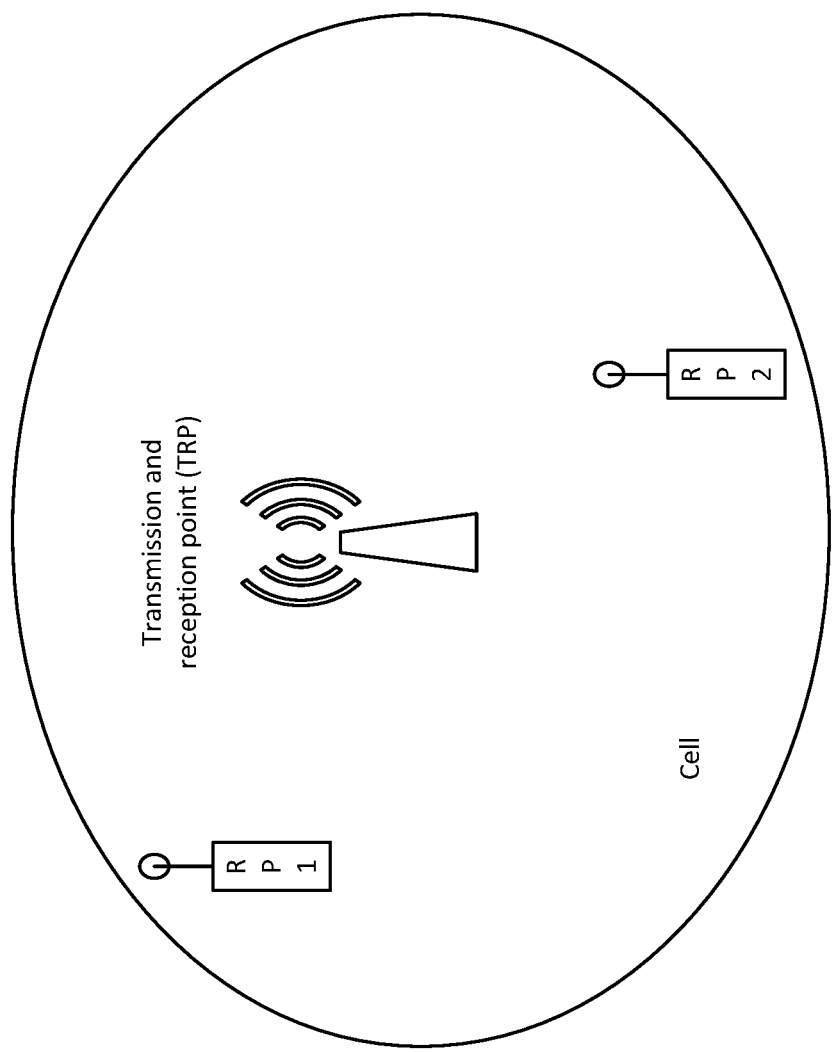
FIG. 2 illustrates an example cell with DL transmission in one TRP and UL reception in three points.

For descriptions of many of the abbreviations used herein, see Table 7 of Appendix 2.

Rx/Tx Beam Correspondence—DL-Based UL

Consider a UE with Rx/Tx beam correspondence (in short beam correspondence) capability, e.g., a UE that may derive an UL Tx beam from a DL Rx beam.

For such a UE, an efficient mode of UL beam management is to have the UE derive the UL Tx beam for an UL transmission from the DL Rx beam used for receiving a DL RS. Such a mode of operation is denoted "DL-based UL" herein.

In DL-based UL, UE transmission of SRS for beam management, e.g., beam sweeping transmission of SRS, may be avoided.

A further requirement for DL-based UL based on beam correspondence is radio channel reciprocity, e.g., that the radio propagation in the DL and the UL is sufficiently similar. This may often be achieved in a TDD system in which DL and UL use (at least almost) the same frequency but multiplexed in time. Sometimes some effects induced in transmitter and/or receiver hardware, e.g., antennas, cables, filters, etc., are included in radio channel in the context of reciprocity. Sufficient radio channel reciprocity may also be possible if DL and UL transmissions occur on different frequencies, as long as the frequency separation is not too large. For example, channel reciprocity within a frequency band may be feasible.

Scenarios with Transmission and Reception Points (TRPs) and Reception Points (RPs)

Wireless communication between one or more UEs and a network is considered herein. The network, e.g., in the vicinity of a particular UE, may include transmission and reception points (TRPs) and/or reception points (RPs). TRPs/RPs may be called "distributed antenna system" (DAS) or "remote radio head" (RRH) in various contexts.

A TRP both transmits signals and/or channels to one or more UEs, usually called the downlink (DL), and receives signals and/or channels from one or more UEs, usually called the uplink (UL). In some cases, a TRP acts as a UE, e.g., when acting as a relay wherein the TRP may act as a UE and interact with another node to receive DL data which is then relayed to a UE, or wherein the TRP may act as a UE and relay UL data received from a UE to a base station.

An RP receives signals and/or channels from one or more UEs (UL). In the context of TRPs and RPs, different points may be geographically separated (see FIG. 1(a) below). In some cases, different points may be located in approximately the same geographical location, but separated in some other way, for example the boresight(s) of the antenna(s) (or antenna element(s)) of a first point are significantly different from the boresight(s) of the antenna(s) of a second point.

An example of the latter is cellular communication site serving multiple sectors in different directions, using different sets of antennas. In this case, the different sets of antennas serving different sectors in different directions from the site may be considered different points. This is illustrated in FIG. 1(b).

In some cases, antennas are arranged in one or more panels, where a panel for example comprises a rectangular panel with N×M antennas, as illustrated in FIG. 1(c) below. In some cases, all or a subset of the antennas of a panel are connected to the same transmitter and receiver (TRX) chain or the same receiver (RX) chain. In some cases, antennas of different panels are connected to different transmitter and receiver (TRX) chains or different receiver (RX) chains. In some cases, different panels, which may or may not be geographically co-located, may correspond to different points. In other cases, different panels may correspond to the same point.

FIGS. 1A-1C illustrate example points in the context of TRPs and RPs. In (a), there is are two geographically separated points in the vicinity of a UE, a TRP and an RP. In (b), there are two TRPs in roughly the same geographical location in the form of two antennas (indicated by 'Ant' in the figure) mounted on the same site, but with main transmission/sensitivity directions (boresights) in significantly different directions. In (c), there are two panels, each associated with a point, each comprising a rectangular array of cross-polarized antenna elements (in the form of 'X's in the figure). Each panel is connected to a different TRX chain in this illustration.

In some cases, a point may operate on multiple frequencies, for example two frequencies. However, in some cases, a site (incl. for example one antenna, an antenna array, a panel, a subset of antennas per frequency) in a geographic location with a particular transmission/reception direction on the multiple frequencies may count as multiple points, at least from the point of view of a UE. One reason may be that the radio signal propagation properties on the different frequencies are different. Another reason may be that the hardware at the network side results in signal transmission and/or reception differences on the different frequencies, for example different oscillators, calibration hardware for beam correspondence, phase shifters for beamforming etc.

A signal/channel received at a TRP/RP may be subject to further processing, e.g., filtering, amplification, down-conversion, analog to digital conversion (sampling), digitally signal processing, demodulation, channel decoding, etc. A signal/channel transmitted at a TRP may have been subject to various processing prior to transmission, e.g., filtering, amplification, peak-to-average power reduction, up-conversion, D/A conversion, digital signal processing, modulation, channel encoding, etc. A subset (e.g., none, some or all) of these operations for reception/transmission may be performed at the TRP/RP while other operations may be performed at one or more other location(s) connected with the TRP/RP, e.g., through a fronthaul or backhaul link, e.g., by optical fiber, copper wire, over-the-air. In a centralized RAN (CRAN) implementation, signal processing for multiple points is performed at a centralized location.

TRP(s) and RP(s) Operating on the Same Frequency Layer

In some scenarios, TRP(s) and/or RP(s) are operating on the same frequency layer, which may correspond to a carrier frequency and a bandwidth, a frequency band, or a range of frequencies. This may imply that a signal transmitted by a UE on the frequency layer may be received by these points (e.g., TRP(s) and/or RP(s)), at least if they are in the vicinity of the UE.

Figure 4:
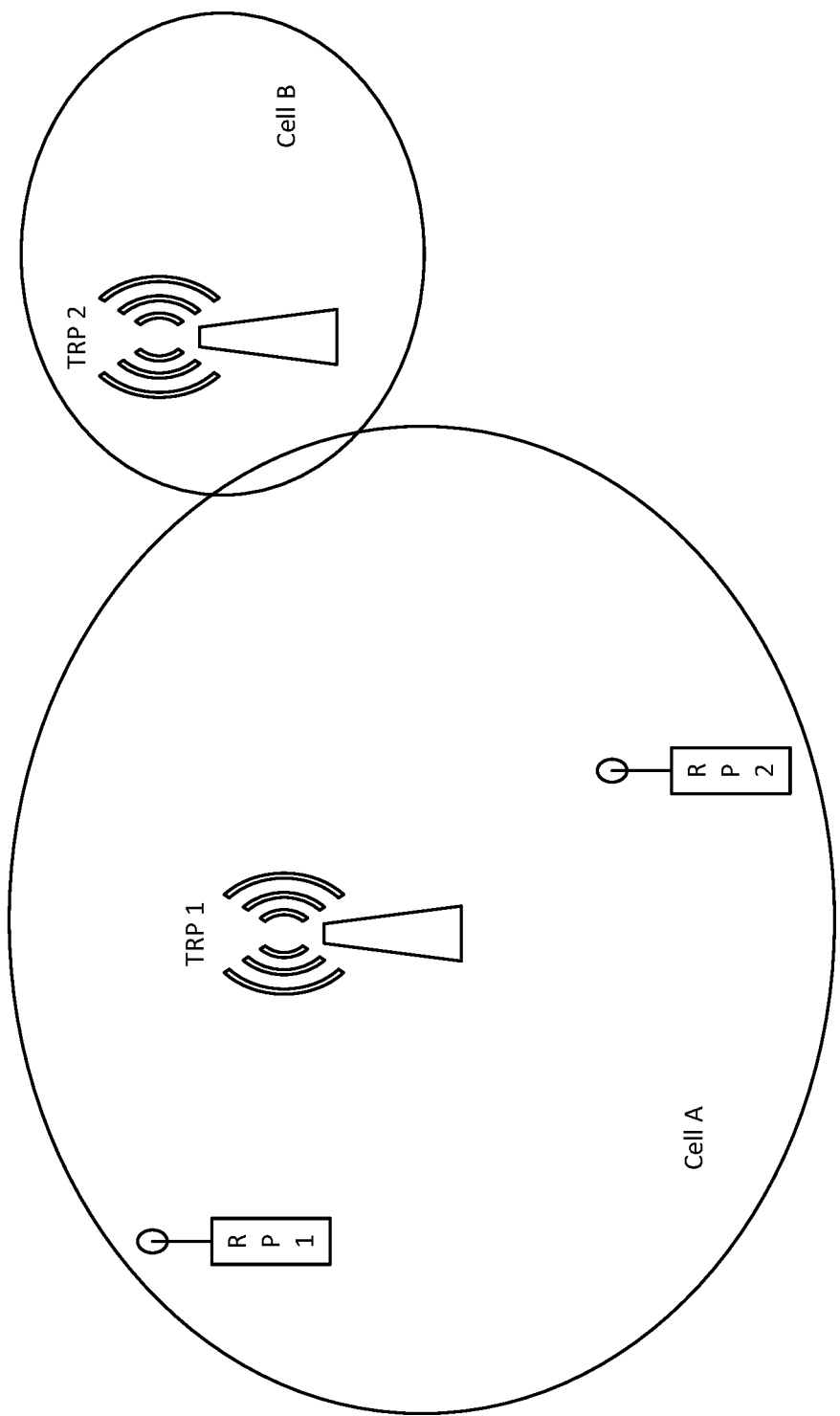
FIG. 4 illustrates an example of two cells, with Cell A being served by multiple points and Cell B being served by a single TRP.

In a cellular system, a point may serve one or more cells on a frequency layer. A TRP serving a cell may imply that the TRP transmits signals associated with the cell, e.g., SSB(s), system information, etc. A point, e.g., an RP, serving a cell may imply that the point receives signals associated with the cell. In some cases, a point serves a single cell on a frequency layer. In some cases, a point serves multiple cells on a frequency layer. In some cases, a point may serve as a TRP for a first cell while serving as an RP for a second cell on the same frequency layer, as illustrated in FIG. 4.

In some cases, multiple points serve a first cell, and in some cases one or more of these points also serve a second cell on the same frequency layer.

Multiple points serving a cell is illustrated in FIG. 2. The cell has more points receiving the UL than points transmitting DL. This "UL dense deployment" may be beneficial for UL coverage and performance in the cell.

FIG. 2 illustrates an example cell with DL transmission in one TRP and UL reception in three points (one TRP and two RPs).

Figure 3:
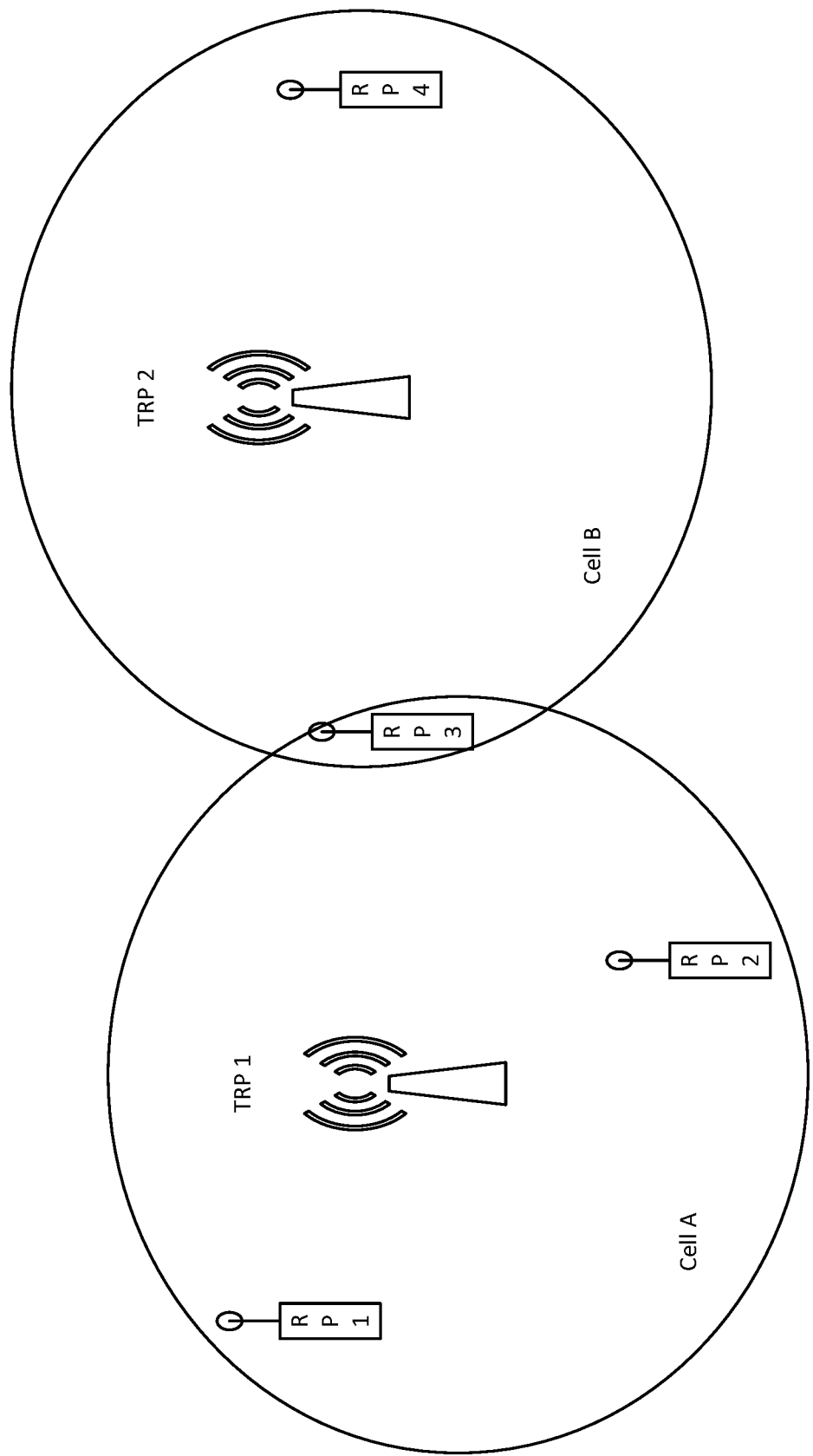
FIG. 3 illustrates an example two cells, each served by multiple points.

In FIG. 3, two nearby cells are illustrated, each served by multiple points. In this example, RP 3 serves both Cell A and Cell B. UL transmissions from some UEs in Cell A as well as UL transmissions from UEs in Cell B are, at least occasionally, received by RP 3.

FIG. 3 illustrates an example two cells, each served by multiple points. In this example, RP3 serves both cells.

FIG. 4 illustrates an example of two cells, with Cell A being served by multiple points and Cell B being served by a single TRP. In this example, TRP 2 serves cell B as a TRP and cell A as an RP.

UL-Only Cell

In some scenarios, TRP(s) and/or RP(s) are operating on different frequency layers or sets of frequency layers, which may be in the same or different frequency bands. A UE may be capable of being simultaneously served by cells on multiple different frequency layers, e.g., using carrier aggregation (CA) and/or dual connectivity (DC).

Figure 5:
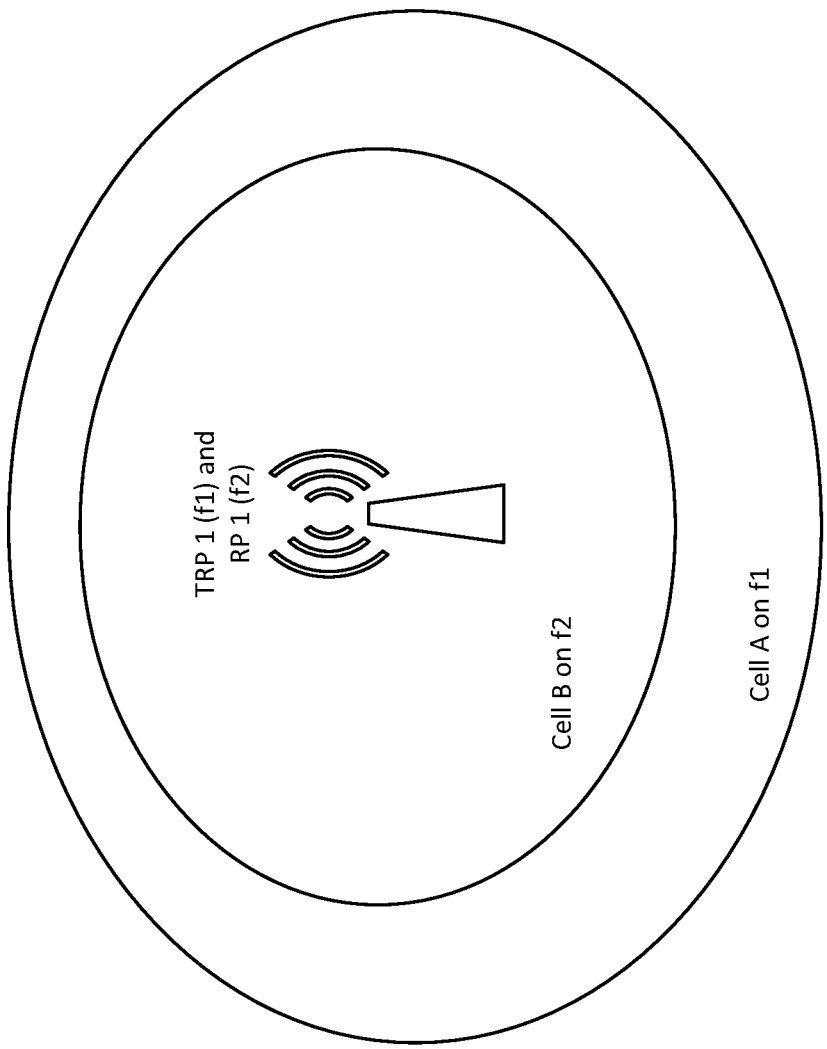
FIG. 5 illustrates an example of a site serving two cells at two frequency layers.

In a cellular system, a site may serve one or more cell(s) on one or more frequency layer(s). In some cases, the site includes a TRP on each of the frequency layers. However, in some cases, a site may provide a TRP for a first cell on a first frequency layer while providing an RP for a second cell on a second frequency layer. This scenario is illustrated in FIG. 5, in which a site serves a cell A on frequency layer f1 and a cell B on frequency layer f2. For cell A, the site provides a TRP while on cell B the site provides an RP. A reason the site does not provide transmission on cell B may be that the site lacks such capabilities, e.g., transmission capabilities for frequency layer f2. Another reason may be that the cell B does not include DL transmissions, e.g., it is an UL-only SCell. Note that being an UL-only SCell may be a matter of configuration, which means that the cell may be UL-only during some time period, while being reconfigured to include DL in some other time period. This could mean that the site could act as a TRP on cell B during such time periods if it has such capabilities.

In some cases, a cell may be configured with a supplemental UL carrier, in addition to the normal UL carrier. The supplemental UL carrier may be in a different frequency band than both the DL and the normal UL of the cell. On the supplemental UL carrier there may be only RP(s) and no TRP(s).

FIG. 5 illustrates an example of a site serving two cells (Cell A and Cell B) at two frequency layers (f1 and f2). On Cell A the site provides a TRP and on Cell B the site provides an RP. Cell B may be an UL-only SCell.

Figure 6:
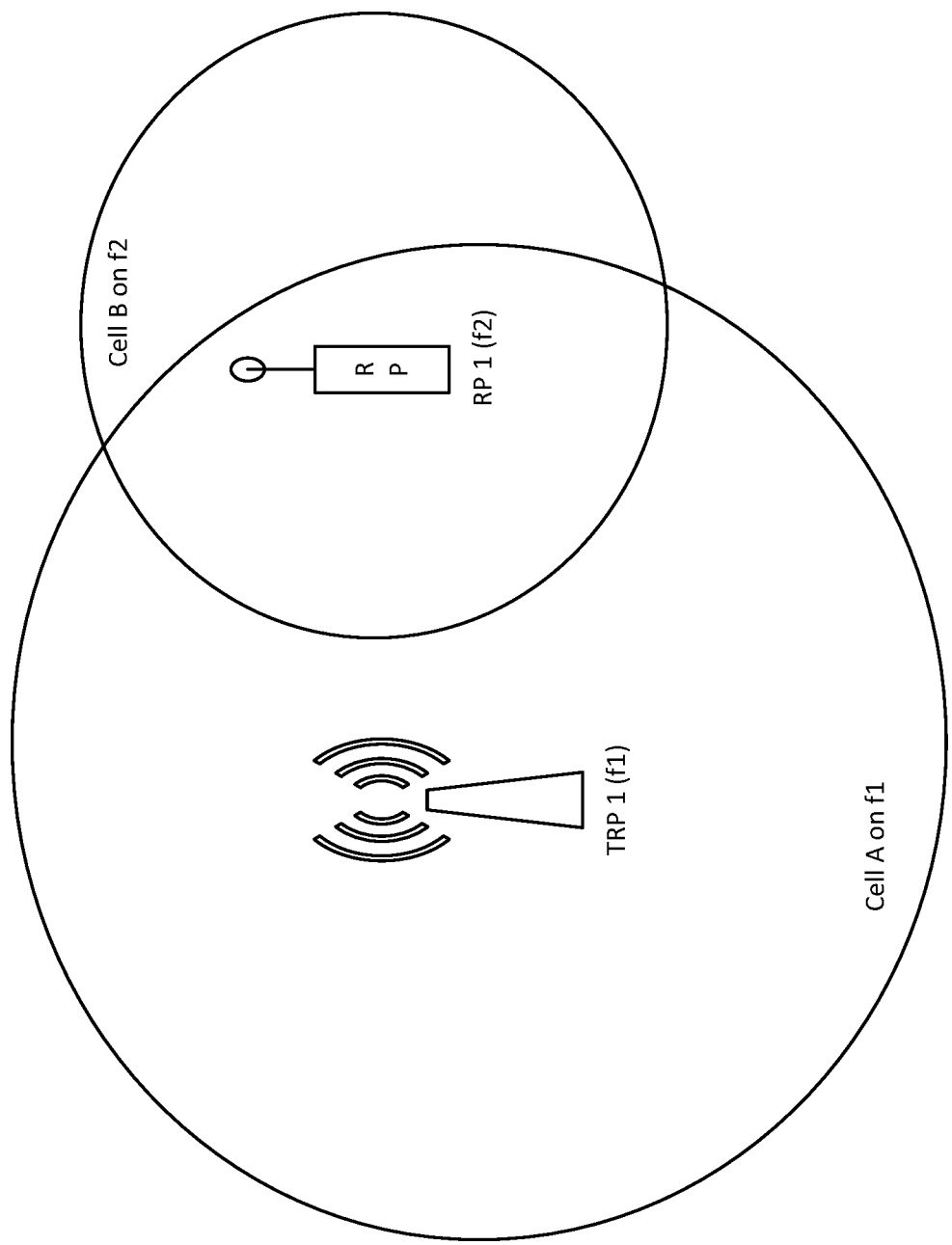
FIG. 6 illustrates an example where TPR 1 serves Cell A on frequency layer f1 and RP 1 serves Cell B on frequency layer f2.

The points serving different cells might not be co-located, as illustrated in FIG. 6.

FIG. 6 illustrates an example where TPR 1 serves Cell A on frequency layer f1 and RP 1 serves Cell B on frequency layer f2. Cell B may be an UL-only SCell.

The different frequencies, e.g., f1 and f2, may be close to each other in frequency, e.g., in the same frequency band, or not close in frequency, e.g., in different frequency bands.

If the frequencies are close enough, the beamforming properties will be similar on the different frequencies. If not, the beamforming properties may be quite different.

For example, consider the scenario in FIG. 5. A good UL beam pair (UE Tx beam and TRP/RP Rx beam) on Cell A is likely a good UL beam pair for Cell B, if f1 and f2 are close enough. However, if f1 and f2 are too far apart, this may not be the case.

Note that for the scenario in FIG. 6, beams derived for communication on Cell A might not be suitable for communication on Cell B, even if f1 and f2 are close, since the points serving the cells are geographically separated.

Non-Codebook-Based (NCBB) PUSCH and SRS in NR

Non-codebook-based beam management for PUSCH and SRS may be used to operate DL-based UL, for UEs that support beam correspondence.

For SRS and PUSCH in NR, DL-based UL may be configured using non-codebook-based (NCBB) PUSCH, whereby The PUSCH configuration (PUSCH-Config) includes a mode configuration (txConfig) set to nonCodebook.

For SRS and PUSCH in NR, DL-based UL may also be configured using non-codebook-based (NCBB) PUSCH wherein SRS resource set with usage "nonCodebook" is configured, and either: an associated CSI-RS (e.g., "associatedCSI-RS" or "csi-RS") is configured for an SRS resource set with usage "nonCodebook"; a spatial relation ("spatialRelationInfo") is configured for the SRS resources in the SRS resource set; or a default spatial relation is applied.

Figure 7A:
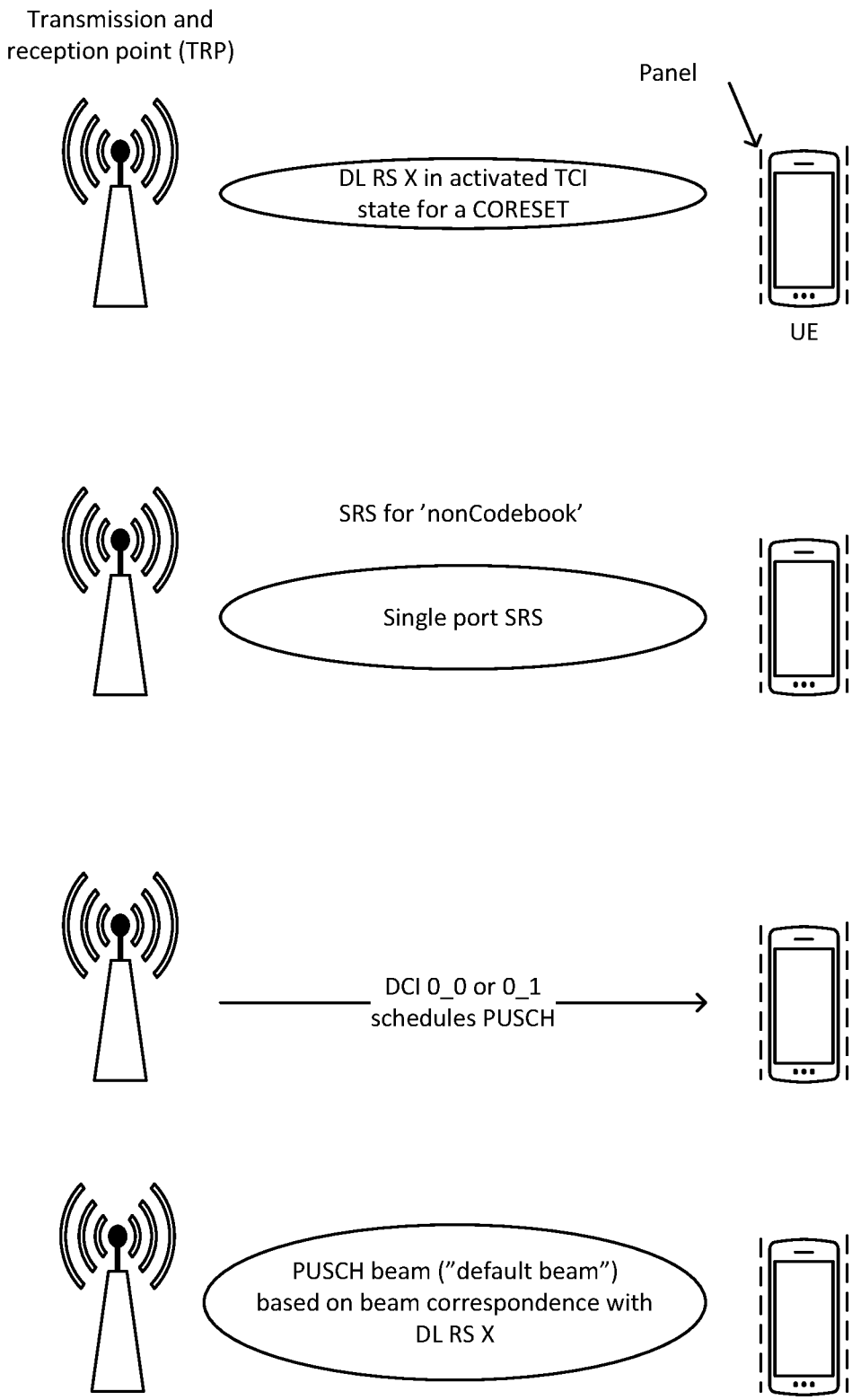
FIGS. 7A and 7B illustrate examples of DL-based UL beam management for NCBB PUSCH.
Figure 7B:
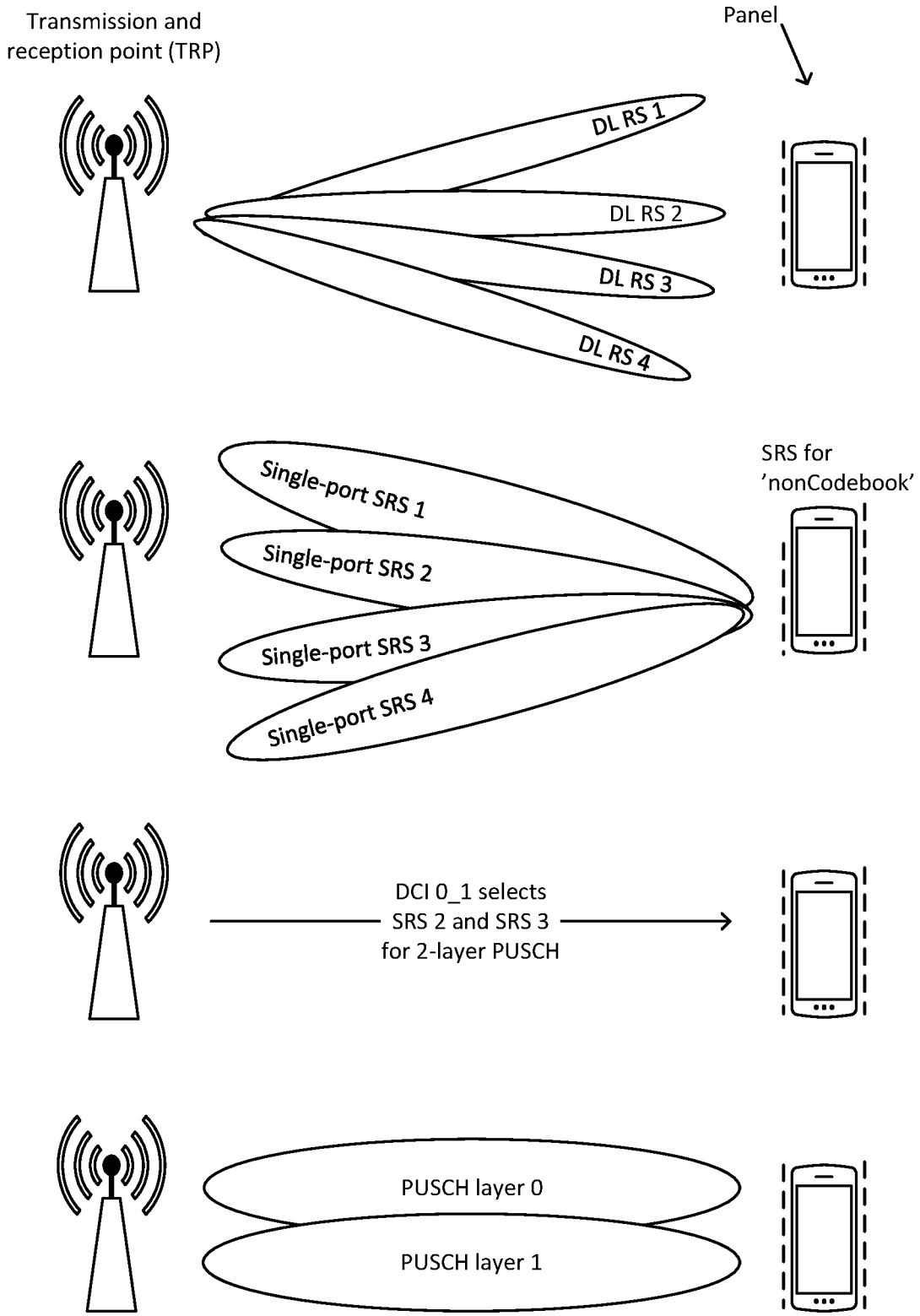

DL-based UL beam management for NCBB PUSCH is illustrated in FIGS. 7A and 7B.

FIG. 7A illustrates DL-based UL based on a default beam. For example, the SRS uses as spatial relation a DL RS in an activated TCI state for a CORESET. When another TCI state, with a different DL RS, is activated for the CORESET, the SRS uses the new DL RS as spatial relation, without any need to reconfiguration etc.

In FIG. 7A operation with a default beam is illustrated, which means that multiple SRS do not need to be transmitted and the DCI does not need to indicate an SRS.

In FIG. 7B, operation without a default beam is illustrated.

FIG. 7B illustrates DL-based UL based on spatial relations configured and activated for SRS based on DL RS. In this example, the SRS resource set for noncodebook includes 4 SRS resources, with for different DL RS as spatial relation. In the example, the network indicates two SRS resources for a non-codebook-based PUSCH transmission, which means that a 2-layer PUSCH is transmitted by the UE, with the first layer being transmitted using the same precoder and spatial domain transmission filter as a first indicated SRS and the second layer being transmitted using the same precoder and spatial domain transmission filter as a second indicated SRS.

Note that different DL RS may correspond to different DL transmit beams. At the UE side, they may correspond to different DL receive beams and therefore different UL transmit beams, based on beam correspondence.

Codebook-Based (CBB) PUSCH and SRS in NR

Codebook-based beam management for PUSCH and SRS may be used to partly operate DL-based UL, for UEs that support beam correspondence.

For SRS and PUSCH in NR, DL-based UL may be configured using codebook-based (CBB) PUSCH, whereby the PUSCH configuration (PUSCH-Config) includes a mode configuration (txConfig) set to codebook.

DL-based UL may be also configured using codebook-based (CBB) PUSCH, whereby an SRS resource set with usage "codebook" is configured, and either a spatial relation ("spatialRelationInfo") is configured for the SRS resources in the SRS resource set, or a default spatial relation is applied.

Figure 8:
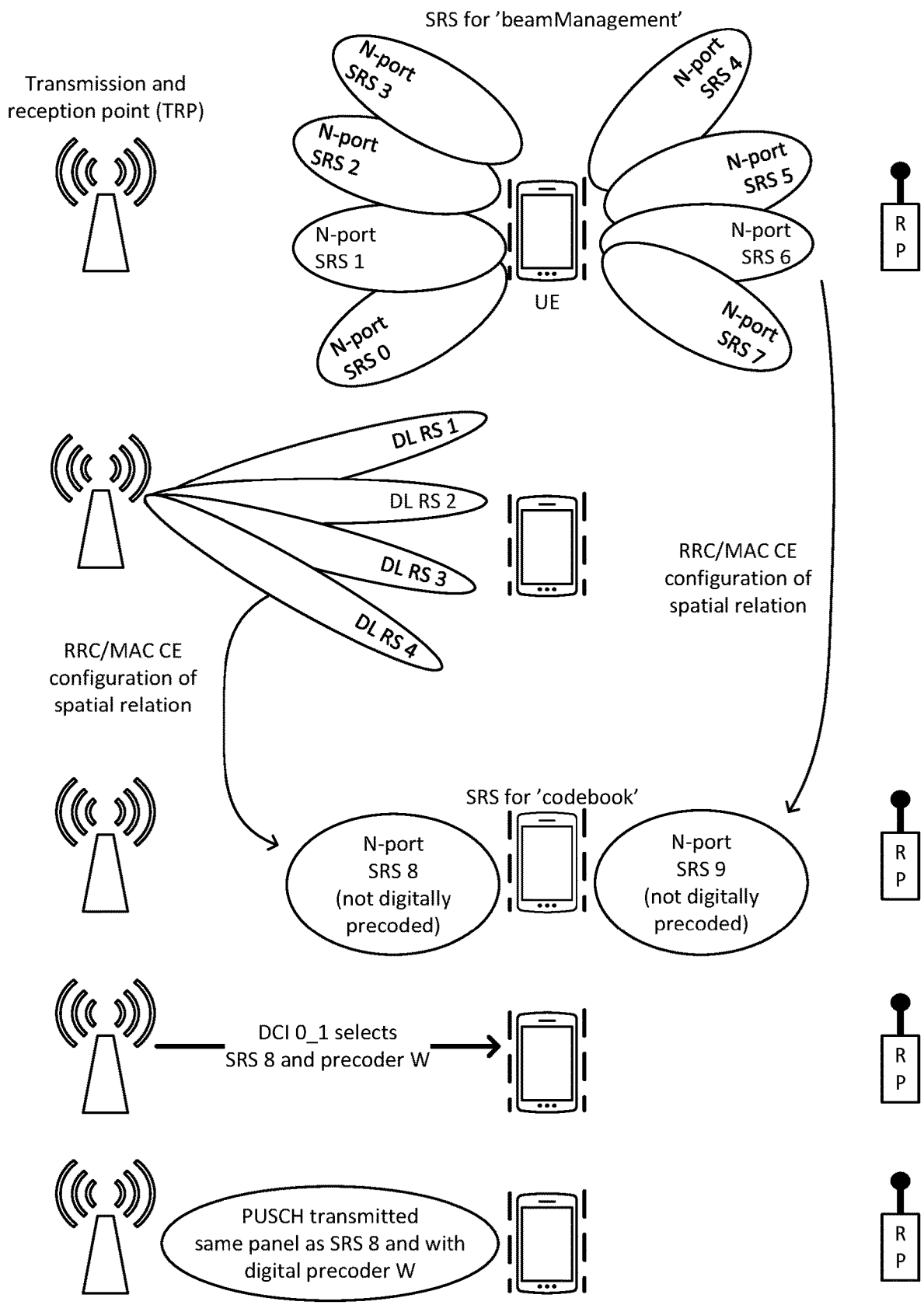
FIG. 8 illustrate an example of partly DL-based UL operation using CBB operation.

Partly DL-based UL beam management for CBB PUSCH is illustrated in FIG. 8. An SRS resource in an SRS resource set for codebook may have a DL RS as an activated spatial relation (e.g., as SRS 8) or another SRS resource (e.g., as SRS 9). Even though the spatial domain transmission filter of SRS 8 is based on the spatial domain reception filter used for receiving a DL RS, the precoder for the corresponding PUSCH needs to be computed at the network and indicated to the UE. Hence, there is not full correspondence between the DL receive beam used to receive a DL RS and the corresponding transmit beam for PUSCH since a heavily quantized precoder (not DL based) is also applied to the PUSCH transmission.

FIG. 8 illustrate an example of partly DL-based UL operation using CBB operation.

Operation of NCBB and CBB SRS and PUSCH in a BWP

In a state-of-the-art system, a UE operates in either NCBB or CBB mode for SRS and/or PUSCH in an UL BWP of a serving cell. UE-specific parameters for an UL BWP may be configured in the IE BWP-UplinkDedicated. The IE BWP-UplinkDedicated may include the setup (configuration) of an IE PUSCH-Config that configures various parameters for PUSCH in the UL BWP.

Furthermore, the IE BWP-UplinkDedicated may include the setup of the IE SRS-Config that configures various parameters for SRS in the BWP. In the IE PUSCH-Config, the UE may be configured with the parameter bcConfig with the values codebook or noncodebook 3GPP TS 38.331, V16.0.0, March 2020. These values correspond to configuration of CBB and NCBB operation of PUSCH, respectively.

In the IE SRS-Config, the UE may be configured with a set of SRS resources for an UL BWP in the form of a list of elements of the IE type SRS-Resource. A configuration of an SRS resource (in IE SRS-Resource) contains an ID, which is configured by the parameter SRS-ResourceId. In the IE SRS-Config, the UE may also be configured with a set of SRS resource sets (SRSRS) for an UL BWP, by including a list of element(s) of the IE type SRS-ResourceSet to be added to the set and/or by including a list of element(s) of the IE type SRS-ResourceSetId to be removed (released) from the set.

An SRS resource set, configured by IE SRS-ResourceSet, includes a set of SRS resource(s). Technically, the SRS resource set includes references to the SRS resources in the form of SRS resource IDs, e.g., a list of elements of the IE type SRS-ResourceId. An SRS resource set is configured to be aperiodic (AP), semi-persistent (SP) or periodic. The usage of an SRS resource set is configured through parameter usage, which may take on one of the following values: 'beamManagement' (BM); codebook (CB or CBB); noncodebook (NCB or NCBB); or antennaSwitching.

In this disclosure, the terms "beamManagement," "codebook," and "noncodebook" are considered.

Terminology

Herein the term "procedure" generally refers to methods of performing operations to achieve particular ends. The term "procedure" is often used in place of "method" to avoid confusion with special meanings of the term "method" in the context of M2M and IoT applications. The steps described for procedures are often optional, and potentially be performed in a variety of ways and a variety of sequences. Hence, herein the term "procedure" should not be interpreted as referring to a rigid set and sequence of steps, but rather to a general methodology for achieving results that may be adapted in a variety of ways.

In this disclosure, the terms spatial filter and spatial domain filter are equivalent and are used interchangeably. Spatial domain transmission filter is the corresponding filter used for transmission and spatial domain reception filter is the corresponding filter used for reception. A spatial domain filter may correspond to flexible analog beamforming such as phase shifting, and/or more static antenna system properties such as antenna radiation patterns. A spatial domain filter may also correspond to a panel, e.g., a two-dimensional antenna array, e.g., two different spatial filters may simply correspond to two different panels. In some cases, a particular spatial domain filter, in some cases in combination with a particular precoding, may correspond to a particular beam.

The term spatial relation is frequently used herein. It may refer to a parameter (e.g., called spatial relation info) that is RRC configured and/or indicated by MAC CE and/or DCI for a target SRS resource, PUCCH resource, and/or one or more PUSCH transmissions. A spatial relation may contain one or more reference RS, which may be an SRS and/or a DL RS such as SSB and/or CSI-RS. In some cases, these DL RS belong to another cell, in which case a spatial relation also may contain a cell ID and any other parameters needed to identify a DL RS in another cell. A spatial relation is mainly used by the UE to determine the spatial domain transmission filter to be used for an UL signal/channel such as SRS or PUSCH. If a reference RS in the spatial relation is an SRS, the target SRS or PUSCH may be transmitted with the same spatial domain transmission filter as the reference SRS. If a reference RS is a DL RS, the UE may use the spatial domain reception filter for receiving the DL RS as spatial domain transmission filter for target SRS or PUSCH.

Herein, the term spatial relation (of an UL signal/channel) may in some cases refer to an active spatial relation, e.g., a spatial relation that would be applied for transmission of the corresponding UL signal/channel. A set of spatial relations may be configured to a UE and a subset of those may be active, e.g., based on indication of spatial relation ID(s) in MAC CE and/or DCI. Configured spatial relations that are not active may be inactive. In some cases, there are no inactive spatial relations.

Default Spatial Relation for PUSCH

For PUSCH scheduled by DCI format 0_0 on a cell, the UE shall transmit PUSCH according to the spatial relation, if applicable, corresponding to the dedicated PUCCH resource with the lowest ID within the active UL BWP of the cell, as described in Clause 9.2.1 of TS 38.213.

For PUSCH scheduled by DCI format 0_0 on a cell and if the higher layer parameter enableDefaultBeamPlFor-PUSCH0_0 is set 'enabled', the UE is not configured with PUCCH resources on the active UL BWP and the UE is in RRC connected mode, the UE shall transmit PUSCH according to the spatial relation, if applicable, with a reference to the RS with 'QCL-Type-D' corresponding to the QCL assumption of the CORESET with the lowest ID.

For PUSCH scheduled by DCI format 0_0 on a cell and if the higher layer parameter enableDefaultBeamPlFor-PUSCH0_0 is set 'enabled', the UE is configured with PUCCH resources on the active UL BWP where all the PUCCH resource(s) are not configured with any spatial relation and the UE is in RRC connected mode, the UE shall transmit PUSCH according to the spatial relation, if applicable, with a reference to the RS with 'QCL-Type-D' corresponding to the QCL assumption of the CORESET with the lowest ID in case CORESET(s) are configured on the CC.

Default Spatial Relation for SRS

When the higher layer parameter enableDefaultBeamPl-ForSRS is set 'enabled', and if the higher layer parameter spatialRelationInfo for an SRS resource, except for an SRS resource with the higher layer parameter usage in SRS- ResourceSet set to 'beamManagement' or for the SRS resource with the higher layer parameter usage in SRS-ResourceSet set to noncodebook with configuration of associatedCSI-RS or for the SRS resource configured by the higher layer parameter (e.g., SRS-for-positioning), is not configured in FR2 and if the UE is not configured with higher layer parameter(s) pathlossReferenceRS, the UE shall transmit the target SRS resource with a default spatial relation.

The default spatial relation may be, for example, with the same spatial domain transmission filter used for the reception of the CORESET with the lowest controlResourceSetId in the active DL BWP in the CC. The default spatial relation may also be with the same spatial domain transmission filter used for the reception of the activated TCI state with the lowest ID applicable to PDSCH in the active DL BWP of the CC if the UE is not configured with any CORESET in the CC.

Example Challenges

A typical mode of operating UL beam management is DL-based UL (e.g., deriving UL Tx beam based on DL Rx beam). This may avoid UE transmission of SRS for beam management, which may be costly in terms of radio resource usage, UL interference and UE power consumption. For PUSCH and SRS in NR, this mode of operation is achieved by non-codebook-based usage of an SRS resource set. However, in a scenario with RPs, the UE cannot use DL-based UL for an UL transmission to an RP, since there are no DL RS transmitted from the RP.

Problem 1

In a scenario with both TRPs and RPs, e.g., UL dense deployment, and a beam correspondence capable UE, how may UL beam management be efficiently operated so that DL-based UL beam management is used for TRPs, and/or SRS based UL beam management is used for RP(s)?

Problem 2

How is the UL beam management operation based on problem 1 reflected in scheduling and transmission of PUSCH, e.g., in terms of indication of transmission scheme, beam selection, TRP/RP selection, etc.?

In particular, what is needed to support both DL-based non-codebook-based PUSCH to TRP(s) and SRS-based codebook-based PUSCH to RP(s) without requiring RRC reconfiguration between the two?

For problem 1 and problem 2, consider the following PUSCH "transmission schemes": dynamic point selection between TRP and RP; semi-persistent selection of TRP and RP; and joint transmission to TRP and RP (e.g., one PUSCH layer to TRP and one PUSCH layer to RP.)

Consider both single- and multi-panel UEs. Consider both transparent multi-panel operation (as in 3GPP NR Rel-15 and 3GPP NR Rel-16) as well as more explicit multi-panel operation (as in 3GPP NR Rel-17 and beyond).

In general, no specific assumption is made regarding the backhaul links connecting the points and nodes. However, some schemes may require that the points are connected with ideal backhaul, e.g., with negligible latency and high throughput. The backhaul assumption is not discussed further, since it is part of the network implementation.

Configuration of CBB and NCBB Operation

A UE may be configured for CBB and NCBB operation of SRS and PUSCH in an UL BWP of a serving cell. For example, there may be an RRC parameter that enables this kind of operation, e.g., enables one or more of the functionalities described below.

One SRS Resource Set with 'Mixed' Usage or Codebook Usage

In order to operate both CBB and NCBB PUSCH in a BWP, one approach is to introduce another SRS resource set (SRSRS) usage, beyond those listed above, for example called 'mixed' or 'cbAndNebb.' For simplicity, the term 'mixed' will be used below. Configuration Example 1 of Appendix 1 shows an example configuration of usage 'mixed.' If the IE mixed_usage-r17 is configured, the usage is 'mixed'.

Configuration Example 1 of Appendix 1 is an example SRS-Config information element with configuration of SRS resource set usage 'mixed.' The "Cond Codebook" conditional presence may indicate that the field is optionally present, Need M, in case of codebook-based transmission, otherwise the field is absent.

In another approach, the usage 'mixed' is added as an option for the same parameter that is used to select other usages, as illustrated in Configuration Example 2 of Appendix 1.

Configuration Example 2 of Appendix 1 is an example SRS-Config information element with configuration of SRS resource set usage 'mixed'

In another approach, mixed operation, and thereby mixed SRSRS, is enabled in PUSCH-Config, as illustrated in Configuration Example 3 of Appendix 1.

Configuration Example 3 of Appendix 1 is an example PUSCH-Config information element with configuration of CBB and NCBB operation ('mixed')

In yet another approach, an SRSRS with usage codebook is configured in such a way that NCBB and CBB operation is enabled. In one example, NCBB and CBB operation may be enabled if a UE is configured with an SRSRS for codebook and with txConfig set to noncodebook. In one example, NCBB and CBB operation may be enabled if a UE is configured with an SRSRS for noncodebook and with txConfig set to codebook.

For brevity, the term CB-SRSRS will be used to denote an SRSRS with usage codebook or mixed, that includes one or more multi-port SRS resources used for CBB operation and also one or more single- or multi-port SRS resources used for some form of NCBB operation as described below. In some cases, the number of ports of a multi-port SRS resource used for some form of NCBB operation is lower than the number of ports of a multi-port SRS resource used for CBB operation. In some cases, the number of ports used for CBB operation is configured to be equal to a number of SRS ports, e.g., through a parameter nrofSRS-Ports in an SRS-Config IE.

Various approaches to using a single- or multi-port SRS resource for some form of NCBB operation, that is, as an SRS resource corresponding to NCBB operation, may include any combination of the following five approaches, for example.

The first is where a single-port SRS resource or a port of a multi-port SRS resource corresponds to multiple antennas. In some cases, the multiple antennas correspond to one or multiple ports of another SRS resource with more antenna ports. In some cases, the multiple antennas do not correspond to one or multiple ports of another SRS resource with more antenna ports.

For example, an antenna port, e.g., a logical antenna port, may be obtained by so-called antenna (or antenna port) virtualization, e.g., that multiple antennas, e.g., physical antennas are combined to obtain an antenna port. In some cases, an antenna port, e.g., of a single-port SRS, may be obtained by virtualizing/combining antennas corresponding to multiple other antenna ports, e.g., of a multi-port SRS. The combination may comprise adding the signals corresponding to the multiple antennas and in some cases applying a phase shift and/or amplitude scaling to one or more of these signals. This may be equivalent to the inner product of a complex-valued vector, containing these phase shift and/or amplitude scaling values, with a complex valued vector, containing the signals. In some cases, it is up to the UE how to implement an antenna port virtualization.

In some cases, the ports of a multi-port SRS resource may each be obtained by virtualization, e.g., by virtualization of an SRS resource with more ports. For example, each port of a 2-port SRS resource is obtained by virtualizing two different ports of a 4-port SRS resource. In some examples, the different ports are obtained by virtualizing disjoint sets of antennas (or antenna ports), while in other examples the different ports are obtained by virtualizing overlapping or partly overlapping sets of antennas (or antenna ports), e.g., by applying different combination/precoding for the different antenna ports.

Virtualization may include combining in the digital domain, e.g., in digital baseband and/or analog domain, e.g., with phase shifters and/or switches in RF.

In some cases, the virtualization, e.g., precoding and/or spatial domain filtering, may be calculated by the UE based on measurement of one or more DL RS.

The second is where network may configure an associated NZP CSI-RS to be used as spatial relation for single- and/or multi-port SRS resource(s) in an SRSRS. The UE may calculate the precoder used for the transmission of an SRS resource in the SRSRS based on measurement of the associated NZP CSI-RS resource.

The third is where the network may configure and/or indicate a reference DL RS as a spatial relation for the single-port SRS whereby the UE shall transmit the single-port SRS resource with the same spatial domain transmission filter used for the reception of the reference DL-RS.

The fourth is where, in some cases, the network may indicate a single-port SRS resource for a single-layer PUSCH transmission or indicate multiple single-port SRS resources for a multi-layer PUSCH transmission. For example, this indication may be done by an SRS Resource Indicator (SRI) in a DCI, whose value corresponds to one or more single-port SRS resources.

Note that for a single-layer PUSCH transmission based on a single-port SRS resource, NCBB and CBB operation may be equivalent, since applying no precoding may be equivalent to precoding with a scalar '1.' Also note that a UE may apply precoding and/or a spatial transmit filter(s) on signals from multiple transmit chains to generate a single-port SRS, where the precoding and/or spatial transmit filter(s) are not explicitly indicated by the network (e.g., through a TPMI value). In other words, the precoding and/or spatial transmit filter(s) used to generate a single antenna port from multiple antenna ports (transmit chains) may be transparent to the network.

The fifth is where, in some cases, the network may indicate a precoder (e.g., TPMI from a codebook) that a UE shall use for transmission of a multi-port SRS resource. One or more of the antenna ports of this SRS resource may be virtualized and/or subject to precoding/spatial filtering calculated by the UE (e.g., based on receiving a DL RS). In other words, the network may indicate precoding that the UE shall apply on top of (e.g., after) antenna port virtualization or UE-determined precoding/spatial filtering. Hence, NCBB operation in the context of this disclosure may also include codebook-based precoding operation to some extent.

For example, consider a multi-port SRS resource with a first antenna port having a spatial relation to a first DL RS and a second antenna port having a spatial relation to a second DL RS. Both of these ports function similarly to single-port SRS resources in NCBB operation. However, the network may also indicate a precoder that the UE shall apply to this multi-port SRS resource.

A CB-SRSRS could be configured to include SRS resources corresponding to NCBB operation and/or SRS resources corresponding to CBB operation. In one example, such a CB-SRSRS may include single-port SRS resources and/or multi-port SRS resources. For instance, single-port SRS resources included in the set may correspond to NCBB operation while multi-port SRS resources may correspond to CBB operation.

In some cases, a single-port SRS resource may correspond to either NCBB or CBB operation. For instance, a CB-SRSRS includes a multi-port SRS resource that corresponds to CBB operation and a single-port SRS resource that also corresponds to CBB operation. For example, a single-port SRS resource corresponding to CBB operation may correspond to full-power UL transmission, as further described below.

Full-power UL transmission may be configured for an UL BWP of a UE that is configured for non-coherent or partial-coherent PUSCH CBB transmission (e.g., ul-FullPowerTransmission-r16 in IE PUSCH-Config is set to 'full-power', 'fullpowerMode1' or 'fullpowerMode2', and codebookSubset in IE PUSCH-Config is set to 'nonCoherent' or 'partialCoherent'). Full power mode 1 may imply that the UE may perform full-power PUSCH transmission for a certain precoding codebook subset, which may have been indicated to the network as a UE capability. Full power mode 2 may imply that the UE may be configured with SRS resources with different number of antenna ports in an SRSRS for codebook (details and constraints may be part of a UE capability) and that an SRS resource in the SRSRS with fewer antenna ports than the maximum number within the set may correspond to full-power PUSCH transmission. Full power mode 2 may also imply full-power PUSCH transmission for a certain precoding codebook subset, similar as for full power mode 1. The mode 'fullpower' may imply that the UE may perform full-power PUSCH transmission, regardless of precoder or indicated SRS. Note that full-power PUSCH transmission may be performed only if required by the UL power control. Including a single-port SRS resource in an SRS resource set for codebook may be supported only for a subset of the full-power UL transmission configurations, e.g., only for 'fullpowerMode2.' In some implementations, such a single-port SRS resource may be transmitted from one of the UE's transmitter chains (e.g., including one PA) capable of full power transmission for the UE power class, e.g., a transmitter chain capable of 23 dBm transmission for a UE of power class 3. In some implementations, such a single-port SRS resource may be transmitted from multiple UE transmitter chains (e.g., each including one PA), where each transmitter chain is not capable of full power transmission, but the combined power of the multiple transmitter chains may reach the full power of the power class. For example, the UE may have two 20 dBm transmitter chains, which have a combined maximum transmit power of 23 dBm. The two 20 dBm transmitter chains may correspond to a two-port SRS resource in an SRS resource set for codebook, e.g., a first SRS antenna port is transmitted from the first transmitter chain and the second SRS antenna port is transmitted from a second transmitter chain. A single-port SRS resource, in the same SRS resource set for codebook, corresponding to full-power transmission could then correspond to transmission from both transmitter chains. As also described above, this may be called "virtualization" or "antenna port virtualization." In other examples, the UE has more than two transmitter chains and/or antenna ports, e.g., four. In this case, these transmitter chains may be virtualized to a single-port SRS resource and/or a multi-port SRS resource. For instance, a UE with four transmitter chains may be configured with a two-port SRS resource where both ports are virtualized, e.g., are transmitted from two or more transmitter chains. In another example, a sub-set of the ports are virtualized, and the rest are not virtualized, e.g., those ports are each transmitted from a single transmitter chain. For example, a first single-port SRS resource is transmitted from a 23 dBm transmitter chain and a second single-port SRS resource is transmitted from two 20 dBm transmitter chains.

In some cases, a UE may report to the network a capability of NCBB operation based on one or more single-port SRS resources in a CB-SRSRS, where the one or more single-port SRS resources also support full power UL transmission. In some cases, a UE may report to the network a capability of NCBB operation based on one or more multi-port SRS resources in a CB-SRSRS, where the one or more multi-port SRS resources also support full power UL transmission.

In some cases, the UE may report that NCBB operation based on a CB-SRSRS is supported regardless if the single-port and/or multi-port SRS resource(s) is configured for full-power UL transmission or not. In some cases, the UE may report that NCBB operation based on a CB-SRSRS is supported if the single-port and/or multi-port SRS resource(s) is not configured for full-power UL transmission. In some cases, a UE may report that NCBB operation based on a CB-SRSRS is supported and that full, partial and noncoherent codebooks for PUSCH transmission is supported. A UE with non-coherent codebook capability might not be able to guarantee phase coherence between antenna ports for UL transmission. A UE with partial coherent codebook capability may guarantee phase coherence between some pair(s) of antenna ports, but not between other pair(s) of antenna ports. A UE capable of full coherence may guarantee phase coherence across all its antenna ports. Some precoders are suitable only for fully coherent UEs. Some precoders are suitable for fully coherent and partially coherent UEs. Some precoder, e.g., precoders that select a single antenna port, are suitable for fully, partially coherent, and non-coherent UEs. Hence, corresponding codebooks or codebook subsets are defined. The UE may indicate to the network its UL coherence capability and the network may configure the UE correspondingly. Note that a UE may be configured with a lower capability than the capability that it reports, e.g., the network may configure a UE with a codebook subset for non-coherent UEs even if the UE reports a fully coherent codebook capability.

Herein, the UE capability reporting of what it supports may be per UE, per band combination, per band, per feature set (per band per band combination) and/or per feature set per component carrier (per CC per band per band combination)

In some cases, a CB-SRSRS is configured to include a multi-port SRS resource that corresponds to CBB operation and a single-port SRS resource that also corresponds to CBB operation, even if the UE is not configured with full-power UL transmission, e.g., by ul-FullPowerTransmission-r16. Note that a UE not being configured for full-power UL transmission does not imply that the UE isn't capable of full-power UL transmission or that the UE doesn't transmit at full power (according to the UE power class) in some situations. As discussed above, an SRS resource, e.g., a single-port SRS resource, corresponding to CBB operation may also correspond to NCBB operation in some form.

In some cases, an SRS resource in a CB-SRSRS may be either for full-power transmission (UL) or for NCBB operation. In some cases, an SRS resource in a CB-SRSRS may be for both full-power transmission (UL) and for NCBB operation.

For example, an SRS configuration may include an optional second list of SRS resource IDs, which could correspond to SRS resources for NCBB operation, as illustrated in Configuration Example 4 of Appendix 1. The SRS resources indicated in the second list may be limited to single-port SRS resources. The "Cond Codebook" conditional presence may indicate that the field is optionally present, Need M, in case of codebook-based transmission, otherwise the field is absent. "Need M" is used to enable delta signaling for (configuration) fields that are maintained by the UE when absent from subsequent configuration message. In one example, the optional presence is conditioned on usage 'mixed.' The condition on codebook/mixed usage may also be absent in other examples, in which case just a need code may be applied instead, e.g., "Need M."

In one example, the SRS resource set usage is 'mixed' if the second list is configured. In this case, the UE might not need to be configured with an SRSRS usage set to 'mixed' and/or txConfig set to 'mixed,' as discussed above. In another example, the SRSRS usage is still codebook if the second list is configured.

Configuration Example 4 of Appendix 1 is an example SRS-Config information element with a second list of SRS resource IDs.

In some cases, e.g., if the UE supports that a single-port SRS is used for both full-power transmission and NCBB operation, the same SRS resource ID may be included in both the legacy SRS resource ID list (e.g., srs-ResourceIdList) and the second list. If so, this may imply that the SRS resource is used both for full-power UL transmission (e.g., if this is configured) as well as for NCBB operation.

In some cases, e.g., if the UE does not support that a single-port SRS is used for both full-power transmission and NCBB operation, the same SRS resource ID may not be included in both the legacy SRS resource ID list (e.g., srs-ResourceIdList) and the second list.

The UE may report to the network its capability of maximum number of SRS resources in a CB-SRSRS (A), for example 2 or 4 SRS resources, e.g., using the maxNumber-SRS-ResourcePerSet UE capability parameter or an "UL full power transmission mode 2" UE capability IE or parameter. Furthermore, a UE may also report to the network its capability of maximum number of SRS resources in a CB-SRSRS that correspond to NCBB operation (B). In one example, the maximum number B is fixed or derived from the maximum number A, e.g., B=1 if A=2 or B=2 if A=4, etc.

In some cases, the UE may report to the network its capability of maximum number of single-port SRS resources in a CB-SRSRS for the purpose of full-power UL transmission (C), for example 1 or 2 single-port SRS resources. In some cases, the reported maximum number B should be less than or equal to C. In some cases, the maximum number B is derived from the maximum number C, e.g., B=1 if C=2, etc. In some cases, the maximum number B is equal to the maximum number C.

In some cases, a UE may indicate to the network a group of precoders for which it supports full-power UL transmission. Such a group may be a subset of a codebook used for CBB PUSCH transmission. For example, a UE that supports 4-port SRS resources for CBB operation may indicate a subset of precoders from a codebook for four ports. Such precoders could be used if the network indicates a 4-port SRS resource in an SRI. In another example, a UE that supports 4-port SRS resources for CBB operation may indicate a subset of precoders from a codebook for two ports. Such precoders could be used if the network indicates a 2-port SRS resource in an SRI.

Similarly, in some cases, a UE may indicate to the network a group of precoders for which it supports NCBB operation. In some cases, such a group is limited to precoders for fewer antenna ports than the number of SRS antenna ports the UE supports for CBB operation. For example, a group of precoders for two antenna ports may be reported by a UE that supports 4-port SRS resources for CBB operation. It may seem contradictory to support codebook-based precoding for NCBB operation, but as also discussed above, NCBB operation may be combined with codebook-based precoding in some cases. For example, consider a UE that supports 4-port SRS resources for CBB operation. A 2-port SRS resource is included in a CB-SRSRS, in addition to a 4-port SRS resource. One or both antenna ports of the 2-port SRS resource is obtained by NCBB operation, e.g., the precoding and/or spatial domain transmit filter for an antenna port is based on measurement of a DL RS, e.g., an associated NZP CSI-RS or according to a spatial relation. In some cases, the precoding and/or spatial domain transmit filters for the two antenna ports are based on measurement of two different DL RS, e.g., two separately configured associated NZP CSI-RS or two separate spatial relations. The precoding applied to the 2-port SRS resource may be in the form of port selection without additional phase shift, e.g., precoding vectors $[1\ 0]^T$, $[0\ 1]^T$, and/or $[1\ 1]^T$ for single-layer transmission and $$\begin{bmatrix} 1 & 0 \\ 0 & 1 \end{bmatrix}$$

for two-layer transmission, where $[\ ]^T$ denotes vector transpose. Note that such operation based on a two-port SRS resource may be equivalent to selection of one or two single-port SRS resources. In other cases, also additional phase shifts may be applied, e.g., according to the precoding codebooks defined in [1].

The multiple different RSs, e.g., multiple DL RSs or multiple SRSs or a mix thereof, used as spatial relations for multiple different antenna ports of a multi-port SRS may be configured and/or indicated in various ways.

For example, an SRS-Resource may be configured with an optional second spatial relation (e.g., a second SRS-SpatialRelationInfo IE). The first spatial relation may be applied to a first set of SRS antenna ports, e.g., a lowest indexed antenna port, while the second spatial relation may be applied to a second set of SRS antenna ports, e.g., a second lowest indexed antenna port. In one example, a first spatial relation is applied to antenna ports within a first CDM group, the second spatial relation is applied to antenna ports within a second CDM group, etc.

In another example, a spatial relation (e.g., a new SRS-SpatialRelationInfo-r17) may be configured/indicated including multiple RSs. These multiple RSs may be ordered, e.g., such that one of the RSs is a first RS, one of the RSs is a second RS etc., e.g., by the order/sequence of their configuration in a spatial relation. A first RS may serve as a spatial relation for a lowest numbered antenna port, a second RS may serve as a spatial relation for a second lowest numbered antenna port, etc.

SRS spatial relations may be updated via a MAC CE, e.g., SP SRS Activation/Deactivation MAC CE, AP SRS spatial relation Indication MAC CE or CC list-based SRS Activation/Deactivation MAC CE, by assigning a currently reserved bit to indicate whether a first or a second spatial relation is updated. In one example, if a second spatial relation is indicated by a MAC CE for an SRS resource that is not configured with two spatial relations, the indication is ignored for the SRS resource. In another example, the indicated second spatial relation is added as a second spatial relation to the SRS resource that previous included just a single spatial relation.

In some cases, an associated NZP CSI-RS may be configured for a CB-SRSRS. In some cases, an NZP CSI-RS may be configured and then indicated in a DCI that triggers an aperiodic SRSRS. An example configuration of associated NZP CSI-RS for CB-SRSRS is shown in Configuration Example 5 of Appendix 1. The conditional presence "Cond XYZ" may be "Cond Codebook," e.g., the field is optionally present, Need M, in case of codebook-based transmission, otherwise the field is absent. It may also be optionally present if the UE is configured with NCBB operation, e.g., if a second SRS resource list is configured as in Configuration Example 4 of Appendix 1 and/or if a mixed SRS resource set is enabled as in Configuration Example 1 of Appendix 1. In this example, the same parameter is used to configure associated CSI-RS if the SRSRS is semi-persistent or periodic and CSI-RS if the SRSRS is aperiodic. For the legacy CSI-RS/associated CSI-RS, however, these have separate parameters within the resourceType CHOICE alternatives.

Configuration Example 5 of Appendix 1 is an example SRS-Config information element with configuration of associated NZP CSI-RS for CB-SRSRS.

In some cases, the associated NZP CSI-RS is applicable to all SRS resources in the CB-SRSRS. In some cases, the UE may be configured/indicated with both an associated NZP CSI-RS for a CB-SRSRS and spatial relations for one or more SRS resources in the CB-SRSRS. In some cases, the associated NZP CSI-RS may be applicable to the SRS resources in the CB-SRSRS, e.g., single-port SRS resources, which are not configured/indicated with a spatial relation.

Consider the following example. First, a UE reports that it supports NCBB-operation in a CB-SRSRS and supports up to 4-port SRS resources for CBB operation. For example, the UE might also report that it supports full, partial and noncoherent codebook, but does not report a capability regarding full-power UL transmission, e.g., since full-power CBB UL transmission is anyway supported for fully coherent capable UEs.

Second, the network configures one or more SRSRS with usage 'beamManagement' (BM). Third, the network configures a CB-SRSRS with SRS resources, e.g., SRS resource 0 for a 4-port SRS resource, and SRS resource 1 for a 1-port SRS resource. Fourth, at the RP, the network measures SRS resources from the SRSRS for BM.

Fifth, for SRS resource 0, the network configures/indicates a spatial relation with the SRS resource in the SRSRS for 'beamManagement' that was best for reception at the RP.

For SRS resource 1, the network configures/indicates a spatial relation with a DL RS or configures/indicates an associated NZP CSI-RS or does not configure a spatial relation so that the default spatial relation is applied.

Sixth, if the network schedules PUSCH transmission to the RP, then

DCI indicates SRS resource 0 through the SRI. DCI indicates a 4-port precoder. The UE transmits PUSCH to the RP using the spatial domain transmit filter of SRS resource 0 and the indicated 4-port precoder.

Seventh, if the network schedules PUSCH transmission to the TRP, DCI indicates SRS resource 1 through the SRI. The UE transmits PUSCH to the TRP using the spatial domain transmit filter and precoder derived from measurement of a DL RS.

Two SRS Resource Sets

In order to operate both NCBB and CBB PUSCH in a BWP, the UE may for example be configured with an SRS resource set (SRSRS) with usage noncodebook and an SRSRS with usage codebook in an UL BWP. Such a configuration may enable various functionality for CBB and NCBB operation described herein.

A UE may report that it supports being configured with an SRSRS with usage noncodebook and an SRSRS with usage codebook in an UL BWP. The UE may report the maximum number of single-port SRS resources in an SRSRS for noncodebook if it is also configured with an SRSRS for codebook. The UE may report the maximum number of SRS resources in an SRSRS for codebook, e.g., including both single- and multi-port SRS resources, if it is also configured with an SRSRS for noncodebook. The UE may report the maximum number of SRS resources combined in an SRSRS for codebook and in an SRSRS for noncodebook, e.g., unique SRS resources combined in the two sets.

In some cases, if a UE is configured with an SRSRS for codebook, it may be configured with an SRSRS for noncodebook, but the SRS resource IDs of the one or more single-port SRS resource(s) in the SRSRS for noncodebook need to be included in the SRSRS for codebook. In other words, the SRSRS for codebook may include SRS resources not included in the SRSRS for noncodebook, e.g., one or more multi-port SRS resources, but the SRSRS for noncodebook may not include single-port SRS resources that are not already included in the SRSRS for codebook. In some cases, this is similar to the example with a second SRS resource list (see Configuration Example 4 of Appendix 1), but with the SRSRS for noncodebook playing the role of the second list. Furthermore, the UE may expect that the other parameters in the SRSRS for noncodebook, e.g., resourceType, p0 (e.g., a power level for SRS power control), etc., need to be the same as for the SRSRS for codebook. An exception may be that the SRSRS for noncodebook may be configured with CSI-RS or associated CSI-RS, which the SRSRS for codebook may not. In this way, the associated CSI-RS may be applicable to a subset of the SRS resources in the SRSRS for codebook, namely the single-port SRS resources that are also in the SRSRS for noncodebook. The technical specification may preclude that these single-port SRS resources are configured with both associated CSI-RS and a spatial relation.

In one case, an SRSRS for codebook includes a single-port SRS resource that follows an associated CSI-RS (e.g., configured in the SRSRS for noncodebook), an SRS resource that follows a default spatial relation (e.g., it has no configured spatial relation or associated CSI-RS and default spatial relation is enabled) and an SRS resource that follows a configured/indicated spatial relation (e.g., to an SRS for BM). Such a configuration could be useful in a scenario in which the UE may transmit UL to two TRPs and one RP. For instance, the associated CSI-RS may be transmitted from a first TRP, the default spatial relation may be based on a DL RS transmitted from a second TRP and the configured/indicated spatial relation may be adjusted for transmission to the RP.

However, the number of different spatial relations in an SRSRS, e.g., for codebook, may be limited, e.g., by a UE capability. For example, at most two different spatial relations may be active for an SRSRS, where a default spatial relation could count as one, an associated CSI-RS, different from the default spatial relation, could count as another one, and a spatial relation including a different RS than the previous two, e.g., an SRS for BM, could be counted as yet another one.

In some cases, one or more SRS resources from two different SRSRSs may be indicated using the same SRI field in a DCI. For example, the two different SRSRSs may be one SRSRS for codebook and one SRSRS for noncodebook.

In some cases, the bit width of this SRI field is based on NCBB operation, e.g., the number of bits is $$\left\lceil \log_2\left(\sum_{k=1}^{\min\{L_{max}, N_{SRS}\}} \binom{N_{SRS}}{k}\right)\right\rceil,$$

where $L_{max}$ is the configured or UE-reported maximum rank and $N_{SRS}$ is the number of SRS resources, e.g., the number of SRS resources combined in the two SRSRSs or the number of unique SRS resources combined in the two SRSRSs.

In some cases, the bit width of this SRI field is based on NCBB operation for the SRSRS for NCBB operation and CBB operation for the SRSRS for CBB operation. For example, the number of bits is $$\left\lceil \log_2\left(\sum_{k=1}^{\min\{L_{max}, N_{NCBB}\}} \binom{N_{NCBB}}{k} + N_{CBB}\right)\right\rceil,$$

where $N_{NCBB}$ is the number of SRS resources in the SRSRS for noncodebook and NCBB is the number of SRS resources in the SRSRS for codebook. The first indices for the SRI may correspond to indication of SRS resource in the SRSRS for codebook and the following indices may correspond to indication of SRS resource(s) in the SRSRS for noncodebook, or vice versa. One example is illustrated in Table 1 of Appendix 2, with $L_{max}=2$ and $N_{NCBB}=N_{CBB}=2$, which results in a 3-bit SRI field.

Scheduling Enhancements

In the case that SRS resources in the SRSRS for noncodebook are also included in the SRSRS for codebook,' the DCI carrying an UL grant (e.g., DCI format 0_0, 0_1 or 0_2) could for instance be based on CBB operation, e.g., the bit-widths and interpretations of DCI fields would be based on CBB operation, e.g., expressed in a specification by "higher layer parameter txConfig=codebook". Also, for cases with a 'mixed' usage SRSRS, DCI field bit-widths and interpretations may be as for CBB operation. The examples below in which SRSRS for codebook are mentioned are also applicable to SRSRS for mixed.

For NCBB and CBB operation based on an SRSRS with usage codebook, DCI field bit-widths and interpretations may follow CBB operation. All these cases and examples may be applied to the following schemes for selecting multiple SRS resources, e.g., for NCBB operation, based on existing DCI fields and bit-widths for CBB operation. Various solutions are based on interpretation or re-interpretation of the field for "precoding and number of layers," e.g., in DCI format 0_0, 0_1 or 0_2.

For CBB operation, the number of bits for the SRI field in a DCI could be based on the number of SRS resource in the SRSRS for codebook. The number of bits for the DCI field "precoding and number of layers" could be based on the SRS resource with the highest number of antenna ports in the SRSRS for codebook.

The SRI could indicate one of the SRS resources in the SRSRS for codebook. If the SRI indicates an SRS resource with fewer antenna ports than the SRS resource with the highest number of antenna ports in the set, the number of bits needed for the precoding and number of layers field would typically be less. For example, the precoding and number of layers field may be 6 bits for 4 antenna ports and fully and partially and non-coherent codebook subset (e.g., parameter codebookSubset is set to 'fullyAndPartialAndNonCoherent'). If the SRI indicates an SRS resource with 2 antenna ports for example, only 4 bits of those 6 bits would be needed for the indication of precoder and number of layers. If the SRI indicates an SRS resource with 1 antenna ports for example, 0 bits of those 6 bits would be needed for the indication of precoder and number of layers. The reason is that no precoding is done for a 1-port signal/channel and only single-layer transmission is supported. Note that the field for precoder (or precoding) and number of layers may for instance be called "precoding information and number of layers" in a specification.

Figure 14:
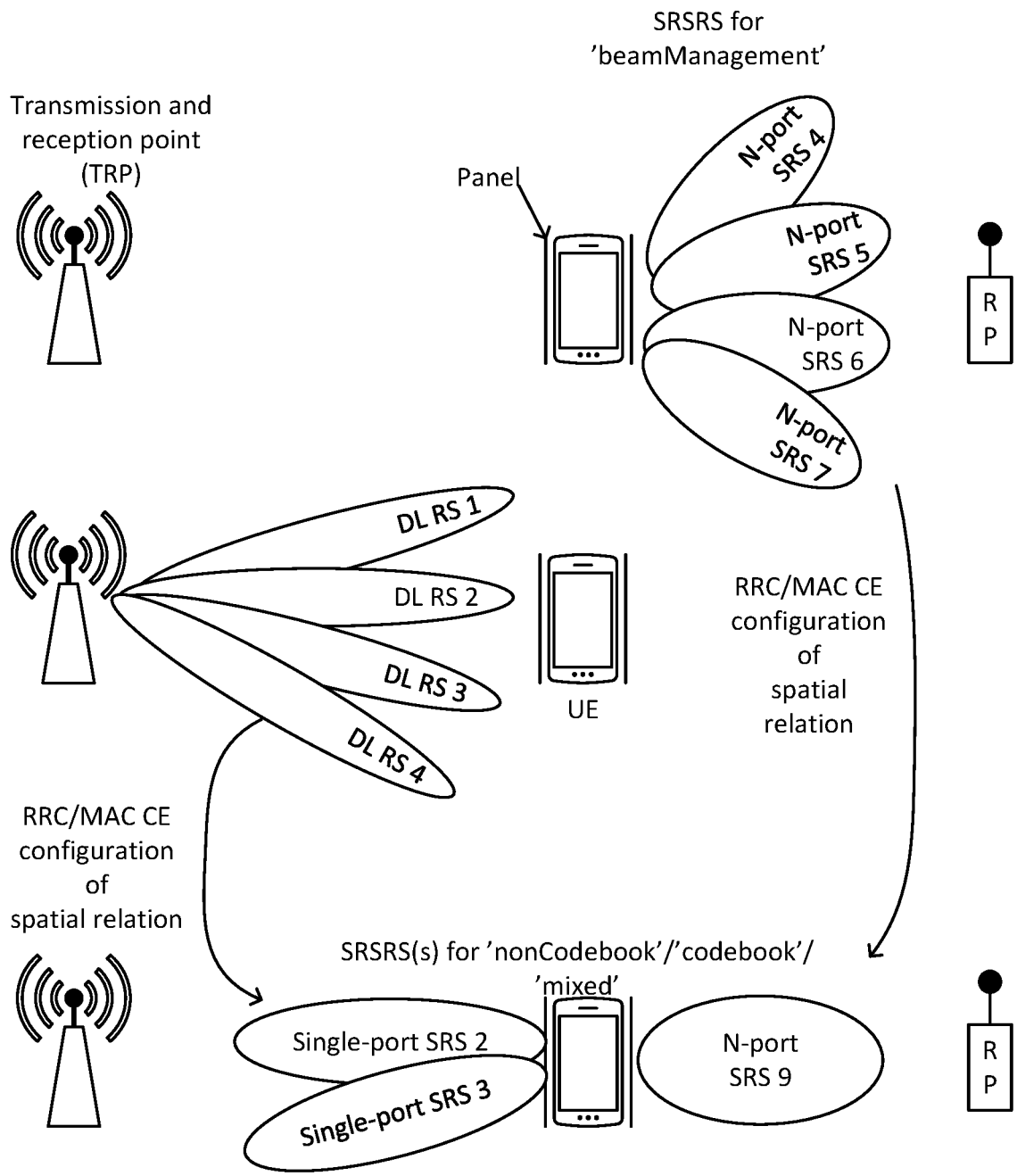
FIG. 14 illustrates example scenarios with SRS for BM transmitted from one panel, in this case in the direction of the RP.

The bits in the precoding and number of layers field that are not needed for precoding and number of layers indication for the indicated SRS resource may be handled in various ways, e.g., as discussed below. The bits that are not needed ("not needed" bits) could be for example the MSBs or the LSBs of the field. For brevity, let Z denote the "not needed" bits, or a subset thereof, and let S denote the SRS resource indicated by the SRI. This is illustrated in FIG. 14.

Figure 9:
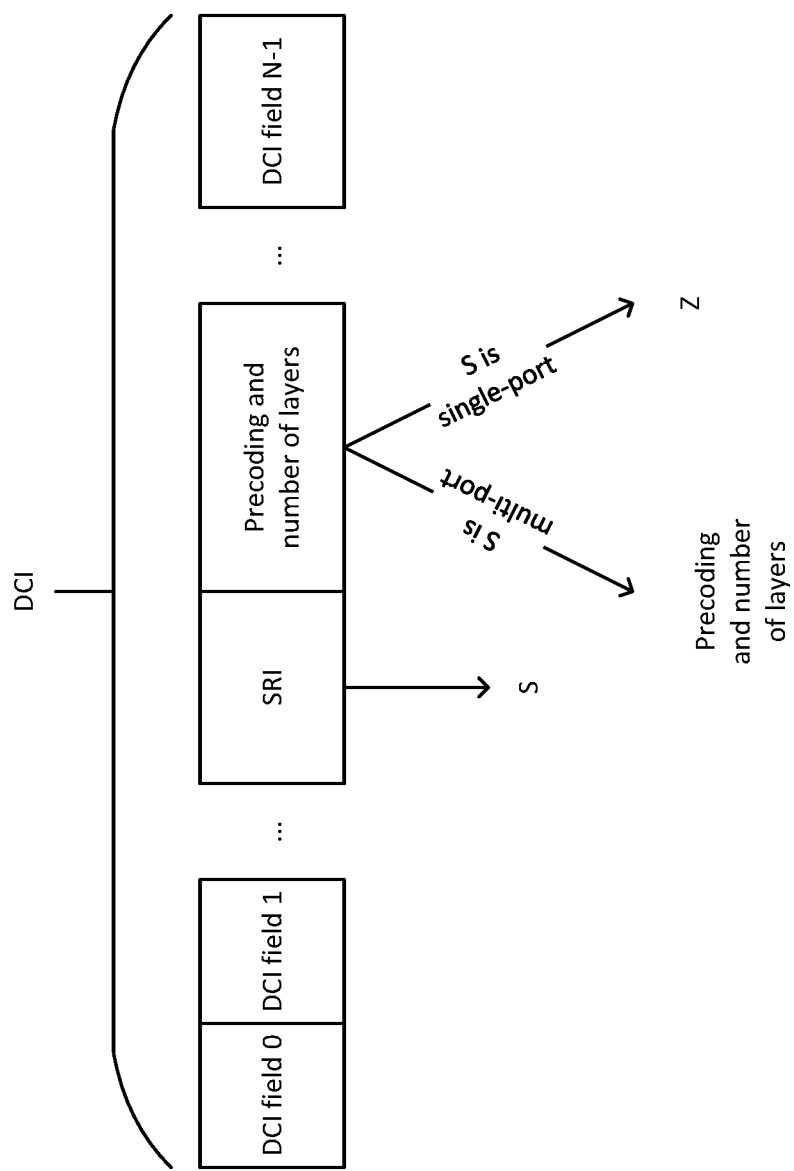
FIG. 9 illustrates an example of how Z may be obtained.

FIG. 9 illustrates an example of how Z may be obtained, e.g., if S is single-port. In some cases, Z are zero-padded. In some cases, Z are reserved.

In some cases, Z may indicate zero, one or more SRS resources. Note that not all bits of Z may be needed for this. Remaining bits could for example be zero-padded or reserved or used for other purposes. The SRS resources indicated by Z may be used for the scheduled PUSCH transmission. For example, the UE may determine its PUSCH precoder and number of layers based on the SRS resource(s) indicated by Z, e.g., an indicated SRS resource may determine PUSCH precoder and/or spatial domain transmission filter for a layer of the PUSCH, e.g., according to NCBB operation.

In some cases, the SRS resources indicated by Z are in the SRSRS for codebook. In some cases, in which the UE is also configured with an SRSRS for nonCodebook, the indicated SRS resources are in the SRSRS for noncodebook. Note that in some such cases, an SRS resource may be in both the SRSRS for codebook and the SRSRS for noncodebook. There are four basic ways to go about this, where Z may indicate S and/or other SRS resources, Z may indicate SRS resources in the SRSRS other than S, Z may be used to indicate a row in a table for SRS resource indication for NCBB operation, and S may be a multi-port SRS resource. These four approaches and their variants are described below.

First is where Z may indicate S and/or other SRS resources. Here, in a first example of the first approach, For example, Z may be a bitmap of SRS resources, where e.g., 'I' indicates an SRS resource and '0' means that a corresponding SRS resource is not indicated. The bits in the bitmap correspond to single-port SRS resources in the SRSRS (for codebook or noncodebook in different examples), e.g., S may also be a single-port SRS. For example, if there are two single-port SRS resources in the SRSRS, Z could include a 2-bit bitmap, with the following example cases:

For example, where Z="00", no SRS resource is indicated. In some cases, this may be an invalid indication, e.g., the UE does not expect this indication. In other cases, it is valid, but results in that no SRS in the SRSRS is used as spatial relation. Instead, the UE may for example follow a default spatial relation. Where Z="01", a first single-port SRS resource in the SRSRS is indicated, e.g., S or the other single-port SRS resource. Where Z="10", a second single-port SRS resource in the SRSRS is indicated. Where Z="11", both single-port SRS resources in the SRSRS are indicated, incl. S.

In a second example of the first approach, Z may represent an integer value which is used to select a row from a table, e.g., as below. In Table 2 of Appendix 2, "N" may correspond to the number of single-port SRS resources in the SRSRS (for codebook and/or noncodebook in different examples) and "SRI" may correspond to an SRS index within the SRSRS, or an index among the single-port SRS resources in the SRSRS. For example, S may correspond to the SRS index 1 and the other single-port SRS resource may correspond to the SRS index 0.

The second approach is where Z indicates SRS resources in the SRSRS (for codebook or noncodebook in different examples) other than S.

For example, Z may be a bitmap of SRS resources other than S, where e.g., '1' indicates an SRS resource and '0' does not indicate an SRS resource. The bits in the bitmap correspond to single-port SRS resources in the SRSRS other than S. However, S may also be a single-port SRS resource or, in some cases, a multi-port SRS resource. For example, consider an example with three single-port SRS resources in the SRSRS, e.g., S, a first other SRS resource S', and a second other SRS resource S".

In this example, Z could include a 2-bit bitmap, e.g., for Z="00", no other single-port SRS resource is indicated. For, Z="01", S' is indicated and for Z="10", S" is indicated. For Z="11" both S' and S" are indicated.

In another example, Z represents an integer value which is used to select a row from a table, e.g., as below. Below, N may correspond to the number of single-port SRS resources in the SRSRS other than S and SRI may correspond to an SRS index within the SRSRS or an index among the single-port SRS resources in the SRSRS other than S. See Table 3 of Appendix 2.

In one example, both S and the SRS resource(s) indicated by Z (e.g., the union thereof), if any, are used to determine the PUSCH precoder and/or spatial domain transmission filter(s) and number of layers, e.g., number of layers is the number of SRS resources indicated by Z plus 1.

In one example, only the SRS resource(s) indicated by Z, if any, are used to determine the PUSCH precoder and/or spatial domain transmission filter(s) and number of layers, e.g., number of layers is the number of SRS resources indicated by Z.

The third approach is where Z is used to indicate a row in a table for SRS resource indication for NCBB operation. The table may be a legacy table for SRI indication for NCBB operation. Let M denote the number of antenna ports of the SRS resource with the highest number of antenna ports in the SRSRS. For CBB operation and codebook subset restriction (CB SR), the UE is configured with either: full, partial, and non-coherent codebook subset (fpnc); partial and non-coherent codebook subset (pnc); or non-coherent codebook subset (nc).

For the third approach, let P denote the number of bits for the DCI field "precoder and number of layers" in a DCI scheduling a PUSCH, e.g., DCI format 0_0, 0_1 or 0_2.

Assume max rank for PUSCH (CBB) is equal to M for brevity. In other examples not listed here, max rank for PUSCH (CBB) may be less than M, which may or may not result in a different value of P. Assume for brevity that full-power UL transmission (ULFPTxModes) is either not configured or configured to Mode2. The configuration of Mode1 may result in different values in some cases. Also assume that transform precoding is disabled, since only single layer transmission is supported if it is enabled. For single-layer transmission, it might not be useful to indicate any additional single-port SRS resource beyond S.

Let N denote the number of single-port SRS resources in the SRSRS (for codebook or noncodebook in different examples), where N may or may not include S. Let K denote the number of bits needed for the NCBB SRI, e.g., according to normal NCBB operation, for example assuming that the single-port SRS resources may be used for NCBB operation.

Table 4 of Appendix 2 summarizes an example for the use of Z in various cases. Table 4 illustrates how many bits that are available (P) in the "precoding and number of layers" DCI field and how many bits that are needed (K) for the legacy NCBB SRI DCI field. The number of bits needed for K is equal to N, even though that might not hold in general.

Z would use some of the P bits from the "precoding and number of layers" field. In this example, single-port SRS is selected in the SRI (for CBB), so 0 bits of the P allocated bits would be used. Hence, Z may potentially use all P bits. Note that P is determined by the number of antenna ports of the SRS resource with the highest number of antenna ports, not the number of antenna ports of the SRS resource indicated by the SRI (for CBB).

The "Table in TS 38.212" column refers to the table 3GPP TS 38.212, V16.1.0, March 2020 that defines the different SRS resource combinations that may be selected by the SRI for NCBB operation. K represents how many bits that are needed to represent these different SRS resource combinations, for the particular combination of M and N of the row. Different tables may be used for different max ranks for NCBB operation, where the max rank may be configured by higher layer parameter maxMIMO-Layers or by the maximum supported number of layers indicated to the network by the UE.

The final column (K≤P?) evaluates if K≤P, e.g., if there are enough bits for Z (in this case P bits) to indicate any of the relevant SRS resource combinations in the corresponding table. In this example, there are enough bits for Z in all cases.

The fourth approach is where S is a multi-port SRS resource, with fewer antenna ports than the maximum number of antenna ports in the SRSRS. For example, consider an SRSRS with a 4-port SRS resource, a 2-port SRS resource and two single-port SRS resource(s). The SRI field may be two bits since there are four SRS resources. The field for precoding and number of layers may be 6 bits, due to the 4-port SRS resource, the max rank, codebook subset, etc.

The SRI indicates the 2-port SRS resource. A 2-port SRS resource requires 4 bits for the precoding and number of layers indication, in this example. Hence, there are 2 bits left for Z.

Z may indicate zero, one or both of the single-port SRS resources. If one or both single-port SRS resources are indicated, PUSCH may consist of up to 4 layers. This may occur if the precoding and number of layers indicates 2 layers based on the 2-port SRS resource and Z indicates two single-port SRS resources. The first two antenna ports of PUSCH DMRS may correspond to the 2-layer SRS and the next two DMRS antenna ports may correspond to the two single-port SRS resources, or vice versa. PUSCH DMRS antenna port 0 and 1 may use spatial domain transmission filter based on 2-port SRS resource, with precoder applied based on precoder indicated in field for precoding information and number of layers. PUSCH DMRS antenna port 2 may use spatial domain transmission filter and precoder based on first single-port SRS resource. PUSCH DMRS antenna port 3 may use spatial domain transmission filter and precoder based on second single-port SRS resource.

In various examples, single-port SRS resources in an SRSRS may be indexed similarly to how any SRS resource in an SRSRS is indexed, e.g., based on SRS resource ID among the single-port SRS resources or according to an ordinal position among the single-port SRS resources in the list of SRS resource(s) that were configured for the SRSRS.

In various examples described above, a set of SRS resources are indicated through a combination of the SRI for CBB and some form of additional SRS resource indicator for NCBB operation that may be embedded in unused bits in the precoder and number of layers DCI field, e.g., Z in the examples above. The SRS resource indicated in the first step, using the SRI for CBB was denoted S. The SRS resource(s), if any, indicated by the additional SRS resource indicator were for example denoted S', S", etc. In some cases, S is mapped to the PUSCH antenna port with lowest antenna port index, S' is mapped to the next etc. This allows some flexibility in the mapping of SRS resources to PUSCH layers.

Figure 10:
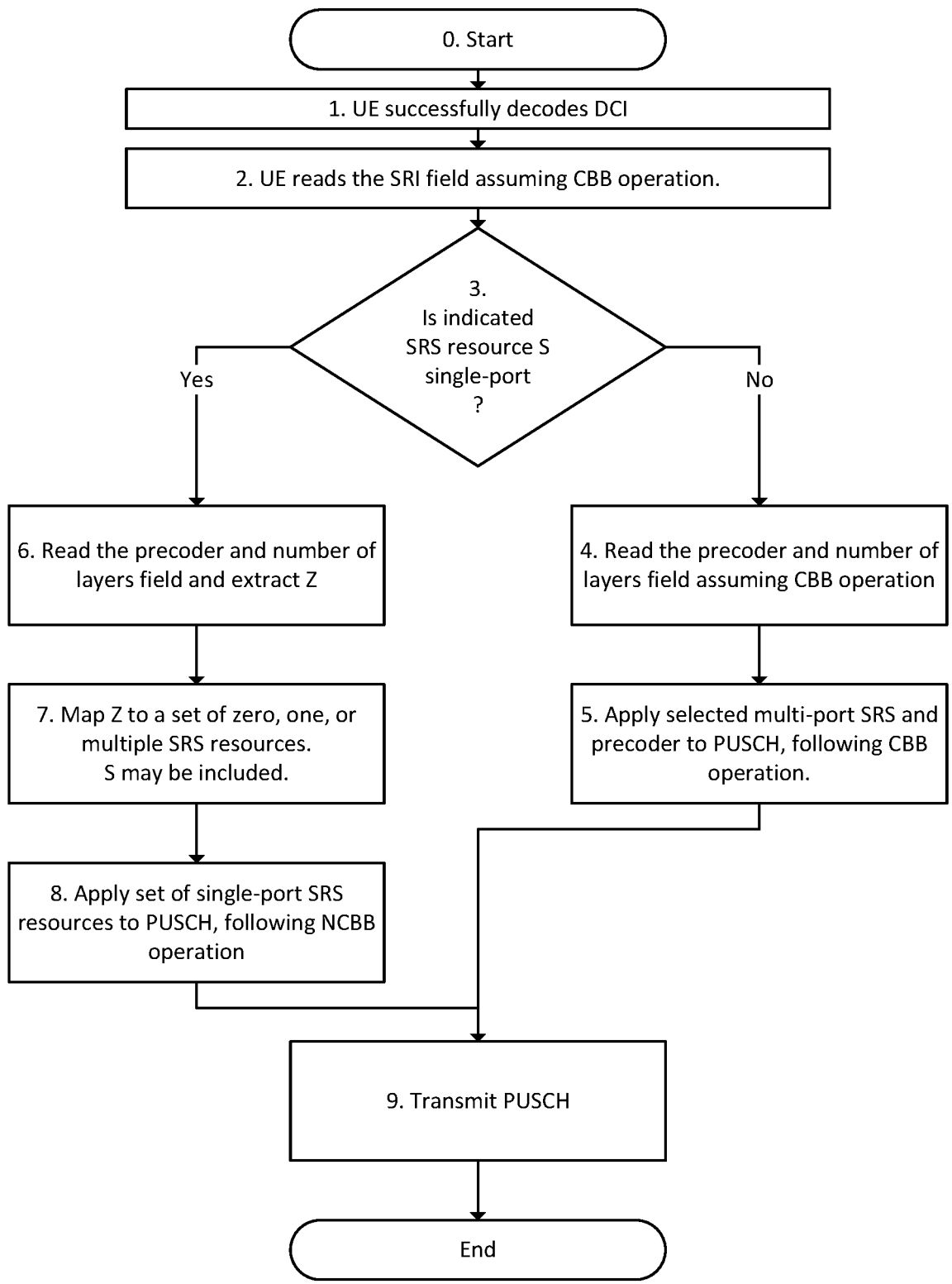
FIG. 10 is a flow chart of a procedure of dynamic selection of CBB or NCBB operation using DCI fields in a legacy DCI for PUSCH scheduling.

FIG. 10 illustrates a high-level procedure covering various examples discussed above. The UE may for instance be configured for CBB PUSCH operation. Various other UE capability reporting and configuration/indication, e.g., as discussed herein, may precede step 1.

FIG. 10 is a flow chart of an procedure of dynamic selection of CBB or NCBB operation using DCI fields in a legacy DCI for PUSCH scheduling.

In step 1, the UE successfully decodes a DCI carrying an UL grant, e.g., of format 0_0, 0_1 or 0_2.

In step 2, the UE reads the SRI field assuming CBB operation. The number of bits for the SRI field may depend on the number of SRS resources in the SRSRS (e.g., for codebook or 'mixed').

In step 3, the UE determines if the SRS resource S indicated by the SRI is a single-port or multi-port SRS resource. If S is a multi-port SRS resource, the UE proceeds to step 4 and performs legacy CBB operation. If it is a single-port SRS resource, the UE proceeds to step 6, which corresponds to NCBB operation.

In step 4, the UE reads the precoder and number of layers field in the DCI, e.g., as in legacy CBB operation.

In step 5, the UE applies the indicated precoder and number of layers to the PUSCH to be transmitted. The spatial domain transmission filter for the PUSCH is set to follow the spatial relation configured for the indicated multi-port SRS or a default spatial relation, e.g., if default spatial relation is configured and a spatial relation is not configured.

If the SRI selected a single-port SRS resource in step 3, the UE extracts Z from the DCI field for precoder and number of layers in step 6. The UE may assume that the number of bits for this field is the same as if a multi-port SRS were selected in step 3.

In step 7, the UE uses Z to select zero, one, or multiple single-port SRS resources, e.g., similar to as for SRS resource indication for NCBB operation. The single-port SRS resources may be selected from the same SRSRS as used in step 2 and 3, e.g., an SRSRS for codebookk,' or from a different SRSRS, e.g., an SRSRS for 'nonCodebook.' If S is not selected by Z, it may be included in the set anyway in some cases. In other cases, S is not included in the set if it is not selected by Z.

In step 8, the UE applies the set of single-port SRS resource(s) to PUSCH, e.g., according to NCBB operation, determining for example the number of PUSCH layers and the precoder and/or spatial domain transmission filter to apply to each PUSCH layer.

In step 9, a PUSCH is transmitted based on the outcome of step 5 or step 8.

Consider the following example. A UE is configured with one or more SRSRS for BM. The UE is configured with txConfig in IE PUSCH-Config set to codebook. The UE is configured with "full, partial and non-coherent" codebook subset, e.g., parameter codebookSubset is set to 'fullyAndPartialAndNonCoherent' in IE PUSCH-Config. UE is configured with max rank=4 for PUSCH. The UE is configured with an SRSRS for codebook with three SRS resources: one 4-port SRS resource and two single-port SRS resources.

The 4-port SRS resource has spatial relation configured and/or indicated to an SRS resource for BM. In the TRP-RP scenario, the spatial domain transmission filter used for the SRS for BM may be suitable for UL reception at the RP. The network may have performed measurements on SRS for BM at the RP and concluded, e.g., by comparing RSRP or SINR, that the configured/indicated SRS resource is suitable.

The precoder(s) and spatial domain transmission filter(s) of the two single-port SRS resources is based on DL RS, e.g., by their spatial relation(s), associated CSI-RS(s) and/or default spatial relation(s). In the TRP-RP scenario, the precoder(s) and spatial domain transmission filter(s) used for these two single-port SRS resources may be suitable for UL transmission to one or more TRPs.

The UE successfully decodes a DCI carrying an UL grant. The UE reads the SRI field in the DCI based on the assumption of CBB operation (e.g., txConfig=codebook). The SRI field in this example is 2 bits=ceil($\log_2(N_{SRS})$), where $N_{SRS}$=3 is the number of SRS resources in the SRSRS for codebook. If the SRI field indicates the 4-port SRS resource, the UE uses the field precoder and number of layers to operate legacy CBB PUSCH transmission. In this example, the precoder and number of layers field is 6 bits.

If the SRI field instead indicates one of the single-port SRS resources, the UE uses the field precoder and number of layers to operate NCBB PUSCH transmission. The same bit width may be assumed. The UE extracts Z from the field, which in this example is 2 bits, e.g., the 2 LSB of the precoder and number of layers field. Z is used to select a row in Table 7.3.1.1.2-31 in 3GPP TS 38.212, with $N_{SRS}$=2 since there are two single-port SRS resources in the SRSRS. The relevant part of the table is pasted into Table 5 of Appendix 2. Z is used to select a row. The right column indicates which of the two single-port SRS resources that is/are selected.

Based on the previous steps, the PUSCH is transmitted. If the 4-port SRS resource was indicated, the PUSCH is transmitted using legacy CBB mode, based on the indicated precoding and number of layers. If a single-port SRS resource was indicated, the PUSCH is transmitted based on the single-port SRS resource(s) indicated by Z, using NCBB operation.

In another example, if a UE is configured with NCBB and CBB operation on the BWP, the UE expects a bit in a DCI scheduling PUSCH (e.g., DCI format 0_0, 0_1 or 0_2) that indicates whether NCBB or CBB operation is applied for the field bit-widths, field interpretations and/or scheduled PUSCH transmission. The bit field may for instance be denoted PUSCHMode.

If PUSCHMode indicates CBB operation, the DCI may select an SRS resource from a configured SRSRS for codebook (based on the SRI field for CBB operation), as well as a corresponding precoder and number of layers (based on the precoder and number of layers field for CBB operation).

If PUSCHMode indicates NCBB operation, the DCI may select one or more SRS resource(s) from a configured SRSRS for noncodebook (based on the SRI field for NCBB operation).

Enhancements for PUSCH Repetition

In some cases, a transport block may be repeatedly transmitted on PUSCH, e.g., in order to improve reliability and/or coverage. To improve reliability even further, different repetitions, e.g., PUSCH occasions, may be transmitted to different points, e.g., TRP and/or RP. For example, a first repetition may be transmitted to a TRP and a second repetition could be transmitted to an RP, or vice versa. FIG. 16 illustrates four repetitions across four PUSCH occasions in four consecutive slots. In this example, the first and third repetitions are based on NCBB operation, with precoding and spatial domain transmission filter based on DL RS from a TRP. These may comprise a first set of PUSCH occasions. The second and fourth repetitions are based on CBB operation, with precoding indicated in a DCI and spatial domain transmission filter based on an SRS for BM. This allows these PUSCH repetitions to target an RP, which does not transmit DL RS. These may comprise a second set of PUSCH occasions, which is disjoint from the first set.

In some cases, the UE first transmits N1 repetitions using a first mode of transmission, e.g., NCBB, followed by N2 repetitions using a second mode of transmission, e.g., CBB.

Figure 11:
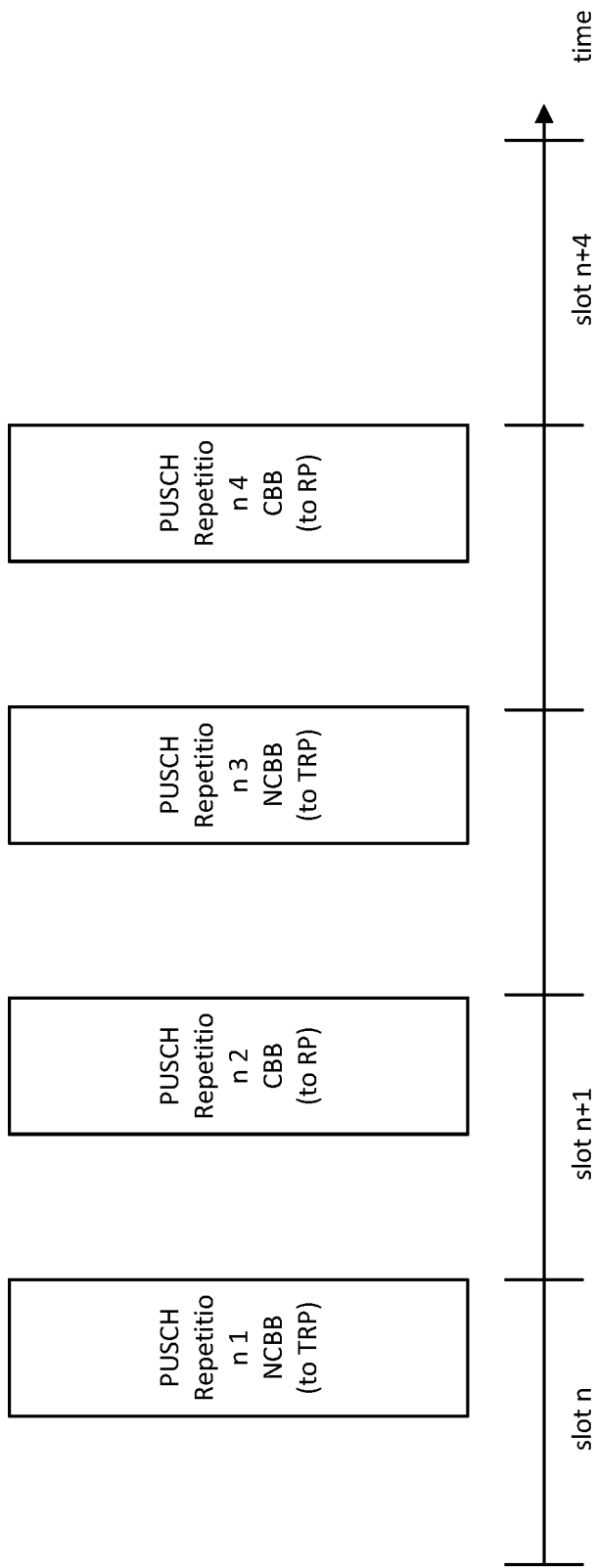
FIG. 11 is a timing diagram of an example repetition of PUSCH

FIG. 11 is a timing diagram of an example repetition of PUSCH, with NCBB PUSCH being intended for reception at a TRP and CBB being intended for reception at an RP.

In various cases, the PUSCH occasions are repeated in consecutive slots. In various cases, the PUSCH occasions are repeated in non-consecutive slots, e.g., every N:th slots where N is an integer greater than 1. In various cases, the PUSCH occasions are repeated within a slot, e.g., back-to-back or with one or more symbols between the occasions. In various cases, the PUSCH occasions are partially overlapping or fully overlapping in time. In various cases, the repeated PUSCHs are non-overlapping, partially overlapping or fully overlapping in frequency. In other words, repeated PUSCH occasions may be FDMed in some cases. In some cases, different spatial relations are applied to different disjoint sets of resource blocks within the same PUSCH occasion that carries a TB.

In some cases, different spatial relations are applied to different layers (or sets of layers) of a PUSCH.

Multi-DCI Approach

In some cases, the multiple PUSCH repetitions are scheduled by multiple DCIs. e.g., of DCI format 0_0, 0_1 or 0_2. For example, the number of DCIs equals the number of different precoding and spatial domain transmission filters to be used for the repeated PUSCH occasions.

In various cases, a first DCI indicates the time-frequency resources for a first PUSCH repetition.

In some cases, a second DCI indicates the time-frequency resources for a second PUSCH repetition. In some cases, a UE determines that a second DCI indicates a repetition or may indicate a repetition if the UE is configured with multi-DCI scheduling of PUSCH repetition. A UE may determine that the second DCI schedules a repetition based on various fields in the DCI.

One or a combination of the following three conditions, in some cases together with other conditions, may be used to determine if a second DCI schedules a PUSCH repetition. First, the "HARQ process number" is the same as in the first DCI. Second, the "new data indicator" does not indicate new data compared to the first DCI, e.g., it is not toggled. Third, aa new DCI field, e.g., a bit, indicates that the DCI schedules a PUSCH repetition. A second DCI may need to be transmitted within a certain time after the first DCI.

Each of the multiple DCIs may carry an SRI field. Each or a subset of the multiple DCIs may carry a precoding and number of layers field. According to various examples discusses herein, a subset of the DCIs, e.g., one DCI, may schedule PUSCH transmission based on NCBB operation, e.g., by indicating one or more single-port SRS resources. A subset of the DCIs, e.g., one DCI, may schedule PUSCH transmission based on CBB operation, e.g., by indicating a multi-port SRS resource, a precoder and a number of layers.

The multi-DCI approach may require higher PDCCH load, but comes with the benefit of more flexible control of the PUSCHs to the different points, e.g., different time- and frequency resource allocation, MCS, power control, precoding, etc.

Single-DCI Approach

In some cases, the multiple PUSCH repetitions are scheduled by a single DCI. e.g., of DCI format 0_0, 0_1 or 0_2.

In some cases, a UE is configured to perform multiple PUSCH repetitions, e.g., using uplink bundling or aggregation.

In some cases, PUSCH repetition and its pattern are configured by higher layer signaling (such as RRC signaling, MAC CE signaling and etc.). A configuration of PUSCH repetition and its pattern may include a set of spatial relations to be used for the PUSCH occasions, and uplink pattern following the first PUSCH transmission. After being configured, the UE may be activated by a DCI to start operating in the PUSCH repetition mode. And it may be de-activated by another DCI.

In order for a single DCI to schedule PUSCH transmission to multiple points, e.g., a TPR and an RP, the DCI may need to indicate multiple values for some parameters, e.g., one or more of the following four items. First is SRI, e.g., to enable different precoding and/or spatial domain transmission filter to different points. Second is precoding and number of layers: e.g., to enable different precoding and/or spatial domain transmission filter to different points. Third are time and frequency resources. Fourth is frequency hopping. This may require a new DCI format.

In legacy operation without multi-point repetition, the SRI may indicate either one SRS resource for CBB operation or one or more SRS resources for NCBB operation. In one approach, the network may configure and/or indicate by a MAC CE an SRI value (as indicated by the SRI field in the DCI) that corresponds to one or more SRS resources, e.g., also for CBB operation. In other words, if a UE is configured for such operation, an SRI value may be configured/indicated by the network to correspond to two SRS resources, rather than the SRS resource directly corresponding to the SRI value. In some cases, if the UE is configured for such operation, the SRI is interpreted according to the tables for NCBB operation that may select one or more SRS resources, even if the UE operates in CBB mode. However, if multiple SRS resources are indicated, this might not correspond to multi-layer transmission based on those multiple SRS resources, as in NCBB operation. Instead, the multiple indicated SRS resources are applied to different PUSCH occasions, e.g., one SRS resource per occasion. In some cases, a subset of the multiple SRS resources, e.g., single-port SRS resources, are applied to the same PUSCH occasion, thereby providing multi-layer NCBB PUSCH, while another subset of the multiple SRS resources, e.g., a multi-port SRS resource, is applied to another PUSCH occasion, thereby providing single- or multi-layer CBB PUSCH.

In some cases, a DCI includes multiple, e.g., two, fields for precoding and number of layers. These may be used to support CBB PUSCH transmission to multiple points, e.g., two different RPs, which may require different precoders and/or number of layers.

For example, if the SRI for CBB operation is enhanced to support indication of multiple SRS resources, e.g., as discussed above, an SRI could indicate two different SRS resources, e.g., two different multi-port SRS resources in an SRSRS for codebook. In this case, a first precoder and number of layers based on the first precoder and number of layers field in the DCI may be applied a first set of PUSCH occasions. A second precoder and number of layers based on the second precoder and number of layers field in the DCI may be applied to a second set of PUSCH occasions, e.g., disjoint from the first set.

In some cases, a DCI includes only one field for precoding and number of layers, which may limit the number of different RPs to which a UE transmits PUSCH within a repeated PUSCH transmission. PUSCH transmission to different RPs may require different precoders and number of layers. Instead, CBB PUSCH transmission combined with NCBB PUSCH transmission may be combined for multi-point PUSCH transmission, since NCBB PUSCH typically does not require indication of precoder and number of layers.

In one example, the SRI field in the DCI indicates a multi-port SRS resource and one or more, e.g., two, single-port SRS resources. The multi-port SRS may have a spatial relation to an SRS for BM which may be selected for transmission to an RP. The one or more single-port SRS resources may have DL RS as spatial relations or associated CSI-RS. The UE may apply a precoder and number of layers from a first precoder and number of layers field in the DCI to CBB PUSCH transmitted on a first set of PUSCH occasions. In one example, the UE may apply NCBB PUSCH transmitted on a second set of PUSCH occasions, e.g., disjoint from the first set, based on the set of single-port SRS indicated by the SRI field.

In another example, each indicated SRS resource is assigned to a set of PUSCH occasions, where the sets may be disjoint. If, for instance, the SRI field indicates four SRS resources of which one is multi-port and three single-port SRS resources, the UE may assign one set of PUSCH occasions to the multi-port SRS resource and apply the precoder and number of layers from a first precoder and number of layers field in the DCI for the CBB PUSCH transmission(s). The UE may assign one set of PUSCH occasions for each single-port SRS resource, e.g., the corresponding PUSCH transmission may be limited to single-layer.

In some cases, the number of repetitions and/or the number of repetitions corresponding to different SRS resources is configured by RRC or indicated by MAC CE or the DCI. This information may be used by the UE to assign SRS resources to sets of PUSCH occasions. In one example, the UE is informed that PUSCH will be repeated with PUSCH based on two different sets of SRS resources. The SRI field may indicate three SRS resources, one multi-port SRS and two single-port SRS resources. A multi-port SRS resources may be restricted to be assigned by itself to a first set of PUSCH occasions. Since the UE knows that there will be only one other set of SRS resources for a second set of PUSCH occasions, the UE may deduce that both single-port SRS resources should be mapped to the same PUSCH, e.g., 2-layer NCBB PUSCH based on the two single-port SRS resources should be transmitted on the second set of PUSCH occasions. If, on the other hand, the UE was informed that PUSCH will be repeated with PUSCH based on three different sets of SRS resources, the UE would assign the two single-port SRS resources to one set of PUSCH occasions each, e.g., single-layer PUSCH based on the single-port SRS resources are transmitted in different sets of PUSCH occasions.

In some cases, e.g. when a UE is configured with multiple, e.g. two, SRSRSs, a separate DCI field is used for SRSRS selection, which may correspond to TRP selection.

In one example, an SRSRS selection field may select between the SRSRSs, such as one of two configured SRSRSs (e.g. a NCBB set and a CBB set). In one example, an SRSRS selection field may select between PUSCH transmission based on one SRSRS, which may correspond to a single TRP, and PUSCH transmission based on multiple, e.g. two, SRSRS, which may correspond to transmission to multiple TRPs. In one example, an SRSRS selection field may select a mapping between SRSRSs and PUSCH occasions, e.g. which SRSRS that is mapped to which PUSCH occasions when the PUSCH is repeated. In one example an SRSRS selection field may select one or both SRSRSs, and in the case of two selected SRSRSs, it may also indicate a mapping to transmission occasions.

For example, a 2-bit SRSRS selection field may indicate the following for Codepoint values of 0 to 3.

Codepoint 0 may indicate to select $1^{st}$ SRSRS. In some cases, the first SRI field is used to indicate SRS resource(s) in the selected SRSRS, while the second SRI field is unused. In some cases, the second SRI field is used to indicate SRS resource(s) in the selected SRSRS, while the first SRI field is unused.

Codepoint 1 may indicate to select $2^{nd}$ SRSRS. In some cases, the first SRI field is used to indicate SRS resource(s) in the selected SRSRS, while the second SRI field is unused. In some cases, the second SRI field is used to indicate SRS resource(s) in the selected SRSRS, while the first SRI field is unused.

Codepoint 2 may indicate to select both SRSRSs, with first SRSRS to PUSCH occasion mapping order. In some cases, the first SRI field is used to indicated SRS resource(s) in the first SRSRS and the second SRI field is used to indicated SRS resource(s) in the second SRSRS. In some cases, the first SRI field is used to indicated SRS resource(s) in the second SRSRS and the second SRI field is used to indicated SRS resource(s) in the first SRSRS.

Codepoint 3 may indicate to select both SRSRSs, with second SRSRS to PUSCH occasion mapping order. In some cases, the first SRI field is used to indicated SRS resource(s) in the first SRSRS and the second SRI field is used to indicated SRS resource(s) in the second SRSRS. In some cases, the first SRI field is used to indicated SRS resource(s) in the second SRSRS and the second SRI field is used to indicated SRS resource(s) in the first SRSRS.

In some cases, the SRSRS with lower ID is the first SRSRS, and the other SRSRS is the second SRSRS. In some cases, with one SRSRS configured for NCBB and one SRSRS configured for CBB, the NCBB SRSRS is the first SRSRS, regardless of ID, whereas the CBB SRSRS is the second. In other cases, the CBB set is the first and the NCBB set is the second.

In some cases, PUSCH may be repeated also if a single SRSRS is selected, e.g. by applying the same SRSRS to each of the PUSCH occasions. For instance, repetition (e.g. incl. number of repetitions) or no repetitions may be indicated through a time domain resource allocation field.

In some cases, if the SRSRS indication field indicates a CBB SRSRS, the DCI field for precoding (e.g. in short TPMI) and number of layers may be applicable to PUSCH occasions to which the CBB SRSRS is mapped, incl. the cases that the CBB SRSRS is mapped to a subset or all the scheduled PUSCH occasions. In some cases, if the SRSRS indication field does not indicate a CBB SRSRS, the DCI field for precoding (e.g. in short TPMI) and number of layers may be unused.

In some cases, e.g. with PUSCH repetition based on NCBB and CBB PUSCH, the number of layers (i.e. rank) may be constrained to be the same in the NCBB PUSCH occasion(s) and in the CBB PUSCH occasion(s). This may be used to limit the size of a DCI field, e.g. an SRI field and/or a field for precoding and number of layers.

In some cases, the SRI field used for indicating SRS resource(s) in an NCBB SRSRS, which may be the $1^{st}$ or $2^{nd}$ SRI field in various examples herein, may be used to determine the entry of the field for precoding and number of layers (e.g. TPMI), which may only contain the precoding (e.g. TPMI) combinations corresponding to the indicated number of layers of the SRI field used for indicating SRS resource(s) in an NCBB SRSRS. For example, if the SRI field used for indicating SRS resource(s) in an NCBB SRSRS indicates a single layer PUSCH transmission, the field for precoding and number of layers may indicate single-layer precoding (e.g. TPMI) entries. In some cases, the field may be considered a precoding field, e.g. a TPMI field. The number of bits, N2, for the precoding (e.g. TPMI) field may be determined by the maximum number of precoding and number of layers (e.g. TPMI) codepoint(s) per rank among all ranks associated with the SRI field used for indicating SRS resource(s) in an NCBB SRSRS. For each rank x, the first $K_x$ codepoint(s) are mapped to $K_x$ precoders (e.g. TPMIs) of rank x associated with the SRI field, the remaining $(2^{N2}-K_x)$ codepoint(s) are reserved. The maximum number of precoding and number of layers (e.g. TPMI) codepoint(s) per rank may depend on a configured codebook subset restriction, e.g. non-coherent, partial- and non-coherent, or fully-, partial- and non-coherent subsets. In some cases, precoding (e.g. TPMI) ranks greater than the number of SRS resources in the NCBB SRSRS are not considered when determining the maximum number of codepoint(s) per rank.

For example, consider an example with 4 SRS resources in an SRSRS for NCBB operation and maximum rank is 4. Further considering a codebook (e.g. non-coherent subset)

with 4 single-layer TPMIs, 6 two-layer TPMIs, one 3-layer TPMI and one 4-layer TPMI, the maximum number of TPMI codepoints per rank is 6 (corresponding to rank x=1), which means that the number of bits (N2) for the precoding (e.g. TPMI) field may be 3. Consequently, $K_1=4$, $K_2=6$, $K_3=1$, and $K_4=1$.

In some cases, the field for precoding and number of layers (e.g. TPMI) may be used to determine the entry of the SRI field used for indicating SRS resource(s) in an NCBB SRSRS, which may be the $1^{st}$ or $2^{nd}$ SRI field in various examples herein. In some cases, the SRI field may only contain the SRI combinations corresponding to the indicated number of layers of the field for precoding and number of layers. For example, if the field for precoding and number of layers indicates a single layer PUSCH transmission, the SRI field used for indicating SRS resource(s) in an NCBB SRSRS may indicate single-layer entries. The number of bits, N3, for the SRI field (for NCBB) may be determined by the maximum number of SRI codepoint(s) per rank among all ranks associated with the field for precoding and number of layers. For each rank x, the first $K_x$ codepoint(s) are mapped to $K_x$ SRIs of rank x associated with the field for precoding and number of layers, the remaining ($2^{N3}-K_x$) codepoint(s) are reserved.

Joint Transmission

In some cases, joint multi-point PUSCH transmission is beneficial, e.g., for improved spectral efficiency and/or reliability. For example, different layers of a PUSCH could be targeting different points, e.g., one layer to a TRP and one layer to an RP. This may be feasible for UE with multiple panels for UL transmission—e.g., a first layer is transmitted from a first panel and a second layer is transmitted from a second panel.

To enable such joint transmission, the single-DCI approach may be employed. Instead of assigning a multi-port SRS resource to a first PUSCH transmission and one or more single-port SRS resources to one or more PUSCH transmission different than the first, a multi-port SRS resource is assigned to a set of layers of a PUSCH and one or more single-port SRS resources are assigned to another set of layers, disjoint with the first set, of the same PUSCH.

The number of layers of the scheduled PUSCH may then be the sum of the indicated number of layers and the number of indicated single-port SRS resources. The indicated number of layers may be from the precoder and number of layers field in the DCI of the indicated multi-port SRS resources.

The SRS resources may be indicated by the scheduling DCI, e.g., by the SRI field.

Multi-Panel Aspects

For PUSCH repetition, it may be beneficial for reliability to have the UE transmit different PUSCH on different UE panels, since one panel may be suddenly blocked. In some cases, in which an SRS resource or SRSRS is already associated with panel, PUSCH repetition transmission from different panels may be achieved by indicating SRS resources in the DCI that are associated with different panels for the different PUSCH occasions.

Enhancements for SRS Beam Sweeping

A UE may be configured with one or more SRSRS with usage 'beamManagement' (SRSRS for BM). In general, if a spatial relation is not configured and/or indicated for an SRS resource, it may be up to the UE to select which precoder and/or spatial domain transmission filter to use for the SRS resource. SRS for BM are typically not configured/indicated with a spatial relation so that the UE may implement UL beam sweeping using the SRS for BM. Note, however, that how the UL beam sweeping is implemented, if at all, may be up to the UE.

However, SRS resources from different SRSRS for BM may be transmitted in the same symbol, but simultaneous transmission of different SRS resources from the same SRSRS for BM may be prohibited. This property may be used to transmit different SRS resources in an SRSRS for BM from the same UE panel. In some UE implementations, e.g., if analog Tx beamforming is used, it may not be possible to transmit multiple different beams from the same panel simultaneously. However, it may be possible to simultaneously transmit a first beam from a first panel and a second beam from a second panel. In these examples, different SRS resources could be transmitted using different beams.

A physical panel may be an antenna system, e.g., a rectangular arrangement of cross-polarized antenna elements or another arrangement of antennas. In various cases, the antennas of a panel are connected to a TRX or multiple Tree's. In various cases, the same panel(s) is/are used for transmission and reception at the UE. In some cases, different sets of panels may be used for transmission and reception. In some cases, panels, incl. corresponding TRXs, may be switched off and on, e.g., to save power.

In some cases, a logical panel may be defined. The mapping of a logical panel to a physical panel may be up to the UE. For example, a logical panel may be mapped to a physical panel. In another example, a logical panel is mapped to multiple physical panels. In yet another example, multiple logical panels are mapped to a physical panel. Some implementations might not use physical panels. In such cases, a logical panel may be mapped to a set of antennas.

In some cases, a UE reports to the network its capability in terms of number of panels (e.g., physical and/or logical), for transmission and/or reception.

In some cases, a UE panel ID (or index or pool ID) is defined. Such a panel ID may correspond to a physical panel and/or a logical panel.

In some cases, a UE may be configured to provide a panel ID alongside measurement results on DL RSs, e.g., L1-RSRP. The panel ID could represent on which panel the reported DL RS was measured. If a DL measurement were performed on multiple panels, a panel ID could represent the dominant panel, e.g., the panel with individually highest measurement value, e.g., highest per-panel L1-RSRP.

In some cases, an SRSRS may be (RRC) configured with a panel ID, as illustrated in Configuration Example 6 of Appendix 1. Such a panel ID could indicate from which panel (physical or logical) that the SRS resources in the SRSRS should be transmitted. For example, an SRSRS for BM could be configured with a panel ID that determines which panel the corresponding SRS resources are transmitted from.

Configuration Example 6 of Appendix 1 shows an example SRS-Config information element with configuration of panel ID in SRSRS.

In some cases, an SRSRS may be (RRC) configured with multiple panel IDs, e.g., in a list as illustrated in Configuration Example 7 of Appendix 1. Those IDs could indicate from which (multiple) panels that the SRS resources in the SRSRS should be transmitted. In some cases, the number of SRS resources in an SRSRS needs to be greater than or equal to the number panel IDs configured for the SRSRS.

Configuration Example 7 of Appendix 1 shows an example SRS-Config information element with configuration of panel IDs for an SRSRS.

In some cases, a UE may be configured with an SRSRS for codebook and an SRSRS for 'noncodebook,' as discussed above. Such a configuration may be constrained such that the SRSRS for codebook is configured/indicated for a different panel than the SRSRS for 'nonCodebook.' In some cases, an association between SRSRSs and panels is specified. For example, an SRSRS for codebook is associated with the lowest panel ID, e.g., 0. In another example, an SRSRS for noncodebook is associated with the lowest panel ID, e.g., 0. In some cases, one PUSCH transmission mode, and corresponding SRSRS may be configured per UE panel, e.g., using a configuration as in Configuration Example 6 of Appendix 1. In some cases, up to one SRSRS for codebook may be configured and up to one SRSRS for nonCodebook may be configured. In this case, such SRSRSs may need to be associated with multiple panels, which means that a configuration as illustrated in Configuration Example 7 of Appendix 1 may be suitable.

Figure 12:
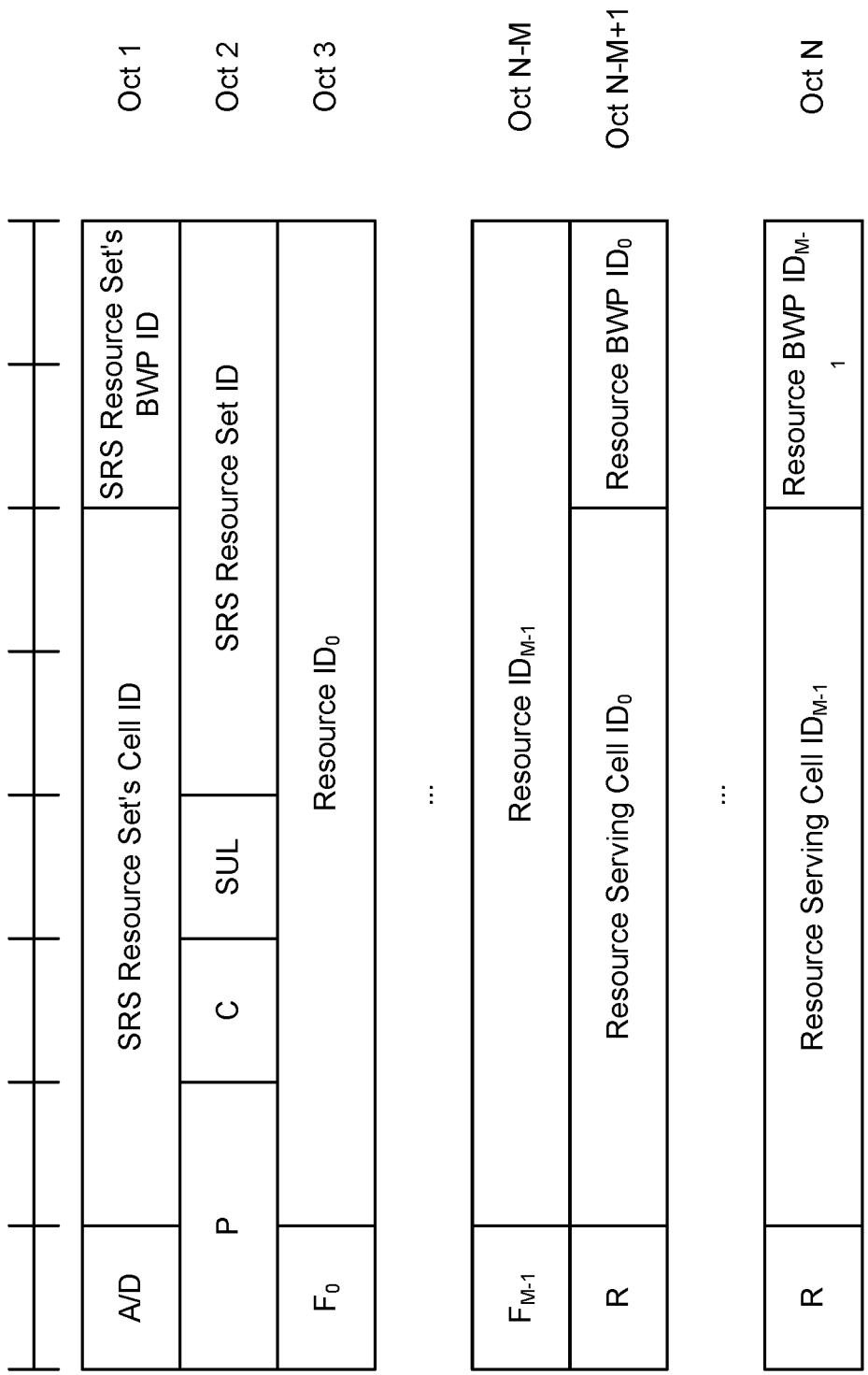
FIG. 12 illustrates an example of panel ID indication P in a MAC CE, e.g., in this case for aperiodic or semi-persistent SRS Activation/Deactivation

In some cases, a panel ID may be indicated and/or activated and/or deactivated by a MAC CE, for instance as illustrated in FIG. 12. This example is based on using one or more reserved bits in a legacy MAC CE, e.g., aperiodic and/or semi-persistent SRS activation/deactivation MAC CE, as described in 3GPP TS 38.321, V16.0.0, March 2020. The following are twelve example fields.

A/D—This field indicates whether to activate or deactivate indicated SRS resource set.

SRS Resource Set's Cell ID—This field indicates the identity of the Serving Cell, which contains activated/deactivated SRS Resource Set.

SRS Resource Set's BWP ID—This field indicates a UL BWP as the codepoint of the DCI bandwidth part indicator field C—This field indicates whether the octets containing Resource Serving Cell ID field(s) and Resource BWP ID field(s) are present.

SUL—This field indicates whether the MAC CE applies to the normal UL carrier or SUL carrier configuration.

SRS Resource Set ID—This field indicates the SRS Resource Set ID, which is to be activated or deactivated.

Fi—This field indicates the type of a resource used as a spatial relationship for SRS resource within SRS Resource Set indicated with SRS Resource Set ID field.

Resource IDi—This field contains an identifier of the resource used for spatial relationship derivation for SRS resource i.

Resource Serving Cell IDi—This field indicates the identity of the Serving Cell on which the resource used for spatial relationship derivation for SRS resource i is located.

This field indicates a UL BWP as the codepoint of the DCI bandwidth part indicator field, on which the resource used for spatial relationship derivation for SRS resource i is located.

R: Reserved bit.

P: Panel ID.

FIG. 12 illustrates an example of panel ID indication P in a MAC CE, e.g., in this case for aperiodic or semi-persistent SRS Activation/Deactivation In this example, the panel indication P is two bits. These bits may directly represent the panel ID that is indicated/activated/deactivated for this SRSRS, e.g., '00' represents panel ID=0, '01' represents panel ID=1, etc. In some cases, P is used to indicate a row in a table, which then defines which panel ID to use for this SRSRS, if any, e.g., as in Table 6 of Appendix 2. The value 'no panel is indicated' may mean that the UE may choose panel for SRSRS transmission.

In some cases, P is a bitmap, where each bit represents a panel. If the bit is set, transmission of SRS resource(s) from the SRSRS is enabled for the corresponding panel. If the bit is not set, the SRSRS should not be transmitted from the panel. In some cases, multiple panels may be indicated for activation/deactivation by a MAC CE, e.g., if P is a bitmap with multiple bits set to '1' wherein a bit set to 1 indicates to the UE to activate the corresponding panel or to activate the SRS transmission (corresponding to the SRSRS indicated by the MAC CE) on the corresponding panel. Similarly, a bit set to 0 indicates to the UE to deactivate the corresponding panel or to deactivate the SRS transmission (corresponding to the SRSRS indicated by the MAC CE) on the corresponding panel.

In some cases, one or more panels may be indicated by P only at SRS activation. For instance, at deactivation, the bits in P may be fixed to 0.

For an aperiodic SRSRS, a panel ID may be indicated by the DCI that triggers the aperiodic SRSRS, e.g., in the SRS request field.

In some cases, the panel ID indicated by a MAC CE (e.g., by P) or in a DCI corresponds to one of the panels configured for the SRSRS, e.g., as in Configuration Example 7 of Appendix 1.

In some cases, a DCI that schedules a PUSCH indicates a panel ID. For example, consider NCBB PUSCH operation, where NCBB SRS resource(s) use DL RS(s) to derive precoder and spatial domain transmission filter. Such SRS resource(s) may be received on multiple panels, and the UE may maintain a spatial domain reception filter per panel to receive a DL RS. Hence, the UE may be able to select precoder and spatial domain transmission filter(s) for PUSCH that corresponds to a panel indicated in the DCI that schedules the PUSCH.

In some cases, the configured and/or indicated panel ID(s) discussed above does not represent the panel the UE should transmit the SRSRS from. Instead, the configured and/or indicated panel ID(s) represent the panel(s) the UE should avoid when transmitting the SRSRS.

In another approach, an SRS resource may be configured/indicated with a negative spatial relation, e.g., to a reference RS such as an SRS or a DL RS. A negative spatial relation may imply that the target SRS resource should not be transmitted/received using the same spatial domain filter as the reference RS in the negative spatial relation. In another example, an SRSRS may be configured/indicated with a negative spatial relation, e.g., to a reference RS such as an SRS or a DL RS, or a reference SRSRS. Such a negative spatial relation may imply that the SRS resources in the target SRSRS should not be transmitted/received using the same spatial domain filter as the reference RS in the negative spatial relation or any SRS in the reference SRSRS. In some cases, the UE should transmit the target SRS resource (or SRSRS) with a spatial domain filter that is spatially maximally separated from the spatial domain filter used for the transmission/reception of the reference RS (or reference SRSRS) in the negative spatial relation. In some cases, the UE should (or may) transmit the target SRS resource (or target SRSRS) from a panel that is spatially maximally separated from the panel used for the transmission/reception of the reference RS (or reference SRSRS) in the negative spatial relation.

Figure 13:
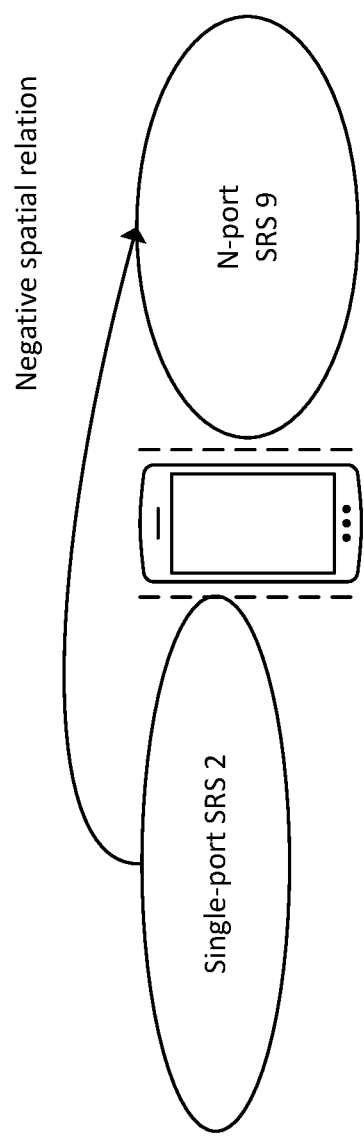
FIG. 13 illustrates an example of negative spatial relation.

FIG. 13 illustrates and example of negative spatial relation. SRS 9 is configured with a negative spatial relation to SRS 2. For example, this may result in that the UE shall (or may) transmit SRS 9 with a spatial domain transmission filter that is spatially maximally separated from SRS 2.

A normal (or positive) spatial relation for an SRS indicates how the UE shall transmit an SRS, in terms of precoding and spatial domain transmission filtering. Hence, for SRS with positive spatial relations, there is no room for the UE to choose SRS transmit beam. Therefore, spatial relations are typically not configured for SRS for BM, since the UE is supposed to be able to choose SRS transmit beams, e.g., in order to implement UL Tx beam sweeping.

The purpose of a negative spatial relation is to maintain large flexibility for the UE to select SRS transmit beam. The negative spatial relation indicates to the UE which UL Tx beams and/or panels to avoid when selecting UL Tx beam for an SRS. Beside this limitation, the UE still has the flexibility to choose UL Tx beam for an SRS, e.g., to perform a limited UL beam sweeping on a subset of UL Tx beams and/or a subset of UL transmit panels.

Note that "UL Tx beam" may correspond to precoding and/or spatial domain transmission filter.

In various cases, an SRS resource or SRSRS cannot be configured with both a positive spatial relation and a negative spatial relation. Consider two examples.

In a first example, an SRSRS (e.g., for codebook) is configured with a single-port SRS resource and a multi-port SRS resource. The single-port SRS resource is configured/indicated with a DL RS as spatial relation. The multi-port SRS resource is configured/indicated with a the single-port SRS resource as a negative spatial relation. Since the multi-port SRS resource is not configured with a positive spatial relation, it does not have to be transmitted using a particular spatial domain transmission filter.

However, due to the negative spatial relation, the (target) multi-port SRS should be transmitted using a different spatial domain transmit filter than the (reference) single-port SRS, or from a different panel than the single-port SRS.

If the UE has two panels, the single-port SRS is transmitted on a first panel, e.g., if the first panel is best for receiving the corresponding DL RS, and the (target) multi-port SRS would then be transmitted from the second panel, due to the negative spatial relation. If the UE rotates such that the DL RS is received on the second panel instead, the (target) multi-port SRS would then be transmitted from the first panel, without reconfiguration/indication, due to the negative spatial relation.

In a second example, an SRSRS for BM is configured. Here, none of the SRS resources in the SRSRS is configured with a positive spatial relation, which means that it is up to the UE to select UL transmit beam for the SRS resources. The SRSRS is configured/indicated with a negative spatial relation with a (reference) SRSRS for noncodebook or with a (reference) SRS resource in the SRSRS for noncodebook. For example, the single-port SRS resource(s) in the SRSRS for noncodebook have DL RS(s) configured/indicated as spatial relations, which means that there is typically little flexibility for the UE to choose beam/panel for those SRS resources.

The UL transmit beams for the (target) SRS resources for BM may be flexibly selected by the UE, with the constraint imposed by the negative spatial relation. For example, the UE may perform UL beam sweeping across its panels, except the panel used to transmit the reference SRS resource in the negative spatial relation. Similarly, the UE may perform UL beam sweeping across any panel, as long as it avoids a spatial domain transmission filter used by any SRS resource in the reference SRSRS.

By being able to control which panel(s) that a UE uses for transmission of SRS for BM, the network may better utilize the UL resources and reduce the UL interference. Consider the scenario with a cell with a TRP and an RP, as illustrated in FIG. 14. A UE in the cell has reported to the network that it has two panels. The network configures network-controlled UE panel operation (for two UE panels). Furthermore, consider that the UE uses NCBB PUSCH transmission to the TRP, based on DL RS transmitted from the TRP. For PUSCH transmission to the RP, the UE uses CBB transmission, with the multi-port SRS having spatial relation to SRS for BM. The NCBB and CBB operation may follow various examples described above, e.g., a UE having a CB-SRSRS, SRSRS for 'nonCodebook,' SRSRS for 'codebook,' and/or SRSRS for 'mixed.'

FIG. 14 illustrates example scenarios with SRS for BM transmitted from one panel, in this case in the direction of the RP.

Since the UE uses one panel for reception of DL RS from the TRP and transmission of UL signals and channels to the TRP, based on those DL RS, it may be unnecessary to transmit SRSRS for BM from that panel. Instead, the SRSRS for BM could be advantageously transmitted from the other panel, in order to enable the network to measure if the other panel is suitable for transmission to the RP.

If the UE reports which panel that is used for reception of DL RS from the TRP and transmission of single-port SRS(s) for the purpose of NCBB PUSCH transmission to the TRP, the network may configure/indicate that the UE transmits SRSRS for BM from the other panel. However, this may involve reconfiguration overhead and delay in case the situation changes, e.g., if the UE rotates.

In an alternative approach, the UE may be configured to transmit SRS for BM from one or more panel(s) not used for transmitting SRS resource(s) with DL RS(s) as a spatial relation, an associated CSI-RS, or default spatial relation based on a DL RS. In alternative wording, a UE may be configured to avoid transmitting SRS for BM from a panel used for transmitting SRS resource(s) with DL RS(s) as a spatial relation, an associated CSI-RS, or default spatial relation based on a DL RS.

For example, a UE may be configured to not transmit any SRS resource in an SRSRS for BM using the same spatial domain transmission filter as is used for the reception of a certain DL RS or the transmission of a certain SRS or SRSRS. In alternative wording, a UE may be configured to avoid transmitting an SRS resource in an SRSRS for BM using the same spatial domain transmission filter as is used for the reception of a certain DL RS or the transmission of a certain SRS or SRSRS.

In other words, if a UE would for example rotate and the UE changes the panel used for DL RS reception, the UE may autonomously change the panel(s) used for transmission of SRS for BM.

These techniques of panel or spatial domain transmission filter avoidance may for example be configured in SRS config, and thereby for instance apply to all configured SRS for BM, as illustrated in Configuration Example 8 of Appendix 1. In some cases, the technique only applies to periodic or semi-persistent SRSRS.

Configuration Example 8 of Appendix 1 shows an example SRS-Config information element with configuration in SRS-Config of panel selection for UL beam sweeping based on DL measurements.

In another example, the panel avoidance technique could be configured in an SRS resource set, as illustrated in Configuration Example 9. In this case, it is only applied to the SRSRS in which it is configured. In this way, some SRSRS for BM may be configured to avoid panels transmitting DL-based UL, while other SRSRS for BM still are transmitted from any panel, incl. any panels transmitting DL-based UL. The code "—Cond beamManagement" may mean that "This field is optionally present, Need M, in case of usage being beamManagement, otherwise the field is absent."

Configuration Example 9 of Appendix 1 shows an example SRS-Config information element with configuration in SRS-ResourceSet of panel selection for UL beam sweeping based on DL measurements.

In some cases, the panel avoidance may be based on which panel that is associated with DL-based NCBB operation. The meaning of an association between DL-based NCBB operation and a panel, or vice versa, may have multiple variations.

For example, he configuration and/or indication may include one or more of an RRC configuration, an indication in a MAC CE, or an indication in a DCI. An indication in a MAC CE may be in a semi-persistent SRS Activation/Deactivation MAC CE, aperiodic SRS spatial relation Indication MAC CE, SRS Pathloss Reference RS Activation/Deactivation MAC CE, and/or CC list-based SRS Activation/Deactivation MAC CE. An indication in a DCI may be together with a trigger for an aperiodic SRS, for example.

The configuration and/or indication may be achieved where a panel is associated with DL-based NCBB operation e.g., if an SRSRS with usage noncodebook/codebook/'mixed' contains one or more SRS resources, e.g., single-port, with active spatial relation being a DL RS and the spatial filter used to receive one or more DL RS (and transmit the corresponding SRS) is associated with the panel. This may be achieved in a number of ways. First, a spatial filter is associated with a panel if a signal, e.g., SRS, transmitted using the spatial filter is transmitted from the panel, and/or a spatial filter is associated with a panel if a signal, e.g., DL RS, received using the spatial filter is received with the panel.

In some cases, another condition is added: that the measured quality of the DL RS received on the panel is good enough, e.g., a measurement such as L1-RSRP, L1-RSRQ and/or L1-SINR is a above a threshold, which may be configurable.

In some cases, another condition is added: The UE measures the quality (e.g., L1-RSRP, L1-RSRQ, L1-SINR) of one, more or all of the DL RS that serve as spatial relation in the considered SRSRS. These N DL RS quality measurements may be denoted $x_1, \ldots, x_N$. The measurements were obtained from panels with indices $p_1, \ldots, p_N$. For example, if all N measurements were obtained from the same panel with index a, then $p_1 = \ldots = p_N = a$. If a DL RS i was measured on multiple panels, then the measurement result with highest quality and the corresponding panel would be used for $x_i$ and $p_i$. A function of a set of quality measures S is defined f(S), which for example may be average(S), max(S), or min(S). The set of quality measurements obtained from panel i is denoted $S_i$, e.g., the set of $x_k$ for which $p_k=i$ ($k=1, \ldots, N$). The SRSRS is for instance associated with panel i with highest $f(S_i)$ or lowest $f(S_i)$, depending on the nature of f( ).

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 15A:
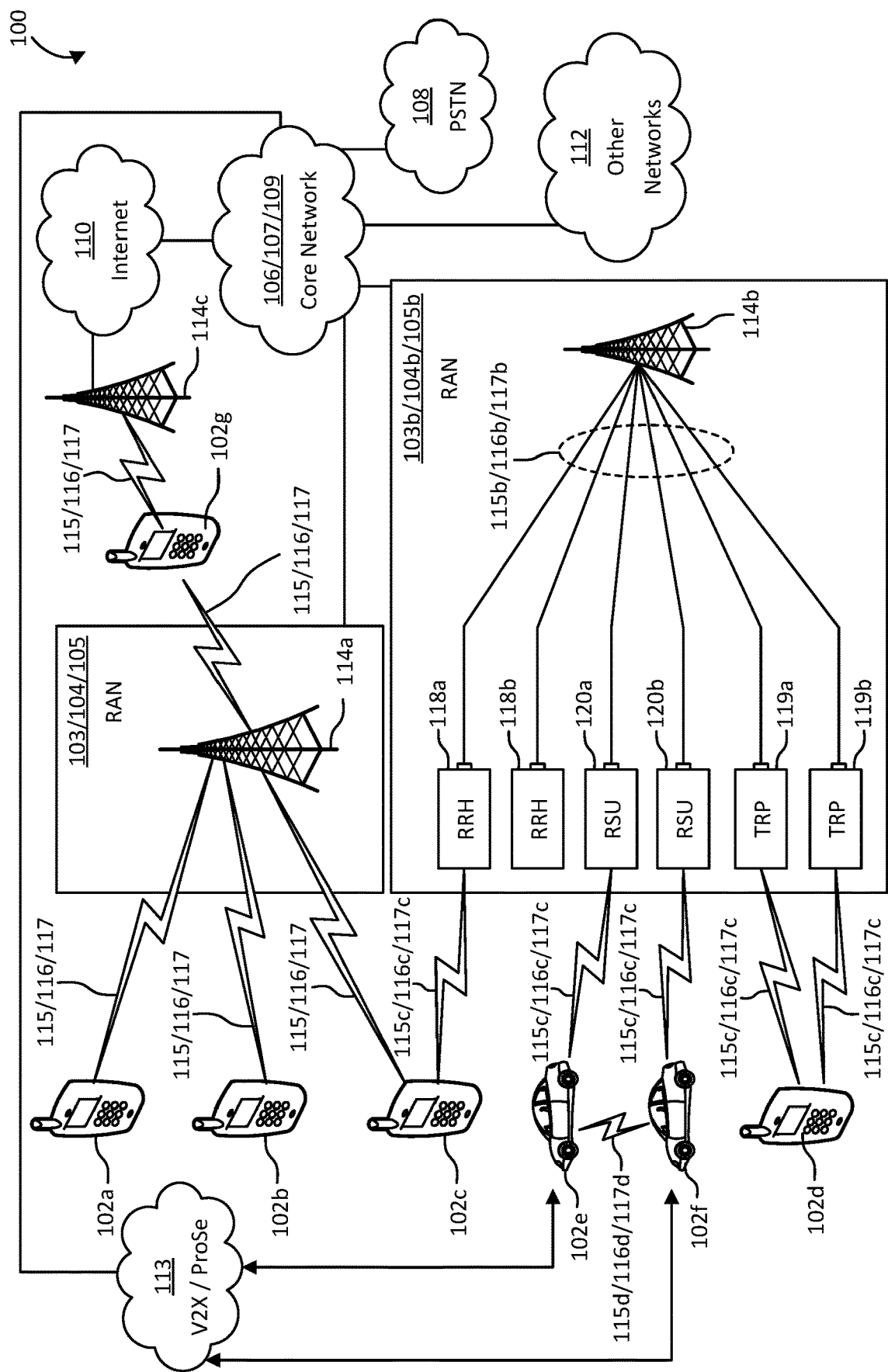
FIG. 15A illustrates an example communications system in which the methods and apparatuses described and claimed herein may be embodied.

FIG. 15A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 15A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.)

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 15A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 15A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 15A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 15A may be configured to communicate with the base station 114a, which may employ a cellular-based radio technology, and with the base station 114c, which may employ an IEEE 802 radio technology.

Figure 15B:
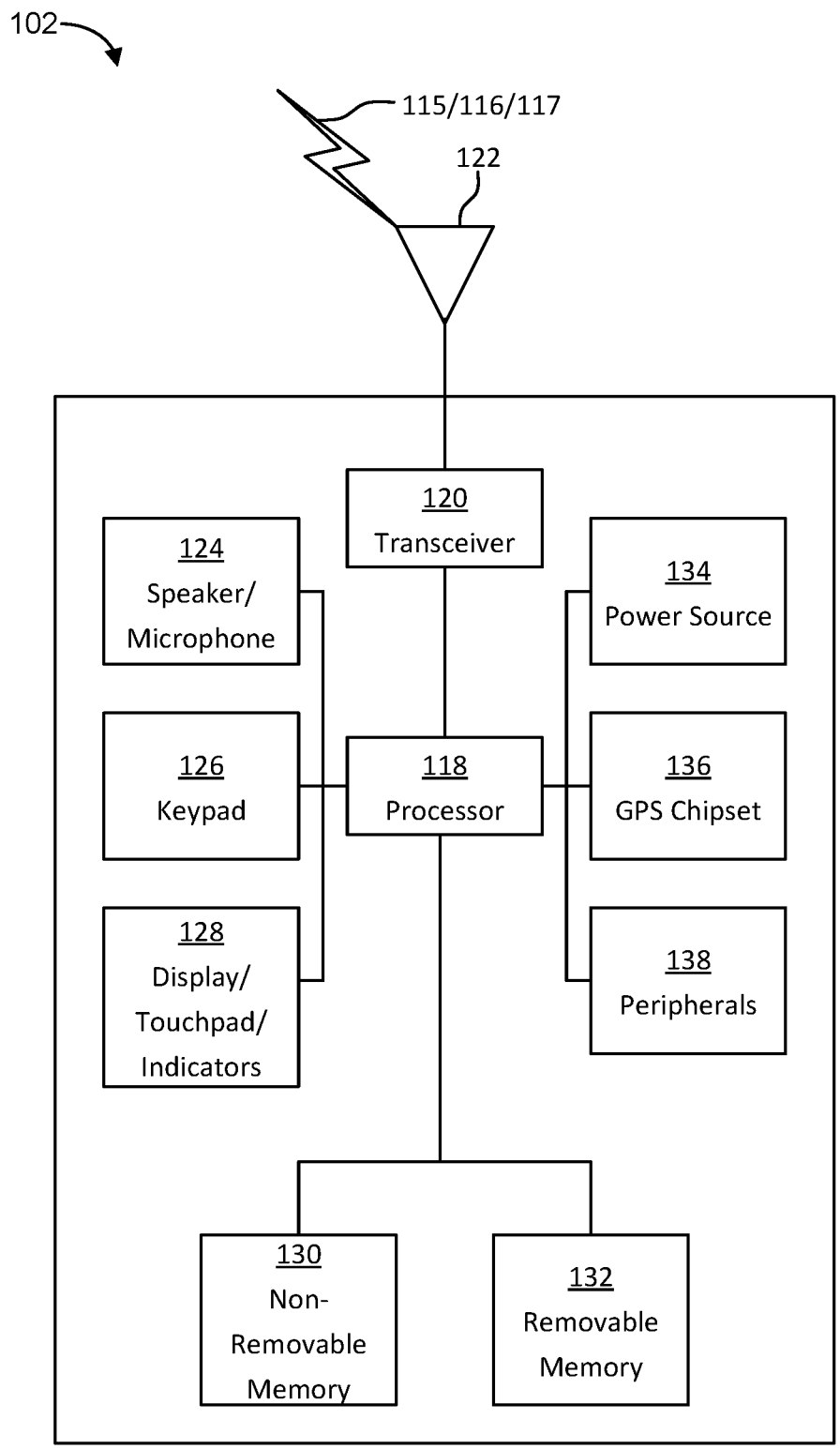
FIG. 15B is a block diagram of an example apparatus or device configured for wireless communications.

FIG. 15B is a block diagram of an example apparatus or device configured for wireless communications in accordance with the embodiments illustrated herein, such as for example, a WTRU 102. As shown in FIG. 15B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 15B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 15B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 15B as a single element, the WTRU 102 may include any number of transmit/receive elements 122.

More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 15C:
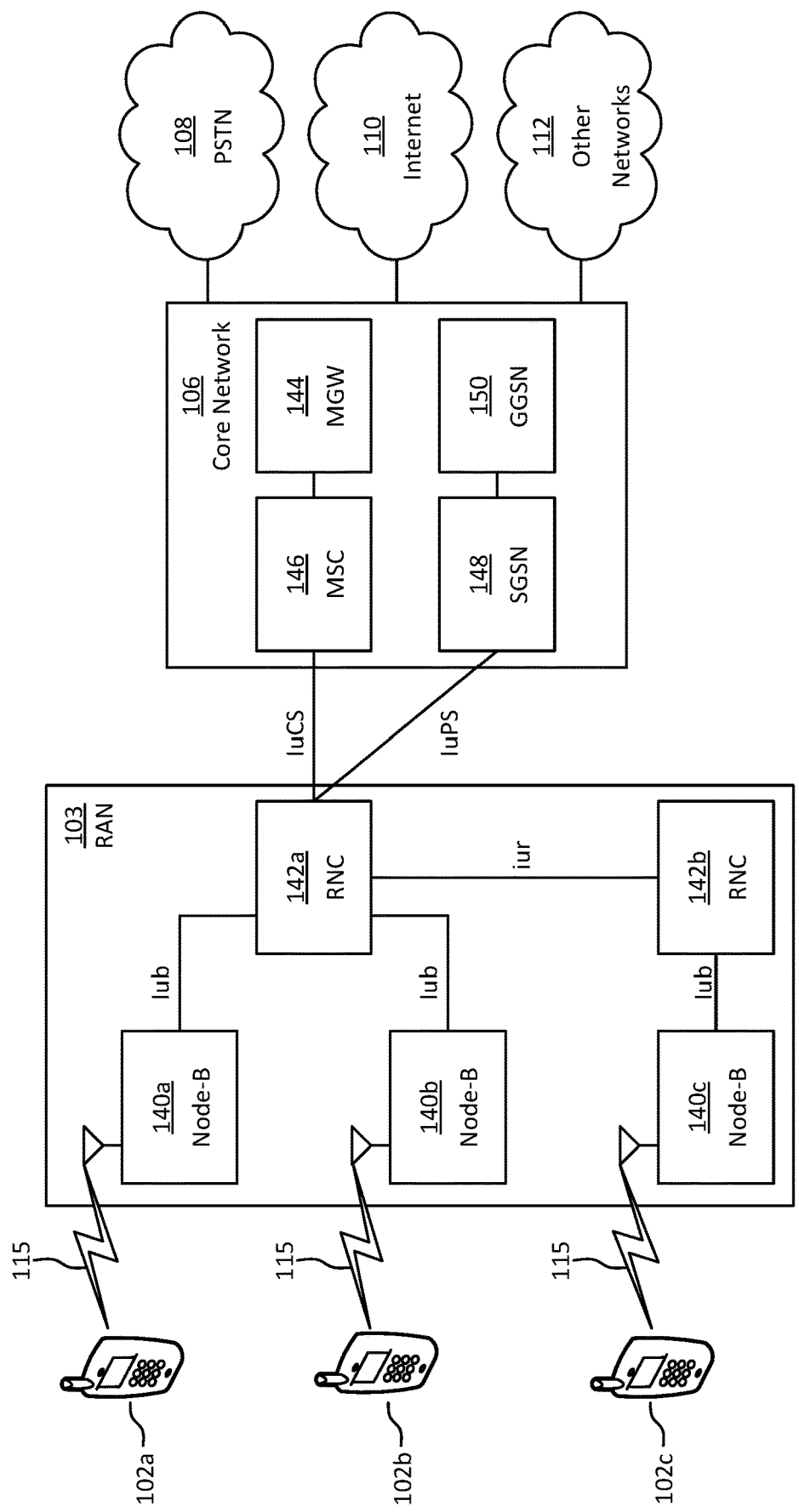
FIG. 15C is a system diagram of an example radio access network (RAN) and core network.

FIG. 15C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 15C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 15C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 15C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 15D:
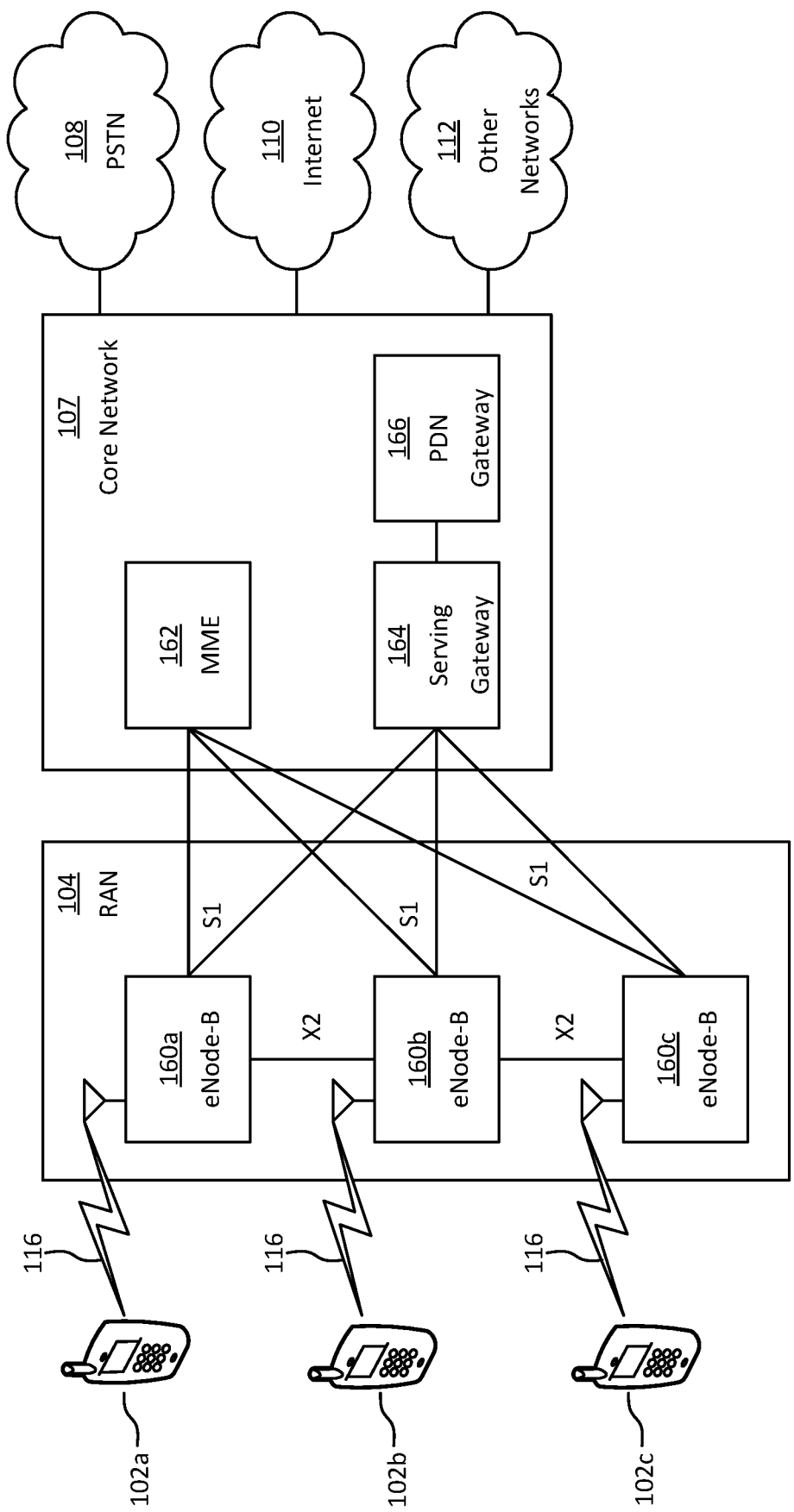
FIG. 15D is a system diagram of another example RAN and core network.

FIG. 15D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 15D, the eNode-Bs 160a, 160b, 160c may communicate with one another over an X2 interface.

The core network 107 shown in FIG. 15D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 15E:
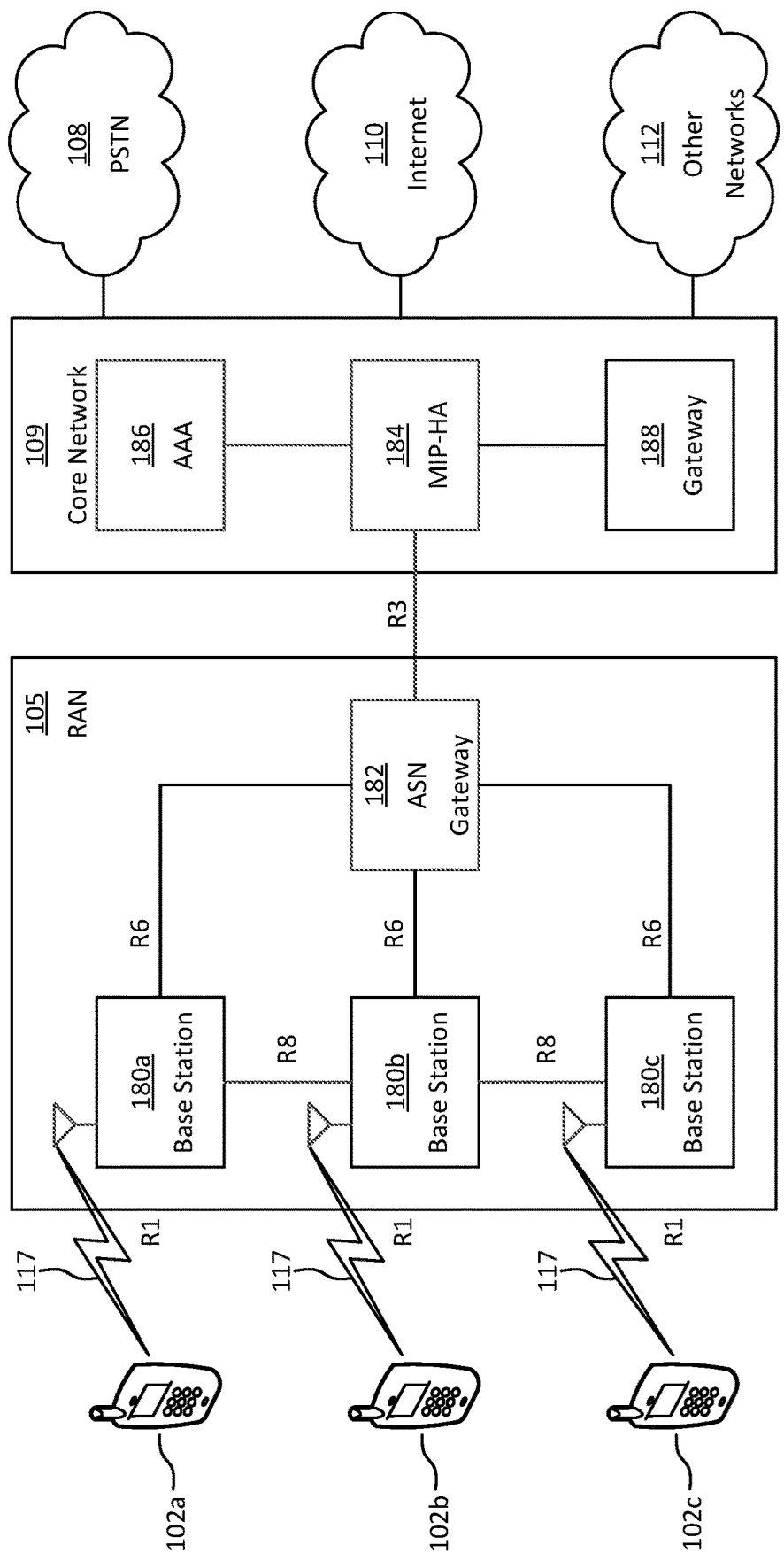
FIG. 15E is a system diagram of another example RAN and core network.

FIG. 15E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 15E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 15E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 15E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 15A, 15C, 15D, and 15E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 15A-1E are provided by way of example only, and it is understood that the subject matter disclosed and claimed herein may be embodied or implemented in any similar communication system, whether presently defined or defined in the future.

Figure 15F:
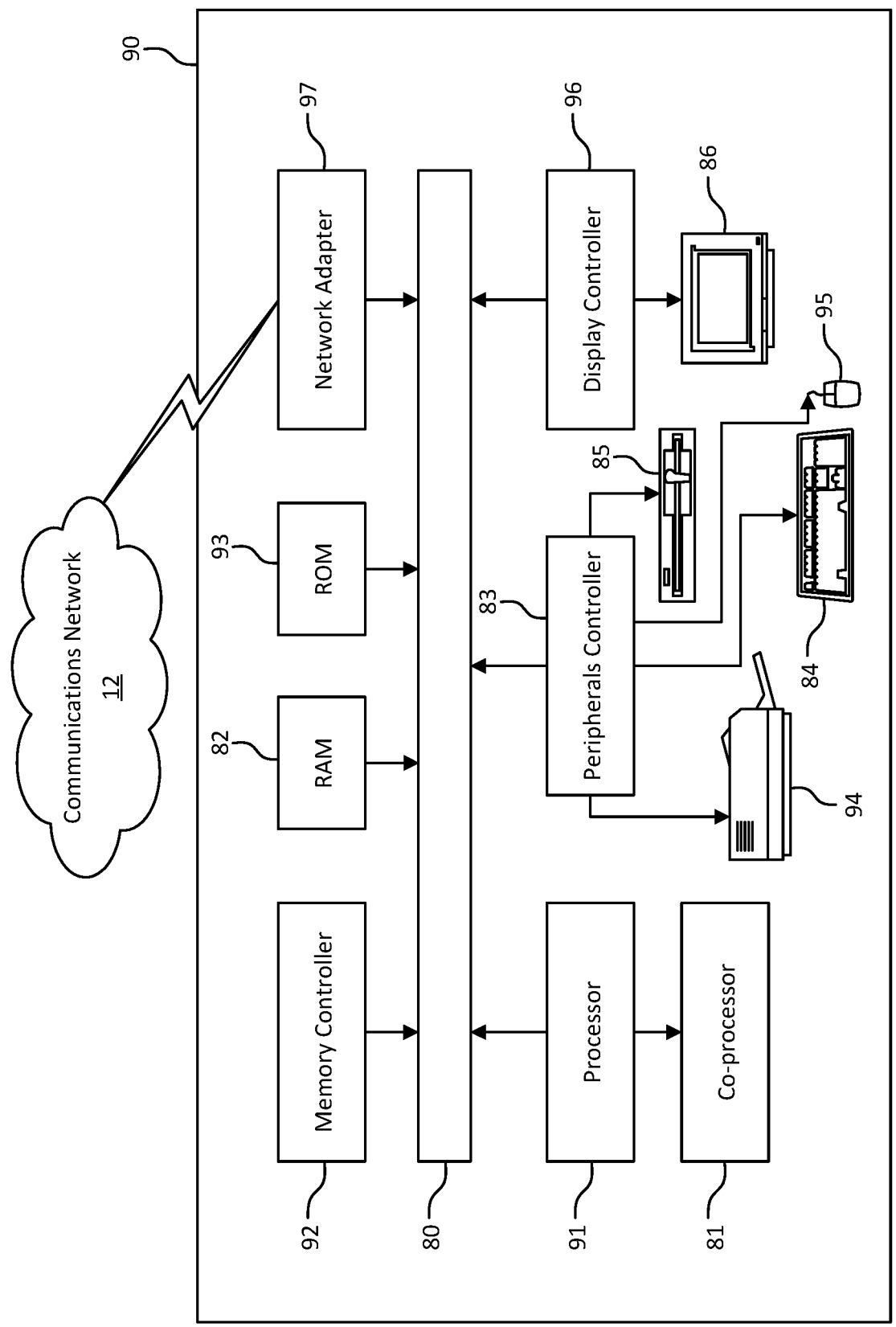
FIG. 15F is a block diagram of an example computing system.

FIG. 15F is a block diagram of an exemplary computing system 90 in which one or more apparatuses of the communications networks illustrated in FIGS. 15A, 15C, 15D, and 15E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 15A-1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 15G:
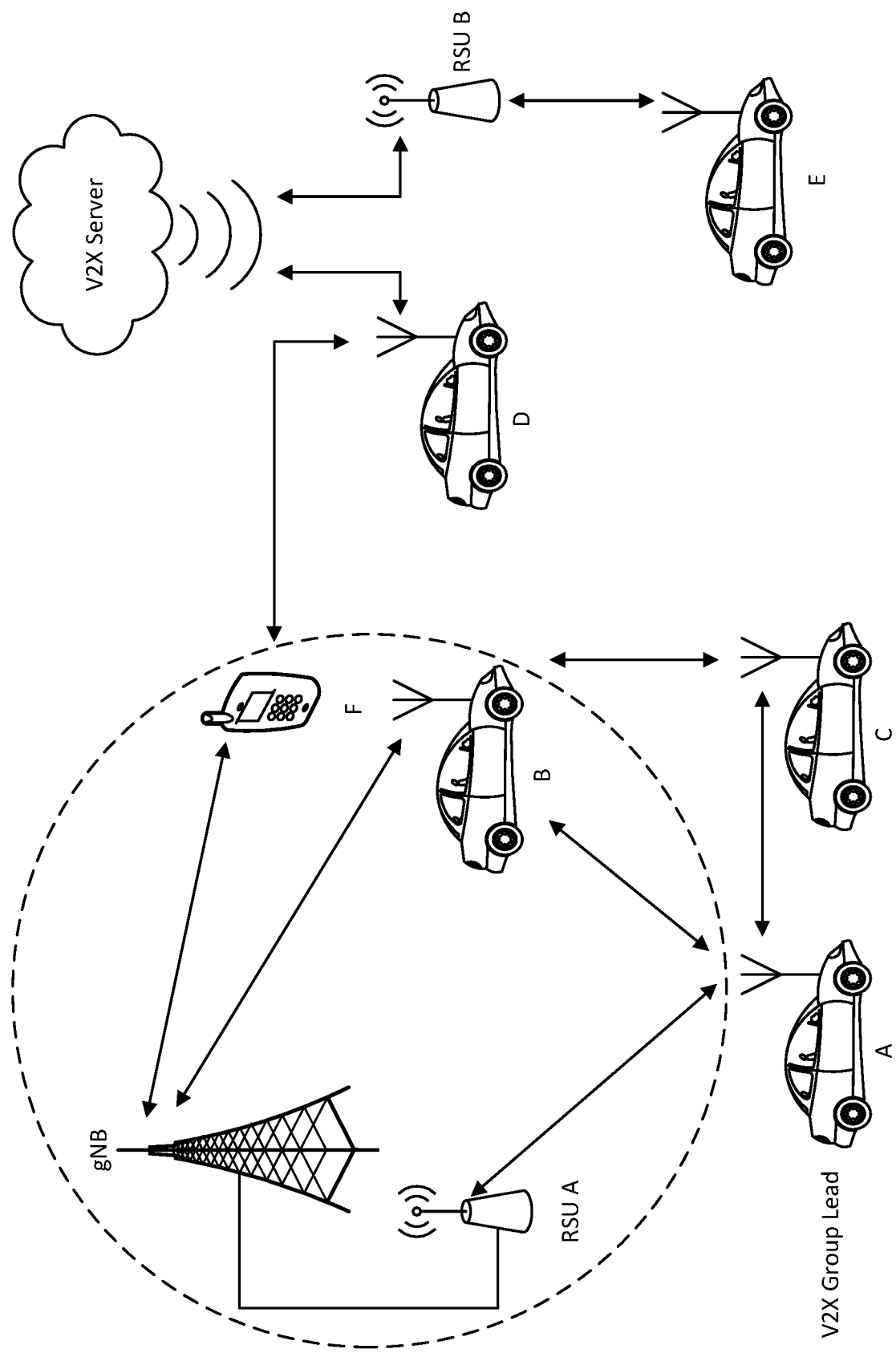
FIG. 15G is a block diagram of another example communications system.

FIG. 15G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E may be out of range of the network. In the example of FIG. 15G, the cell coverage boundary shown as a dashed line. WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable, and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

APPENDIX 1—CONFIGURATION EXAMPLES

Configuration Example 1—SRS-Config Information Element

```
-- ASN1START
-- TAG-SRS-CONFIG-START
-- some IEs removed for brevity
SRS-ResourceSet ::=       SEQUENCE {
    srs-ResourceSetId         SRS-ResourceSetId,
    srs-ResourceIdList        SEQUENCE
                              (SIZE(1..maxNrofSRS-ResourcesPerSet))
                              OF SRS-ResourceId OPTIONAL,
                              -- Cond Setup
-- some parts removed for brevity
    usage                     ENUMERATED {beamManagement, codebook,
                              nonCodebook, antennaSwitching},
-- some parts removed for brevity
    mixed-usage-r17           ENUMERATED {enabled}, OPTIONAL, -- Cond
    Codebook
-- some parts removed for brevity
}
-- some parts removed for brevity
-- TAG-SRS-CONFIG-STOP
-- ASN1STOP
```

Configuration Example 2—SRS-Config Information Element

```
-- ASN1START
-- TAG-SRS-CONFIG-START
-- some IEs removed for brevity
SRS-ResourceSet ::=       SEQUENCE {
    srs-ResourceSetId         SRS-ResourceSetId,
    srs-ResourceIdList        SEQUENCE
                              (SIZE(1..maxNrofSRS-ResourcesPerSet))
                              OF SRS-ResourceId OPTIONAL,
                              -- Cond Setup
-- some parts removed for brevity
    usage                     ENUMERATED {beamManagement, codebook,
                              nonCodebook, antennaSwitching, mixed},
-- some parts removed for brevity
}
-- some parts removed for brevity
-- TAG-SRS-CONFIG-STOP
-- ASN1STOP
```

Configuration Example 3—PUSCH-Config Information Element

```
-- ASN1START
-- TAG-PUSCH-CONFIG-START
PUSCH-Config ::=                      SEQUENCE {
    dataScramblingIdentityPUSCH           INTEGER       OPTIONAL,
                                          (0..1023)     -- Need S
    txConfig                              ENUMERATED    OPTIONAL,
                                          {codebook,    -- Need S
                                          nonCodebook,
                                          mixed}
--some parts removed for brevity
}
--some parts removed for brevity
-- TAG-PUSCH-CONFIG-STOP
-- ASN1STOP
```

Configuration Example 4—SRS-Config Information Element

```
-- ASN1START
-- TAG-SRS-CONFIG-START
-- some parts removed for brevity
SRS-ResourceSet ::=           SEQUENCE {
    srs-ResourceSetId             SRS-ResourceSetId,
    srs-ResourceIdList            SEQUENCE (SIZE(1..maxNrofSRS-ResourcesPerSet)) OF SRS-ResourceId       OPTIONAL, --
                                                                                                         Cond Setup
    resourceType                  CHOICE {
        aperiodic                     SEQUENCE {
            aperiodicSRS-ResourceTrigger      INTEGER (1..maxNrofSRS-TriggerStates-1),
            csi-RS                            NZP-CSI-RS-ResourceId                    OPTIONAL, -- Cond NonCodebook
            slotoffset                        INTEGER (1..32)                          OPTIONAL, -- Need S
            ...,
            [[
            aperiodicSRS-ResourceTriggerList          SEQUENCE (SIZE(1..maxNrofSRS-TriggerStates-2))
                                                      OF INTEGER (1..maxNrofSRS-TriggerStates-1) OPTIONAL -- Need M
            ]]
        },
```

-continued

```
        semi-persistent                    SEQUENCE {
            associatedCSI-RS               NZP-CSI-RS-ResourceId                           OPTIONAL, -- Cond NonCodebook
            ...
        },
        periodic                           SEQUENCE {
            associatedCSI-RS               NZP-CSI-RS-ResourceId                           OPTIONAL, -- Cond NonCodebook
            ...
        }
    },
    usage                                  ENUMERATED {beamManagement, codebook, nonCodebook, antennaSwitching},
    alpha                                  Alpha                                           OPTIONAL, -- Need S
    p0                                     INTEGER (-202..24)                              OPTIONAL, -- Cond Setup
    pathlossReferenceRS                    PathlossReferenceRS-Config                      OPTIONAL, -- Need M
    srs-PowerControlAdjustmentStates       ENUMERATED { sameAsFci2, separateClosedLoop}    OPTIONAL, --
                                                                                           Need S
    ...,
    [[
    pathlossReferenceRS-List-r16           SEQUENCE (SIZE(1..maxNrofSRS-PathlossReferenceRS-r16-1))
                                              OF PathlossReferenceRS-Config                OPTIONAL --
                                                                                           Need M
    srs-ResourceIdList2-r17                SEQUENCE (SIZE(1..maxNrofSRS-ResourcesPerSet)) OF SRS-ResourceId   OPTIONAL, --
                                                                                           Cond Codebook
    ]]
}
-- some parts removed for brevity
-- TAG-SRS-CONFIG-STOP
-- ASN1STOP
```

Configuration Example 4—SRS-Config Information Element—Continued

Configuration Example 4—SRS-Config Information Element—Continued

Configuration Example 5—SRS-Config Information Element

```
-- ASN1START
-- TAG-SRS-CONFIG-START
-- some parts removed for brevity
SRS-ResourceSet ::=                        SEQUENCE {
    srs-ResourceSetId                      SRS-ResourceSetId,
    srs-ResourceIdList                     SEQUENCE (SIZE(1..maxNrofSRS-ResourcesPerSet)) OF SRS-ResourceId OPTIONAL, -- Cond Setup
    resourceType                           CHOICE {
        aperiodic                          SEQUENCE {
            aperiodicSRS-ResourceTrigger   INTEGER (1..maxNrofSRS-TriggerStates-1),
            csi-RS                         NZP-CSI-RS-ResourceId                           OPTIONAL, -- Cond NonCodebook
            slotoffset                     INTEGER (1..32)                                 OPTIONAL, -- Need S
            ...,
            [[
            aperiodicSRS-ResourceTriggerList       SEQUENCE (SIZE(1..maxNrofSRS-TriggerStates-2))
            ]]                                        OF INTEGER (1..maxNrofSRS-TriggerStates-1) OPTIONAL -- Need M
        },
        semi-persistent                    SEQUENCE {
            associatedCSI-RS               NZP-CSI-RS-ResourceId                           OPTIONAL, -- Cond NonCodebook
            ...
        },
        periodic                           SEQUENCE {
            associatedCSI-RS               NZP-CSI-RS-ResourceId                           OPTIONAL, -- Cond NonCodebook
            ...
        }
    },
    usage                                  ENUMERATED {beamManagement, codebook, nonCodebook, antennaSwitching},
--some parts remove for brevity
    ...,
    [[
    associatedCSI-RS-r17 NZP-CSI-RS-ResourceId                                             OPTIONAL, -- Cond XYZ
    ]]
}
```

Configuration Example 5—SRS-Config Information Element—Continued

Configuration Example 6—SRS-Config Information Element

```
-- ASN1START
-- TAG-SRS-CONFIG-START
--some parts removed
SRS-ResourceSet ::=                    SEQUENCE {
    srs-ResourceSetId,                 SRS-ResourceSetId,
    srs-ResourceIdList                 SEQUENCE (SIZE(1..maxNrofSRS-ResourcesPerSet)) OF SRS-ResourceId OPTIONAL,
                                       -- Cond Setup
    resourceType                       CHOICE {
        aperiodic                      SEQUENCE {
            aperiodicSRS-ResourceTrigger    INTEGER (1..maxNrofSRS-TriggerStates-1),
            csi-RS                     NZP-CSI-RS-ResourceId                    OPTIONAL, --
                                                                                Cond NonCodebook
            slotoffset                 INTEGER (1..32)                          OPTIONAL, --
                                                                                Need S
            ...,
            [[
            aperiodicSRS-ResourceTriggerList      SEQUENCE (SIZE(1..maxNrofSRS-TriggerStates-2))
                                                  OF INTEGER (1..maxNrofSRS-TriggerStates-1) OPTIONAL -- Need M
            ]]
        },
        semi-persistent                SEQUENCE {
            associatedCSI-RS           NZP-CSI-RS-ResourceId                    OPTIONAL, --
                                                                                Cond NonCodebook
            ...
        },
        periodic                       SEQUENCE {
            associatedCSI-RS           NZP-CSI-RS-ResourceId                    OPTIONAL, --
                                                                                Cond NonCodebook
            ...
        }
    },
    usage                              ENUMERATED {beamManagement, codebook, nonCodebook, antennaSwitching},
    alpha                              Alpha                                    OPTIONAL, --
                                                                                Need S
    p0                                 INTEGER (-202..24)                       OPTIONAL, --
                                                                                Cond Setup
    pathlossReferenceRS                PathlossReferenceRS-Config               OPTIONAL,
                                                                                -- Need M
    srs-PowerControlAdjustmentStates   ENUMERATED { sameAsFci2, separateClosedLoop}    OPTIONAL,
                                                                                -- Need S
    ...,
    [[
    pathlossReferenceRS-List-r16       SEQUENCE (SIZE(1..maxNrofSRS-PathlossReferenceRS-r16-1))
                                       OF PathlossReferenceRS-Config
                                                                                OPTIONAL -- Need M
    panelID-r17                        PanelId    OPTIONAL, -- Cond M
    ]]
}
```

Configuration Example 6—SRS-Config Information Element—Continued

Configuration Example 6—SRS-Config Information Element—Continued

Configuration Example 7—SRS-Config Information Element

```
-- ASN1START
-- TAG-SRS-CONFIG-START
--some parts removed for brevity
SRS-ResourceSet ::=                    SEQUENCE {
    srs-ResourceSetId,                 SRS-ResourceSetId,
    srs-ResourceIdList                 SEQUENCE (SIZE(1..maxNrofSRS-ResourcesPerSet)) OF SRS-ResourceId OPTIONAL, -- Cond Setup
    resourceType                       CHOICE {
        aperiodic                      SEQUENCE {
            aperiodicSRS-ResourceTrigger    INTEGER (1..maxNrofSRS-TriggerStates-1),
            csi-RS                     NZP-CSI-RS-ResourceId            OPTIONAL, -- Cond NonCodebook
            slotoffset                 INTEGER (1..32)                  OPTIONAL, -- Need S
            ...,
```

-continued

```
    [[
       aperiodicSRS-ResourceTriggerList      SEQUENCE (SIZE(1..maxNrofSRS-TriggerStates-2))
                                             OF INTEGER (1..maxNrofSRS-TriggerStates-1) OPTIONAL -- Need M
    ]]
  },
  semi-persistent                            SEQUENCE {
    associatedCSI-RS                         NZP-CSI-RS-ResourceId                 OPTIONAL, -- Cond NonCodebook
    ...
  },
  periodic                                   SEQUENCE {
    associatedCSI-RS                         NZP-CSI-RS-ResourceId                 OPTIONAL, -- Cond NonCodebook
    ...
  }
},
usage                                        ENUMERATED {beamManagement, codebook, nonCodebook, antennaSwitching},
-- some parts removed
...,
[[
pathlossReferenceRS-List-r16                 SEQUENCE (SIZE(1..maxNrofSRS-PathlossReferenceRS-r16-1)) OF PathlossReferenceRS-Config
                                                                                   OPTIONAL -- Need M
panelIdList        SEQUENCE (SIZE(1..maxNrofPanels)) OF PanelId                    OPTIONAL, -- Cond M
]]
}
```

Configuration Example 7—SRS-Config Information Element—Continued

Configuration Example 8—SRS-Config Information Element

```
-- ASN1START
-- TAG-SRS-CONFIG-START
SRS-Config ::=                               SEQUENCE {
  srs-ResourceSetToReleaseList               SEQUENCE (SIZE(1..maxNrofSRS-ResourceSets)) OF SRS-ResourceSetId   OPTIONAL, -- Need N
  srs-ResourceSetToAddModList                SEQUENCE (SIZE(1..maxNrofSRS-ResourceSets)) OF SRS-ResourceSet     OPTIONAL, -- Need N
  srs-ResourceToReleaseList                  SEQUENCE (SIZE(1..maxNrofSRS-Resources)) OF SRS-ResourceId         OPTIONAL, -- Need N
  srs-ResourceToAddModList                   SEQUENCE (SIZE(1..maxNrofSRS-Resources)) OF SRS-Resource           OPTIONAL, -- Need N
  tpc-Accumulation                           ENUMERATED {disabled}                                              OPTIONAL, -- Need S
  ...,
  [[
  srs-RequestForDCI-Format1-2-r16 INTEGER (1..2)                                                                OPTIONAL, -- Need S
  srs-RequestForDCI-Format0-2-r16 INTEGER (1..2)                                                                OPTIONAL, -- Need S
  srs-ResourceSetToAddModListForDCI-Format0-2-r16 SEQUENCE (SIZE(1..maxNrofSRS-ResourceSets)) OF SRS-ResourceSet
OPTIONAL, -- Need N
  srs-ResourceSetToReleaseListForDCI-Format0-2-r16 SEQUENCE (SIZE(1..maxNrofSRS-ResourceSets)) OF SRS-ResourceSetId
OPTIONAL,-- Need N
-- some parts removed for brevity
  DLbasedPanelSelectionForULSweeping-r17 ENUMERATED {enabled} OPTIONAL -- Need M
  ]]
}
```

Configuration Example 8—SRS-Config Information Element—Continued

Configuration Example 9—SRS-Config Information Element

```
-- ASN1START
-- TAG-SRS-CONFIG-START
--some parts removed
SRS-ResourceSet ::=                          SEQUENCE {
  srs-ResourceSetId                          SRS-ResourceSetId,
  srs-ResourceIdList                         SEQUENCE (SIZE(1..maxNrofSRS-ResourcesPerSet)) OF SRS-ResourceId
                                                                                   OPTIONAL, -- Cond Setup
  resourceType                               CHOICE {
    aperiodic                                SEQUENCE {
      aperiodicSRS-ResourceTrigger           INTEGER (1..maxNrofSRS-TriggerStates-1),
      csi-RS                                 NZP-CSI-RS-ResourceId                 OPTIONAL, -- Cond
                                                                                   NonCodebook
      slotoffset                             INTEGER (1..32)                       OPTIONAL, -- Need S
      ...,
```

```
    [[
    aperiodicSRS-ResourceTriggerList        SEQUENCE (SIZE(1..maxNrofSRS-TriggerStates-2))
                                            OF INTEGER (1..maxNrofSRS-TriggerStates-1) OPTIONAL -- Need M
    ]]
  },
  semi-persistent                           SEQUENCE {
    associatedCSI-RS                        NZP-CSI-RS-ResourceId           OPTIONAL, -- Cond
                                                                            NonCodebook
    ...
  },
  periodic                                  SEQUENCE {
    associatedCSI-RS                        NZP-CSI-RS-ResourceId           OPTIONAL, -- Cond
                                                                            NonCodebook
    ...
  }
  },
  usage               ENUMERATED {beamManagement, codebook, nonCodebook, antennaSwitching},
  alpha               Alpha                                 OPTIONAL, -- Need S
  p0                  INTEGER (-202..24)                    OPTIONAL, -- Cond Setup
  pathlossReferenceRS PathlossReferenceRS-Config            OPTIONAL, -- Need M
  srs-PowerControlAdjustmentStates  ENUMERATED { sameAsFci2, separateClosedLoop}  OPTIONAL, -- Need S
  ...,
  [[
  pathlossReferenceRS-List-r16              SEQUENCE (SIZE(1..maxNrofSRS-PathlossReferenceRS-r16-1)) OF
                                            PathlossReferenceRS-Config
                                                                            OPTIONAL -- Need M
  DLbasedPanelSelectionForULSweeping-r17 ENUMERATED {enabled} OPTIONAL - Cond beamManagement
  ]]
}
```

Configuration Example 9—SRS-Config Information Element—Continued

Configuration Example 9—SRS-Config Information Element—Continued

APPENDIX 2—TABLES

TABLE 1

Example mapping from value of SRI field in DCI to corresponding indicated SRS resources.

| SRI value | Indicated SRS resource from SRSRS for codebook | Indicated SRS resource(s) from SRSRS for noncodebook |
|---|---|---|
| 0 | 0 | |
| 1 | 1 | |
| 2 | | 0 |
| 3 | | 1 |
| 4 | | 0, 1 |
| 5-7 | reserved | |

TABLE 2

Example mapping from Z to SRS resources.

| Z (Bit field mapped to index) | SRI(s), N = 2 |
|---|---|
| 0 | 0 |
| 1 | 1 |
| 2 | 0, 1 |
| 3 | reserved |

TABLE 3

Example mapping from Z to SRS resources.

| Z (Bit field mapped to index) | SRI(s), N = 2 |
|---|---|
| 0 | 0 (e.g., corresponds to S') |
| 1 | 1 (e.g., corresponds to S'') |
| 2 | 0, 1 |
| 3 | reserved |

TABLE 4

| M | CBSR | P | N | Table in TS 38.212. | K | K ≤ P? |
|---|---|---|---|---|---|---|
| 2 | fpnc | 4 bits | 2 | Table 7.3.1.1.2-29 ($N_{SRS}$ = 2) | 2 bits | OK |
| 2 | nc | 2 bits | 2 | Table 7.3.1.1.2-29 ($N_{SRS}$ = 2) | 2 bits | OK |
| 4 | fpnc | 6 bits | 2 | Table 7.3.1.1.2-31 ($N_{SRS}$ = 2) | 2 bits | OK |
| 4 | fpnc | 6 bits | 3 | Table 7.3.1.1.2-31 ($N_{SRS}$ = 3) | 3 bits | OK |
| 4 | fpnc | 6 bits | 4 | Table 7.3.1.1.2-31 ($N_{SRS}$ = 4) | 4 bits | OK |
| 4 | pnc | 5 bits | 2 | Table 7.3.1.1.2-31 ($N_{SRS}$ = 2) | 2 bits | OK |
| 4 | pnc | 5 bits | 3 | Table 7.3.1.1.2-31 ($N_{SRS}$ = 3) | 3 bits | OK |
| 4 | pnc | 5 bits | 4 | Table 7.3.1.1.2-31 ($N_{SRS}$ = 4) | 4 bits | OK |
| 4 | nc | 4 bits | 2 | Table 7.3.1.1.2-31 ($N_{SRS}$ = 2) | 2 bits | OK |
| 4 | nc | 4 bits | 3 | Table 7.3.1.1.2-31 ($N_{SRS}$ = 3) | 3 bits | OK |
| 4 | nc | 4 bits | 4 | Table 7.3.1.1.2-31 ($N_{SRS}$ = 4) | 4 bits | OK |

TABLE 5

Example mapping from Z to SRS resource(s).

| Bit field mapped to index | SRI(s), $N_{SRS}$ = 2 |
|---|---|
| 0 | 0 |
| 1 | 1 |
| 2 | 0, 1 |
| 3 | reserved |

TABLE 6

Example of interpretation of 2-bit P field in MAC CE

| P | Panel ID for SRSRS |
|---|---|
| 0 | no panel is indicated |
| 1 | Panel ID = 0 |
| 2 | Panel ID = 1 |
| 3 | reserved |

TABLE 7

| | Abbreviations |
|---|---|
| ACK | Acknowledgement |
| A/D | Activate/Deactivate (in the context of MAC CE) |
| BM | Beam Management or 'beamManagement' (e.g., value of RRC parameter usage) |
| BWP | BandWidth Part |
| CA | Carrier Aggregation |
| CBB | Codebook-Based |
| CBSR | Codebook Subset Restriction |
| CC | Component Carrier |
| CDM | Code Division Multiplexing |
| CORESET | Control Resource Set |
| CRAN | Centralized RAN (sometimes Cloud RAN) |
| CSI-RS | Channel State Information RS |
| DAS | Distributed Antenna System |
| DC | Dual Connectivity |
| DCI | Downlink Control Information |
| DL | Downlink |
| DMRS | Demodulation RS |
| FDM | Frequency Division Multiplexing |
| FDMed | Frequency Division Multiplexed |
| gNB | NR NodeB |
| HARQ | Hybrid Automatic Repeat Request |
| ID | identity and/or index |
| IE | Information Element |
| MAC | Medium Access Control |
| MAC CE | MAC Control Element |
| MCS | Modulation and Coding Scheme |
| MSB | Most Significant Bit(s) |
| NACK | Negative Acknowledgement |
| NCBB | Non-Codebook-Based |
| NR | New Radio |
| NW | Network |
| NZP | Non-Zero Power |
| PA | Power Amplifier |
| PCell | Primary Cell |
| PDCCH | Physical Downlink Control CHannel(s) |
| PDSCH | Physical Downlink Shared CHannel(s) |
| PUCCH | Physical Uplink Control CHannel(s) |
| PUSCH | Physical Uplink Shared CHannel(s) |
| PHY | Physical Layer |
| PRB | Physical RB |
| PSCell | Primary SCG Cell |
| QCL | Quasi Co-location |
| RAN | Radio Access Network |
| RB | Resource Block |
| RE | Resource Element |
| RF | Radio Frequency |
| RNTI | Radio Network Temporary Identification |
| RP | Reception Point |
| RRC | Radio Resource Control |
| RRH | Remote Radio Head |
| RS | Reference Signal(s) |
| RSRP | Reference Signal Received Power |
| RV | Redundancy Version |
| Rx | Reception |
| SCell | Secondary Cell |
| SCG | Secondary Cell Group |
| SpCell | Special Cell (PCell or PSCell) |
| SRI | SRS Resource Indicator |
| SRS | Sounding RS |
| SRSRS | SRS Resource Set |
| SSB | SS/PBCH Block |
| TCI | Transmission Configuration Indicator |

TABLE 7-continued

| | Abbreviations |
|---|---|
| ACK | Acknowledgement |
| TDD | Time Division Duplex |
| TDM | Time Division Multiplexing |
| TDMed | Time Division Multiplexed |
| TPC | Transmit Power Control |
| TPMI | Transmit Precoding Matrix Indicator |
| TRP | Transmission and/or Reception Point |
| TRS | Tracking Reference Signal |
| TRX | Transmitter and Receiver |
| Tx | Transmission |
| UE | User Equipment |
| UL | Uplink |
| URLLC | Ultra reliable and low latency communications |

We claim:

1. A User Equipment (UE), comprising:
communications circuitry capable of connecting to a wireless network,
a processor, and
a memory storing instructions which, when executed by the processor, cause the processor to:
receive one or more downlink transmissions comprising Radio Resource Control (RRC) signaling and Downlink Control Information (DCI) that schedules one or more Physical Uplink Shared Channels (PUSCHs),
wherein the RRC signaling indicates two Sounding Reference Signal (SRS) resource sets (SRSRS) including a first SRSRS and a second SRSRS,
wherein the DCI includes a 2-bit SRSRS selection field, a first SRS Resource Indicator (SRI) field, and a second SRI field for non-codebook-based and/or codebook-based PUSCH operation,
wherein the 2-bit SRSRS selection field indicates one of codepoint values of 0 to 3,
wherein the codepoint value of 0 indicates that the first SRI field is used to indicate the first SRSRS and that the second SRI field is unused,
wherein the codepoint value of 1 indicates that the first SRI field is used to indicate the second SRSRS and that the second SRI field is unused,
wherein the codepoint value of 2 indicates that the first SRI field is used to indicate the first SRSRS and that the second SRI field is used to indicate the second SRSRS,
wherein the codepoint value of 3 indicates that the first SRI field is used to indicate the first SRSRS and that the second SRI field is used to indicate the second SRSRS, and
wherein the first SRSRS corresponds to a lower ID than the second SRSRS; and
transmit, using the PUSCH repetition pattern and SRSRS selected based on the 2-bit SRSRS selection field, one or more PUSCH occasions.

2. The UE of claim 1, wherein the first SRSRS is for codebook-based operation and the second SRSRS is for non-codebook-based operation.

3. The UE of claim 1, wherein the DCI indicates the use of both the non-codebook-based PUSCH operation and the codebook-based PUSCH operation.

4. The UE of claim 3, wherein the instructions, when executed by the processor, further cause the apparatus to:
transmit PUSCH using a codebook-based operation in a first set of PUSCH occasions; and transmit PUSCH using a non-codebook-based operation in a second set of PUSCH occasions.

5. The UE of claim 4,
wherein the DCI includes a precoding and layers field pertaining to PUSCH precoding and a number of layers, and
wherein the precoding and layers field pertains to the first set of PUSCH occasions but not the second set of PUSCH occasions.

6. The UE of claim 4, wherein the first SRI field is applicable to the first set of PUSCH occasions and the second SRI field is applicable to the second set of PUSCH occasions.

7. The UE of claim 6, wherein the instructions, when executed by the processor, further cause the apparatus to determine, based on the second SRI field, a number of layers for PUSCH transmission in the first set of PUSCH occasions and the second set of PUSCH occasions.

8. The UE of claim 7, wherein the DCI includes a precoding field that pertains to precoding for the first set of PUSCH occasions based on the number of layers.

9. The UE of claim 6,
wherein the DCI includes a precoding and layers field pertaining to precoding and a number of layers,
wherein the precoding pertains to the first set of PUSCH occasions but not the second set of PUSCH occasions, and
wherein the number of layers pertains to both the first and second sets of PUSCH occasions.

10. The UE of claim 9, wherein the second SRI field indicates a number of SRS resources that is equal to the number of layers indicated by the precoding and layers field.

11. A method performed by a digital network, comprising:
sending a downlink transmission comprising Radio Resource Control (RRC) signaling and Downlink Control Information (DCI) that schedules one or more Physical Uplink Shared Channels (PUSCHs),
wherein the RRC signaling indicates two Sounding Reference Signal (SRS) resource sets (SRSRS) including a first SRSRS and a second SRSRS,
wherein the DCI includes a 2-bit SRSRS selection field, a first SRS Resource Indicator (SRI) field, and a second SRI field for non-codebook-based and/or codebook-based PUSCH operation,
wherein the 2-bit SRSRS selection field indicates one of codepoint values of 0 to 3,
wherein the codepoint value of 0 indicates that the first SRI field is used to indicate the first SRSRS and the second SRI field is unused,
wherein the codepoint value of 1 indicates that the first SRI field is used to indicate the second SRSRS and the second SRI field is unused,
wherein the codepoint value of 2 indicates that the first SRI field is used to indicate the first SRSRS and the second SRI field is used to indicate the second SRSRS,
wherein the codepoint value of 3 indicates that the first SRI field is used to indicate the first SRSRS and the second SRI field is used to indicate the second SRSRS, and
wherein the first SRSRS corresponds to a lower ID than the second SRSRS; and
receiving, using the PUSCH repetition pattern and SRSRS selected based on the 2-bit SRSRS selection field, one or more PUSCH occasions.

12. The method of claim 11, wherein the first SRSRS is for codebook-based operation and the second SRSRS is for non-codebook-based operation.

13. The method of claim 11, wherein the DCI indicates the use of both the non-codebook-based PUSCH operation and the codebook-based PUSCH operation.

14. The method of claim 13, further comprising:
receiving a first transmission from a User Equipment (UE) that is sent using a codebook-based operation in a first set of PUSCH occasions; and
receiving a second transmission from the UE that is sent using a non-codebook-based operation in a second set of PUSCH occasions.

15. The method of claim 14, wherein the first SRI field is applicable to the first set of PUSCH occasions and the second SRI field is applicable to the second set of PUSCH occasions.

16. The method of claim 15, wherein the second SRI field pertains to a first number of layers for the first set of PUSCH occasion and a second number of layers for the second set of PUSCH occasions.

17. The method of claim 16, wherein the DCI includes a precoding field that pertains to precoding for the first set of PUSCH occasions based on the first number of layers.

18. The method of claim 15,
wherein the DCI includes a precoding and layers field pertaining to precoding and a number of layers,
wherein the precoding pertains to the first set of PUSCH occasions but not the second set of PUSCH occasions, and
wherein the number of layers pertains to both the first and second sets of PUSCH occasions.

19. The method of claim 18, wherein the second SRI field indicates a number of SRS resources that is equal to the number of layers indicated by the precoding and layers field.

20. The method of claim 14,
wherein the DCI includes a first field pertaining to precoding and a number of layers, and
wherein the first field pertains to the first set of PUSCH occasions but not the second set of PUSCH occasions.

* * * * *